US009876751B2

(12) United States Patent
Spivack et al.

(10) Patent No.: US 9,876,751 B2
(45) Date of Patent: Jan. 23, 2018

(54) SYSTEM AND METHOD FOR ANALYZING MESSAGES IN A NETWORK OR ACROSS NETWORKS

(71) Applicant: BLAZENT, INC., Livonia, MI (US)

(72) Inventors: Nova Spivack, Sherman Oaks, CA (US); Dominiek ter Heide, Amsterdam (NL)

(73) Assignee: Blazent, Inc., Livonia, MI (US)

( * ) Notice: Subject to any disclaimer, the term of this patent is extended or adjusted under 35 U.S.C. 154(b) by 419 days.

(21) Appl. No.: 14/718,957

(22) Filed: May 21, 2015

(65) Prior Publication Data

US 2015/0256636 A1 Sep. 10, 2015

Related U.S. Application Data

(63) Continuation of application No. 13/403,937, filed on Feb. 23, 2012, now Pat. No. 9,614,807.

(Continued)

(51) Int. Cl.
*G06F 3/00* (2006.01)
*H04L 12/58* (2006.01)
(Continued)

(52) U.S. Cl.
CPC .......... *H04L 51/32* (2013.01); *G06F 3/0482* (2013.01); *G06F 3/04842* (2013.01);
(Continued)

(58) Field of Classification Search
CPC combination set(s) only.
See application file for complete search history.

(56) References Cited

U.S. PATENT DOCUMENTS 6,151,585 A 11/2000 Altschuler et al.
6,286,005 B1 9/2001 Cannon
(Continued)

FOREIGN PATENT DOCUMENTS

GB 2502736 A 12/2013
GB 2502737 A 12/2013
(Continued)

OTHER PUBLICATIONS

International Search Report & Written Opinion for Application No. PCT/US2012/026410, Date of filing: Feb. 23, 2012, Applicant: Spivack Nova et al., dated Sep. 23, 2012, 11 pages.
(Continued)

*Primary Examiner* — Jeffrey A Gaffin
*Assistant Examiner* — Ayesha Huertas Torres
(74) *Attorney, Agent, or Firm* — Moser Taboada

(57) ABSTRACT

Systems and methods for presenting a graphical visualization of user related content in a network or across networks are disclosed. In one aspect, embodiments of the present disclosure include analyzing the content from within the network or across the networks, identifying trending topics, and customizing the graphical visualization based on a given topic. The given topic can be user specified and/or can be based on implicit and/or explicit user interests or preferences. The given topic can also be administrator specified. The graphical visualization can present the topics as being connected to the given topic, where the given topic is presented as a center node and the topics relating to that given topic are arranged radially from the center node. The trending topics can change based on a configurable timeframe (e.g., minutes, days, weeks, etc.).

28 Claims, 55 Drawing Sheets

Related U.S. Application Data

(60) Provisional application No. 61/446,001, filed on Feb. 23, 2011, provisional application No. 61/449,033, filed on Mar. 3, 2011, provisional application No. 61/591,696, filed on Jan. 27, 2012, provisional application No. 61/599,355, filed on Feb. 15, 2012, provisional application No. 61/600,553, filed on Feb. 17, 2012.

(51) Int. Cl.

| | | |
|---|---|---|
| *G06Q 10/10* | (2012.01) | |
| *G06Q 50/00* | (2012.01) | |
| *G06F 17/30* | (2006.01) | |
| *G06F 3/0482* | (2013.01) | |
| *G06F 3/0484* | (2013.01) | |
| *H04L 12/26* | (2006.01) | |
| *H04L 29/08* | (2006.01) | |
| *G06N 5/04* | (2006.01) | |
| *G06N 99/00* | (2010.01) | |

(52) U.S. Cl.
 CPC ....... *G06F 17/30864* (2013.01); *G06N 5/046* (2013.01); *G06N 99/005* (2013.01); *G06Q 10/10* (2013.01); *G06Q 50/01* (2013.01); *H04L 43/16* (2013.01); *H04L 67/02* (2013.01); *H04L 67/22* (2013.01)

(56) References Cited

U.S. PATENT DOCUMENTS

| | | | |
|---|---|---|---|
| 6,373,483 B1 | 4/2002 | Becker et al. | |
| D474,197 S | 5/2003 | Nguyen | |
| 7,512,612 B1 | 3/2009 | Akella et al. | |
| 7,606,168 B2 * | 10/2009 | Robinson | G06Q 10/10 370/254 |
| 7,636,714 B1 | 12/2009 | Lamping et al. | |
| D627,360 S | 11/2010 | Aarseth | |
| 7,885,844 B1 | 2/2011 | Cohen et al. | |
| 8,041,400 B2 | 10/2011 | Kim | |
| 8,073,850 B1 | 12/2011 | Hubbard et al. | |
| 8,086,605 B2 | 12/2011 | Xu et al. | |
| 8,166,026 B1 | 4/2012 | Sadler | |
| 8,166,925 B2 | 5/2012 | Suggett et al. | |
| 8,352,549 B2 | 1/2013 | Sacco et al. | |
| 8,375,024 B2 | 2/2013 | Goeldi | |
| D700,198 S | 2/2014 | Akcasu et al. | |
| 8,762,302 B1 | 6/2014 | Spivack et al. | |
| 8,832,092 B2 | 9/2014 | Spivack et al. | |
| 8,909,569 B2 | 12/2014 | Spivack et al. | |
| 8,913,066 B2 | 12/2014 | Okuda | |
| 8,938,450 B2 | 1/2015 | Spivack et al. | |
| D725,133 S | 3/2015 | Smirin et al. | |
| 8,990,097 B2 | 3/2015 | Spivack et al. | |
| 9,009,126 B2 | 4/2015 | Spivack et al. | |
| D733,167 S | 6/2015 | Schoger et al. | |
| D735,732 S | 8/2015 | Nezhad et al. | |
| 9,117,058 B1 | 8/2015 | Ansari et al. | |
| D743,412 S | 11/2015 | Danielyan et al. | |
| D743,413 S | 11/2015 | Danielyan et al. | |
| D743,423 S | 11/2015 | Danielyan et al. | |
| D743,424 S | 11/2015 | Danielyan et al. | |
| 2002/0023020 A1 | 2/2002 | Kenyon et al. | |
| 2003/0110056 A1 | 6/2003 | Berghofer et al. | |
| 2003/0229531 A1 | 12/2003 | Heckerman et al. | |
| 2004/0225592 A1 | 11/2004 | Churquina | |
| 2004/0249713 A1 | 12/2004 | Gross | |
| 2005/0060312 A1 | 3/2005 | Curtiss et al. | |
| 2005/0108630 A1 | 5/2005 | Wasson et al. | |
| 2005/0114786 A1 | 5/2005 | Decombe | |
| 2005/0131897 A1 | 6/2005 | Grasso et al. | |
| 2005/0154690 A1 | 7/2005 | Nitta et al. | |
| 2005/0192957 A1 | 9/2005 | Newbold | |
| 2005/0256866 A1 | 11/2005 | Lu et al. | |
| 2006/0041543 A1 | 2/2006 | Achlioptas | |
| 2006/0059055 A1 | 3/2006 | Lin | |
| 2006/0074836 A1 | 4/2006 | Gardner et al. | |
| 2006/0112111 A1 | 5/2006 | Tseng et al. | |
| 2006/0112146 A1 | 5/2006 | Song et al. | |
| 2006/0173957 A1 | 8/2006 | Robinson et al. | |
| 2006/0218577 A1 | 9/2006 | Goodman et al. | |
| 2006/0248073 A1 | 11/2006 | Jones et al. | |
| 2006/0282303 A1 | 12/2006 | Hale et al. | |
| 2006/0282328 A1 | 12/2006 | Gerace et al. | |
| 2006/0294085 A1 | 12/2006 | Rose et al. | |
| 2006/0294086 A1 | 12/2006 | Rose et al. | |
| 2006/0294134 A1 | 12/2006 | Berkhim et al. | |
| 2007/0027744 A1 | 2/2007 | Carson et al. | |
| 2007/0078699 A1 | 4/2007 | Scott et al. | |
| 2007/0121843 A1 | 5/2007 | Atazky et al. | |
| 2007/0124432 A1 | 5/2007 | Holtzman et al. | |
| 2007/0150398 A1 | 6/2007 | Rossen et al. | |
| 2007/0156636 A1 | 7/2007 | Norton et al. | |
| 2007/0168533 A1 | 7/2007 | Canright et al. | |
| 2007/0174057 A1 | 7/2007 | Genly | |
| 2007/0203996 A1 | 8/2007 | Davitz et al. | |
| 2007/0208613 A1 | 9/2007 | Backer | |
| 2007/0219863 A1 | 9/2007 | Park et al. | |
| 2007/0226248 A1 | 9/2007 | Darr | |
| 2007/0282867 A1 | 12/2007 | McAllister et al. | |
| 2007/0297405 A1 | 12/2007 | He | |
| 2008/0004942 A1 | 1/2008 | Calabria | |
| 2008/0010253 A1 | 1/2008 | Sidhu et al. | |
| 2008/0040474 A1 | 2/2008 | Zuckerberg et al. | |
| 2008/0040475 A1 | 2/2008 | Bosworth et al. | |
| 2008/0059466 A1 | 3/2008 | Luo et al. | |
| 2008/0104225 A1 | 5/2008 | Zhang et al. | |
| 2008/0133426 A1 | 6/2008 | Porat et al. | |
| 2008/0133503 A1 | 6/2008 | Popescul et al. | |
| 2008/0215429 A1 | 9/2008 | Ramer et al. | |
| 2008/0215557 A1 | 9/2008 | Ramer et al. | |
| 2008/0215571 A1 | 9/2008 | Huang et al. | |
| 2008/0255935 A1 | 10/2008 | Madhavan et al. | |
| 2008/0275833 A1 | 11/2008 | Zhou et al. | |
| 2008/0275861 A1 | 11/2008 | Baluja et al. | |
| 2008/0281661 A1 | 11/2008 | Young et al. | |
| 2008/0288305 A1 | 11/2008 | LaLuzerne et al. | |
| 2008/0288596 A1 | 11/2008 | Smith et al. | |
| 2008/0297513 A1 | 12/2008 | Greenhill et al. | |
| 2008/0313011 A1 | 12/2008 | Rose et al. | |
| 2009/0037521 A1 | 2/2009 | Zilca et al. | |
| 2009/0049038 A1 | 2/2009 | Gross | |
| 2009/0049308 A1 | 2/2009 | Jin et al. | |
| 2009/0106224 A1 | 4/2009 | Roulland et al. | |
| 2009/0106244 A1 | 4/2009 | Dash et al. | |
| 2009/0119173 A1 | 5/2009 | Parsons et al. | |
| 2009/0209286 A1 | 8/2009 | Bentley et al. | |
| 2009/0234828 A1 | 9/2009 | Tu | |
| 2009/0319342 A1 | 12/2009 | Shilman et al. | |
| 2009/0327275 A1 | 12/2009 | Walker et al. | |
| 2010/0030648 A1 | 2/2010 | Manolescu et al. | |
| 2010/0042944 A1 | 2/2010 | Robinson et al. | |
| 2010/0049852 A1 | 2/2010 | Whitnah et al. | |
| 2010/0058196 A1 | 3/2010 | Krishnan et al. | |
| 2010/0070448 A1 | 3/2010 | Omoigui | |
| 2010/0082695 A1 | 4/2010 | Hardt | |
| 2010/0083124 A1 | 4/2010 | Druzgalski et al. | |
| 2010/0094939 A1 | 4/2010 | Cheng et al. | |
| 2010/0100537 A1 * | 4/2010 | Druzgalski | G06Q 30/02 707/713 |
| 2010/0114946 A1 | 5/2010 | Kumar et al. | |
| 2010/0119053 A1 | 5/2010 | Goeldi | |
| 2010/0121707 A1 | 5/2010 | Goeldi | |
| 2010/0121817 A1 | 5/2010 | Meyer et al. | |
| 2010/0121839 A1 | 5/2010 | Meyer et al. | |
| 2010/0174692 A1 | 7/2010 | Meyer et al. | |
| 2010/0235489 A1 | 9/2010 | Cogan | |
| 2010/0306049 A1 | 12/2010 | Kakade et al. | |
| 2010/0306192 A1 | 12/2010 | Kapur et al. | |
| 2010/0312769 A1 | 12/2010 | Bailey et al. | |
| 2011/0004465 A1 | 1/2011 | Rose et al. | |
| 2011/0005501 A1 | 1/2011 | Jacob | |
| 2011/0022602 A1 | 1/2011 | Luo et al. | |

(56) References Cited

U.S. PATENT DOCUMENTS

| | | |
|---|---|---|
| 2011/0029636 A1 | 2/2011 | Smyth et al. |
| 2011/0067030 A1 | 3/2011 | Isard et al. |
| 2011/0067076 A1 | 3/2011 | Harris et al. |
| 2011/0078156 A1 | 3/2011 | Koss |
| 2011/0093459 A1 | 4/2011 | Dong et al. |
| 2011/0125580 A1 | 5/2011 | Erhart et al. |
| 2011/0184806 A1 | 7/2011 | Chen et al. |
| 2011/0191372 A1 | 8/2011 | Kaushansky et al. |
| 2011/0212717 A1 | 9/2011 | Rhoads et al. |
| 2011/0213661 A1 | 9/2011 | Milana et al. |
| 2011/0213894 A1 | 9/2011 | Silberstein et al. |
| 2011/0238496 A1 | 9/2011 | Gurbuxani et al. |
| 2011/0238647 A1 | 9/2011 | Ingram et al. |
| 2011/0264599 A1 | 10/2011 | Dalton |
| 2011/0307429 A1 | 12/2011 | Probst et al. |
| 2011/0314007 A1 | 12/2011 | Dassa et al. |
| 2011/0320715 A1 | 12/2011 | Ickman et al. |
| 2012/0005224 A1 | 1/2012 | Ahrens et al. |
| 2012/0066073 A1 | 3/2012 | Dilip et al. |
| 2012/0102021 A1 | 4/2012 | Hill et al. |
| 2012/0136959 A1 | 5/2012 | Kadam et al. |
| 2012/0158613 A1 | 6/2012 | Bollen et al. |
| 2012/0166438 A1 | 6/2012 | Wu et al. |
| 2012/0246054 A1 | 9/2012 | Sastri |
| 2012/0296920 A1 | 11/2012 | Sahni et al. |
| 2012/0296991 A1 | 11/2012 | Spivack et al. |
| 2013/0007126 A1 | 1/2013 | Ziemann |
| 2013/0013801 A1 | 1/2013 | Leeder |
| 2013/0018698 A1 | 1/2013 | Parnaby et al. |
| 2013/0046603 A1 | 2/2013 | Grigg et al. |
| 2013/0125027 A1 | 5/2013 | Abovitz |
| 2013/0144682 A1 | 6/2013 | Dhara et al. |
| 2013/0159507 A1 | 6/2013 | Mason et al. |
| 2013/0198204 A1 | 8/2013 | Williams et al. |
| 2013/0298038 A1 | 11/2013 | Spivack et al. |
| 2013/0298084 A1 | 11/2013 | Spivack et al. |
| 2013/0304818 A1 | 11/2013 | Brumleve et al. |
| 2014/0129324 A1 | 5/2014 | Spivack et al. |
| 2014/0129331 A1 | 5/2014 | Spivack et al. |
| 2014/0136997 A1 | 5/2014 | Spivack et al. |
| 2015/0095021 A1 | 4/2015 | Spivack et al. |

FOREIGN PATENT DOCUMENTS

| | | | |
|---|---|---|---|
| JP | 2003288437 A | 10/2003 | |
| JP | 2006227965 A | 8/2006 | |
| KR | 102009-00 | 6/2009 | |
| KR | 20090074108 A | 7/2009 | |
| WO | WO-2006073977 A1 | 7/2006 | |
| WO | WO-2006116516 A2 | 11/2006 | |
| WO | WO-2008006059 A2 | 1/2008 | |
| WO | WO-2009007754 A1 | 1/2009 | |
| WO | WO-2009035618 A2 | 3/2009 | |

OTHER PUBLICATIONS

International Search Report & Written Opinion for Application No. PCT/US2012/026405, Date of filing: Feb. 23, 2012, Applicant: Spivack Nova et al., dated Dec. 28, 2012, 15 pages.

International Search Report & Written Opinion for Application No. PCT/US2013/023504, Date of filing: Jan. 28, 2013, Applicant: Bottlenose Inc., dated Jun. 11, 2013, 20 pages.

International Search Report & Written Opinion for Application No. PCT/US 2013/26763, Date of filing: Feb. 19, 2013, Applicant: Bottlenose, Inc., dated Apr. 23, 2013, 8 pages.

International Search Report & Written Opinion for Application No. PCT/US2013/26528, Date of filing: Feb. 15, 2013, Applicant: Bottlenose Inc., dated Apr. 18, 2013, 9 pages.

Zhou et al., "PowerTrust: A Robust and Scalable Reputation System for Trusted Peer-To-Peer Computing," 2007 IEEE, 30 pages.

Lu et al., "Finding Query Suggestions for PubMed," 2009, AMIA 2009 Symposium Proceedings, 5 pages.

Makkonen et al., "Topic Detection and Tracking with Spatio-Temporal Evidence," Department of Computer Science, University of Helsinki, Finland, published Spring 2003, 15 pages.

Fan et al., "Suggesting Topic-Based Query Terms as Your Type," 2010 12th International Asia-Pacific Web Conference, Apr. 2010, 7 pages.

Guha et al., "Propagation of trust and distrust," In Proceedings of the 13th International Conference on World Wide Web, New York, NY, USA, May 17-20, 2004, WWW '04. ACM. New York, NY, pp. 403-412.

Ziegler et al., "Propagation Models for Trust and Distrust in Social Networks" Information Systems Frontiers 7, Dec. 2005, pp. 337-358.

Dai et al, "Mining Anchor Text Trends for Retrieval," Department of Computer Science and Engineering, Lehigh University, USA, Mar. 28, 2010, pp. 127-139.

Ashkan et al., "Classifying and Characterizing Query Intent," University of Waterloo, Canada, Emory University, USA, Apr. 6, 2009, pp. 578-586.

Garfield, "Citation Analysis as a Tool in Journal Evaluation," Essays of an Information Scientist, vol. 1, 1972, 24 pages.

Johnson, Celeb, "Likebutton.me Reveals What Your Friends 'Like' Across the Web," from the internet, http://www.switched.com, Apr. 26, 2010, 8 pages.

Dietz et al., "Unsupervised Prediction of Citation Influences," Proceedings of the 24th International Conference on Machine Learning. Jun. 20, 2007, pp. 233-240.

Huang et al. "Conversational Tagging in Twitter," Proceedings of the 21st ACM Conference on Hypertext and Hypermedia, Jun. 13, 2010, 5 page.

Page, et al., "The PageRank Citation Ranking: Bringing Order to the Web," from the internet, http://dbpubs.stanford.edu/pub, 1998.

Massa et al, "Using Trust in Recommender Systems: An Experimental Analysis," International Graduate School in Information and Communication Technologies, University of Trento, 38050 Povo, Italy, Feb. 26, 2004, 15 pages.

Liu et al., "Co-authorship networks in the digital library research community," 2005, Elsevier, Information Processing and Management 41, 2005, pp. 1462-1480.

von der Weth et al., "Towards an Objective Assessment of Centrality Measures in Reputation Systems," 2007 IEEE, 8 pages.

International Search Report & Written Opinion for Application No. PCT/US2014/017757, Date of filing: Feb. 21, 2014, Applicant: Bottlenose, Inc., dated Jul. 7, 2014, 9 pages.

Exam Report for GB1302155.5, Applicant: Bottlenose, Inc., dated Jun. 26, 2014, 2 pages.

Exam Report for EP12748879.9, Applicant: Bottlenose, Inc., dated Jul. 3, 2014, 8 pages.

Exam Report for GB13156765, Applicant: Bottlenose, Inc., dated Jul. 4, 2014, 3 pages.

Exam Report for EP12749541.4, Applicant: Bottlenose, Inc., dated Aug. 8, 2014, 8 pages.

Exam Report for GB1410563.9, Applicant: Bottlenose, Inc., dated Jul. 30, 2014, 12 pages.

Exam Report for CA2,824,605 Applicant: Bottlenose, Inc., dated Sep. 16, 2014, 4 pages.

Exam Report for CA2,866,615 Applicant: Bottlenose, Inc., dated Oct. 29, 2014, 4 pages.

Exam Report for GB1315674.0, Applicant: Bottlenose, Inc., dated Nov. 13, 2014, 7 pages.

International Search Report and Written Opinion for Application No. PCT/US2013/52981, Date of Filing: Jul. 31, 2013, Applicant: Bottlenose Inc., dated Oct. 8, 2013, 10 pages.

Brdiczka et al., "Automatic Detection of Interaction Groups," ICMI, 2005, 5 pages.

Wyatt et al, "Conversation and Speaker Segmentation in Privacy-Sensitive Situated Speech Data," Interspeech, 2007, 4 pages.

International Search Report and Written Opinion for Application No. PCT/US2013/68810, Date of Filing: Nov. 6, 2013, Applicant: Bottlenose Inc., dated May 7, 2014, 10 pages.

Tao et al., "Selectivity Estimation of Predictive Spatio-Temporal Queries," Proceedings 19th International Conference on Data Engineering, ICDE'2003, Bangalore, India, Mar. 5-8, 2003, pp. 417-428.

(56) References Cited

OTHER PUBLICATIONS

European Search Report for 14151134.5, Applicant: Bottlenose, Inc., dated May 27, 2014, 8 pages.
European Search Report for 14151154.3, Applicant: Bottlenose, Inc., dated May 27, 2014, 8 pages.
Exam Report for EP13749163.5, Applicant: Bottlenose, Inc., dated Jun. 29, 2015, 8 pages.

* cited by examiner

| User Analytics 400 ||
| --- | --- |
| User 402 | Jerry Smith |
| Age 404 | 25 |
| Registered Media Sites 406 | Twitter<br>Facebook |
| Social Influence Score 408 | 35 |
| Interest Profile 410 | NBA (0.5)<br>Basketball (0.4)<br>Whitney Houston (0.3)<br>iPad (0.2)<br>Greece (0.2)<br>Apple (0.2)<br>Romney (0.1) |

*FIG. 4A*

| Message Analytics 430 | | |
|---|---|---|
| Incoming Message 432 | Message x | |
| Action Type 434 | Wall post from friend Alex Smith | |
| User 436 | Michael Fox | |
| Social Media Source 438 | Facebook | |
| Content Source 440 | www.cnn.com | |
| Message Analytics & Metadata 442 | Metadata | Playoffs<br>Knicks |
| | Annotations | News<br>Sports<br>NBA |
| | URL Metadata | Breaking news<br>USA news<br>Sports news<br>Finance news<br>Stock market |
| | Same/Similar Messages (Reposts) | Message A<br>Message D<br>Message E |

*FIG. 4B*

| | Assistant Configuration Settings – Semantic Rules Set 450 |
|---|---|
| IF a Message is received via 452 | one or more social media accounts such as Twitter or Facebook accounts |
| Where one or more of the following conditions are met. 454 | Message was<br><br>(any or all) of<br>    (posted, replied to, reposted, received, liked, annotated, read, saved, tagged, etc.)<br><br>by (any or all) of<br>    (one or more specific people, people I follow, people who follow me, people who follow some person, people with Klout score > x, people near some geographic place, people checked into some present activity, members of a list, any bottlenose user, people who have some attribute, people who do not have some attribute, or any person, etc.) |
| AND/OR: 456 | Message has (any or all) of the following parameters<br>• Type is (video, picture, etc.)<br>• Text contains (some text)<br>• Tags contains (hashtag, subject from taxonomy)<br>• Importance to me > n<br>• Relevance to me > i (Note: rename "Interest score" to Relevance)<br>• URL score is x<br>• Retweet score is y<br>• Popularity > 10 likes<br>• Activity > 3 hits per (minute, hour, day, week)<br>• Posted date is within (last n hours, days)<br>• Within (distance) from (geolocation) --- or some other way of expressing this<br>• Klout score of author is > k<br>• Parameter k has value j (Plugins can add new parameters) |
| THEN do action x 458 | where x could be any or all of such actions as:<br><br>show me the message in a particular view or stream, adjust the relevance or visibility of the message, play a specific sound, alert me by email, alert me by SMS, generate a desktop alert, highlight the message, automatically annotate or tag the message; OR<br><br>repost the message, delete the message, hide the message, file the message, reply to the message, translate the message, change the personalization score of the message, save the message, add the message to my interests, add the author of the message to my interest; OR<br><br>share the message, launch a plugin or another application, call a function, send the message to another application, export the message as data, view the message in a specific viewer, learn something from the message. |

Bottlenose

Home Profile Settings Plugins More

Logged in as luckycharm

Lucky Charm
@luckycharm

Web thought-leader, serial entrepreneur. Follow for views on trends, cool products, social media, tech news, innovation. Full bio: http://luckycharm.com/about
URL: luckycharm.com
show more links 10472 followers
400 following ☒ Thought Leader (62.21)

Follow

Likestream | Interests

☑ All
◇ Article
◇ Audio
◇ Document
◇ How-To
◇ Humor
◇ Top List
◇ Wanted
◇ News
◇ Notification
◇ Opinion
◇ Picture
◇ Q & A
◇ Quotation
◇ Video

All messages, likes and reposts by @luckycharm

- luckycharm I'm going to be launching 3 new companies in the next few months: streamglider.com, bottleno.se, and thedailydot.com ... stay tuned!
  21 hours ago

- luckycharm Brainscan reveals decisions are made unconsciously, in this case, up to 6 seconds before you think you make them. http://bit.ly/hLAOrK
  22 hours ago

- luckycharm Interesting measures of world computing and info storage capacity: http://bit.ly/h6zpTP
  Opinion -- 1 day ago

- luckycharm Uh ohhhhhh......... RT @ nytimesscience: Widespread Human DNA Contamination Seen in Genome Databases http://nyti.ms/fU6kLz
  News, Notification -- 1 day ago

- luckycharm Essay: My Father and Me http://bit.ly/geabYn (in memory of my father, Mayer Charm 1936-2011) -- (updated with working link to article)
  3 days ago

- luckycharm @swiertz you mean the very first link, right? I fixed it. Try again, thanks.
  3 days ago

- luckycharm Essay: My Father and Me http://bit.ly/ijjXB6 In memory of my father, Mayer Charm

Bottlenose

| Browse Plugins | Currently Installed |

Infinite Bottlenose plugins!
Here you can browse for plugins to augment your Bottlenose Experience.

Do you write code? Check out our developer platform!

Trend Radar — *Installed* [Uninstall]
Visually explore your personalized stream.
Author: @bottlenosedev

Google Translate — *Installed* [Uninstall]
Adds an extra message action to translate any message into English.
Author: @bottlenosedev

Video Stream — [Install]
Have all videos in one folder on your main dashboard.
Author: @bottlenosedev

API Status — *Installed* [Uninstall]
Shows the API status of Twitter and Bottlenose in the main dashboard's sidebar.
Author: @bottlenosedev

TwitterCounter Stats — *Installed* [Uninstall]
An overview graph of your current number of followers in the sidebar of your Reposting Dashboard.
Author: @bottlenosedev

Dingbats — *Installed* [Uninstall]
When writing a Tweet, this plugin will substitute common nouns, verbs and other words with their 'Dingbat' equivalent. For example: "My airplane is boarding" will become: "My ✈ is boarding".
Author: @bottlenosedev Home  Profile  Settings  Plugins  More Logged in as luckycharm feedback

Bottlenose

Browse Plugins | Currently Installed

Home  Profile  Settings  Plugins  More     Logged in as luckycharm

Simple Markup  *Pre-installed*
Makes sure that links, users and hashtags are linkable.
Author: @dominiek

Bit.ly URL Shortening  *Pre-installed*
When typing, this plugin will shorten long url's using Bit.ly
Author: @dominiek

Dingbats  *Installed* [Uninstall]
When writing a Tweet, this plugin will substitute common nouns, verbs and other words with their 'Dingbat' equivalent. For example: "My airplane is boarding" will become: "My ✈ is boarding".
Author: @bottlenosedev

TwitterCounter Stats  *Installed* [Uninstall]
An overview graph of your current number of followers in the sidebar of your Reposting Dashboard.
Author: @bottlenosedev

API Status  *Installed* [Uninstall]
Shows the API status of Twitter and Bottlenose in the main dashboard's sidebar.
Author: @bottlenosedev

Google Translate  *Installed* [Uninstall]
Adds an extra message action to translate any message into English.
Author: @bottlenosedev

Trend Radar  *Installed* [Uninstall]
Visually explore your personalized stream.
Author: @bottlenosedev feedback

SYSTEM AND METHOD FOR ANALYZING MESSAGES IN A NETWORK OR ACROSS NETWORKS

CLAIM OF PRIORITY

This application is a Continuation of U.S. application Ser. No. 13/403,937, filed Feb. 23, 2012 and titled "SYSTEM AND METHOD FOR ANALYZING MESSAGES IN A NETWORK OR ACROSS NETWORKS," (8001.US2) which claims the benefit of U.S. Provisional Application No. 61/446,001, filed Feb. 23, 2011 and entitled "INFORMATION STREAM PERSONALIZATION AND FILTERING," (8001.US), U.S. Provisional Application No. 61/449,033, filed Mar. 3, 2011 and entitled "INFORMATION STREAM PERSONALIZATION AND FILTERING," (8001.US1), U.S. Provisional Application No. 61/591,696, filed Jan. 27, 2012, and entitled "TRENDING OF PERSONALIZED INFORMATION STREAMS AND MULTI-DIMENSIONAL GRAPHICAL DEPICTION THEREOF," (8002.US), U.S. Provisional Application No. 61/599,355, filed Feb. 15, 2012 and entitled "INTELLIGENT SOCIAL MEDIA STREAM FILTERING FOR BUSINESS PROCESS ENHANCEMENT," (8004.US), and U.S. Provisional Application No. 61/600,553, entitled "NATURAL LANGUAGE PROCESSING OPTIMIZED FOR MICRO CONTENT," filed Feb. 17, 2012 (8005.US), the contents of which are incorporated by reference in its entirety.

TECHNICAL FIELD

The disclosed technology relates generally to analysis of messages and associated content in a network or across networks to retrieve useful information, and in particular, analysis of messages originating from or directed to online media services.

BACKGROUND

Through web-based media services like Twitter and Facebook, a user is exposed to a vast amount of messages from hundreds if not thousands of online sources and friends, culminating in massive amounts of information overload. Because the distinctions between each social network are not entirely clear, users feel obligated to juggle different applications and social networks just to keep up and be heard everywhere.

It would be one thing if all our social messages were part of a single, pars able, filtered stream. But instead, they come from all different directions. The situation is aggravated by social streams that originate in many competing silos. Users or consumers spend nearly as much time hopping between networks as we do meaningfully digesting and engaging the content within. Furthermore, the cross-posting across networks further exacerbates the noise and redundancy of the various networks and services.

BRIEF DESCRIPTION OF THE DRAWINGS

FIG. 4A illustrates an example entry in a user analytics repository.

FIG. 4B illustrates an example entry in a message analytics repository.

FIG. 4C illustrates a table showing various configuration settings in a semantic rules set.

FIG. 14 depicts an example screenshot showing a panel for accessing various types of content, viewing assistants, a panel for accessing the message or content streams based on the selected content type, and another panel for accessing/viewing the content. Suggested content for a user is selected in this example.

FIG. 16 depicts an example screenshot showing message/content streams categorized based on certain facets in a multi-panel view.

Figure 19:
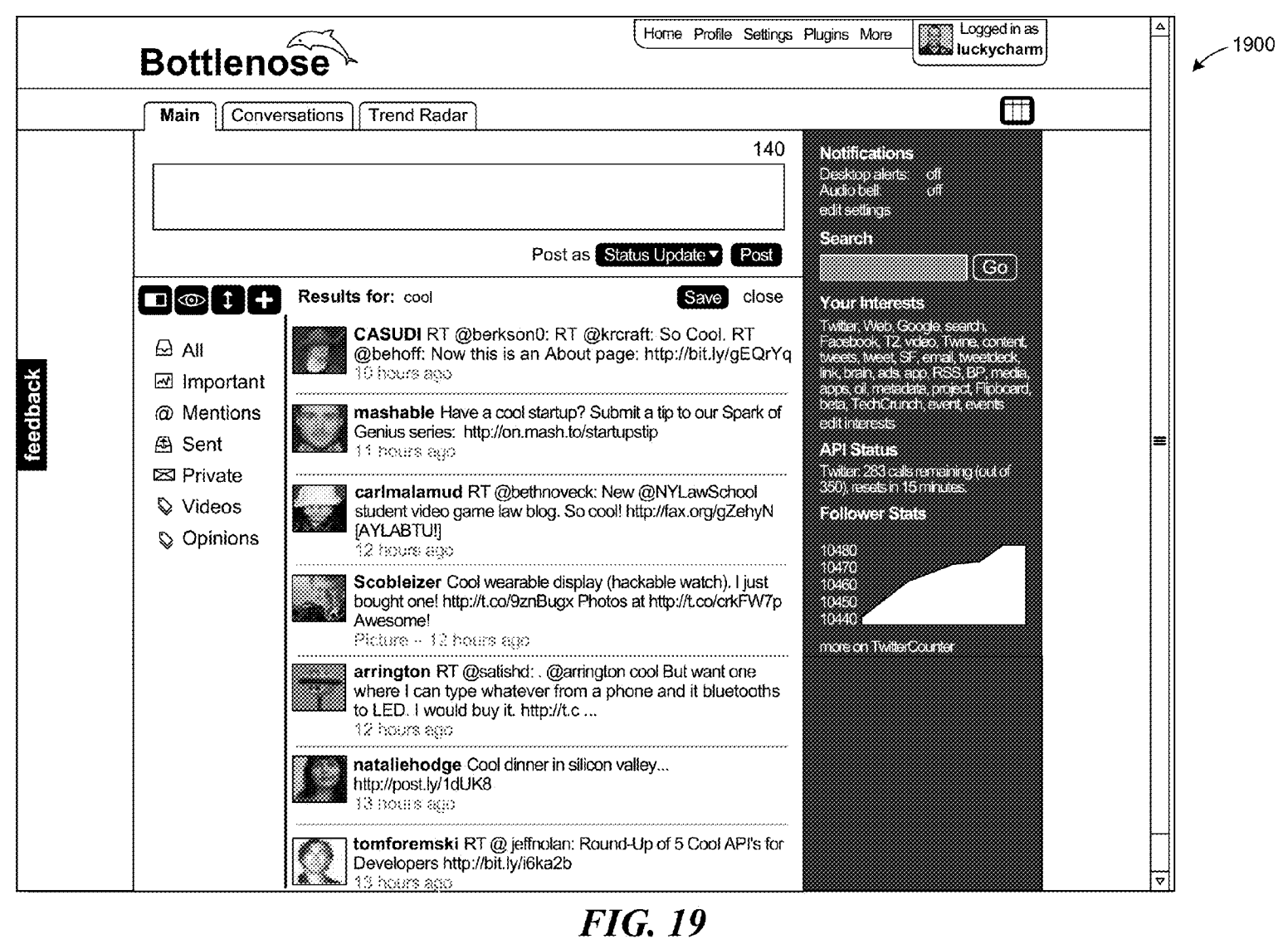
Figure 20:
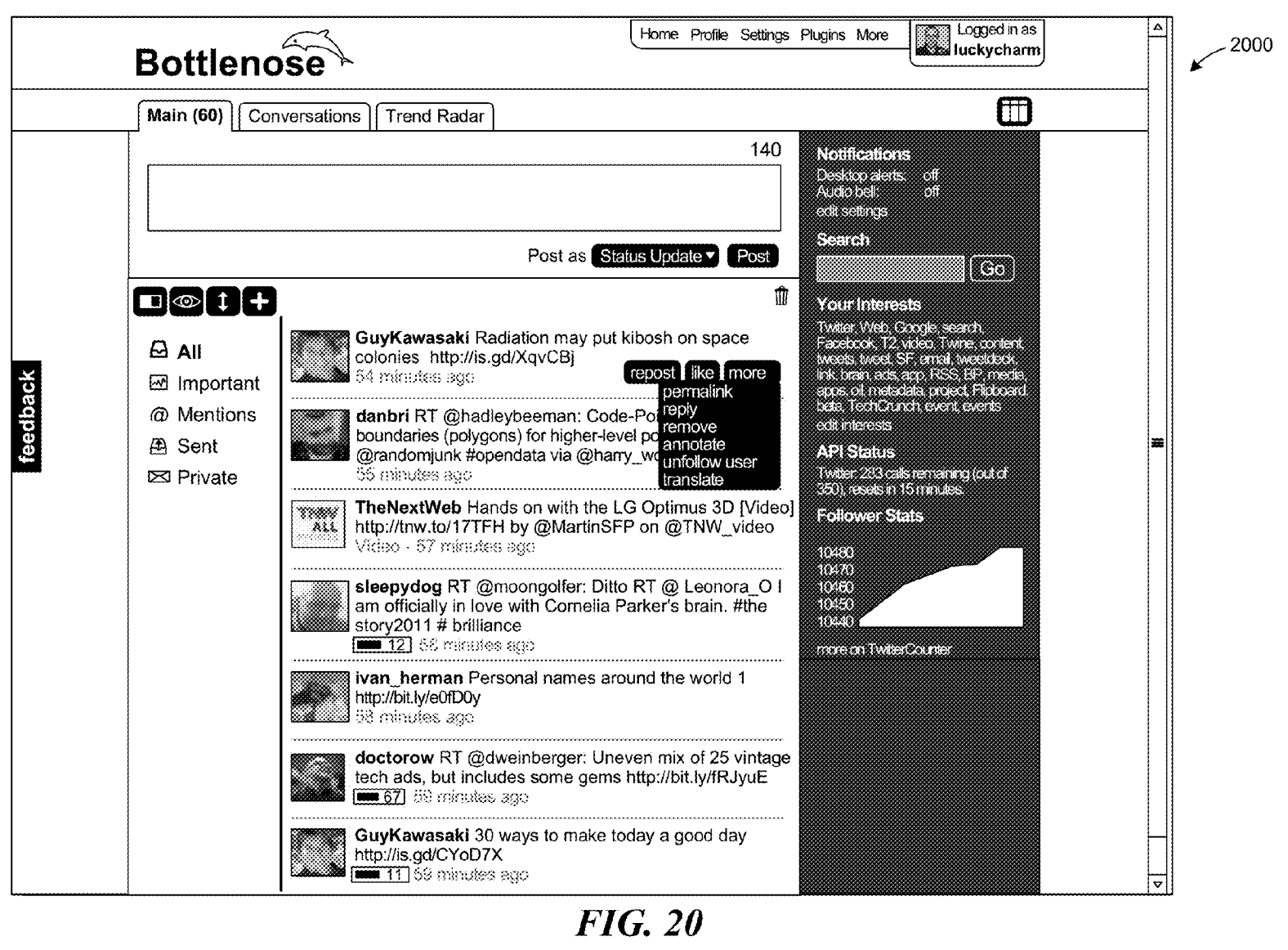
Figure 21:
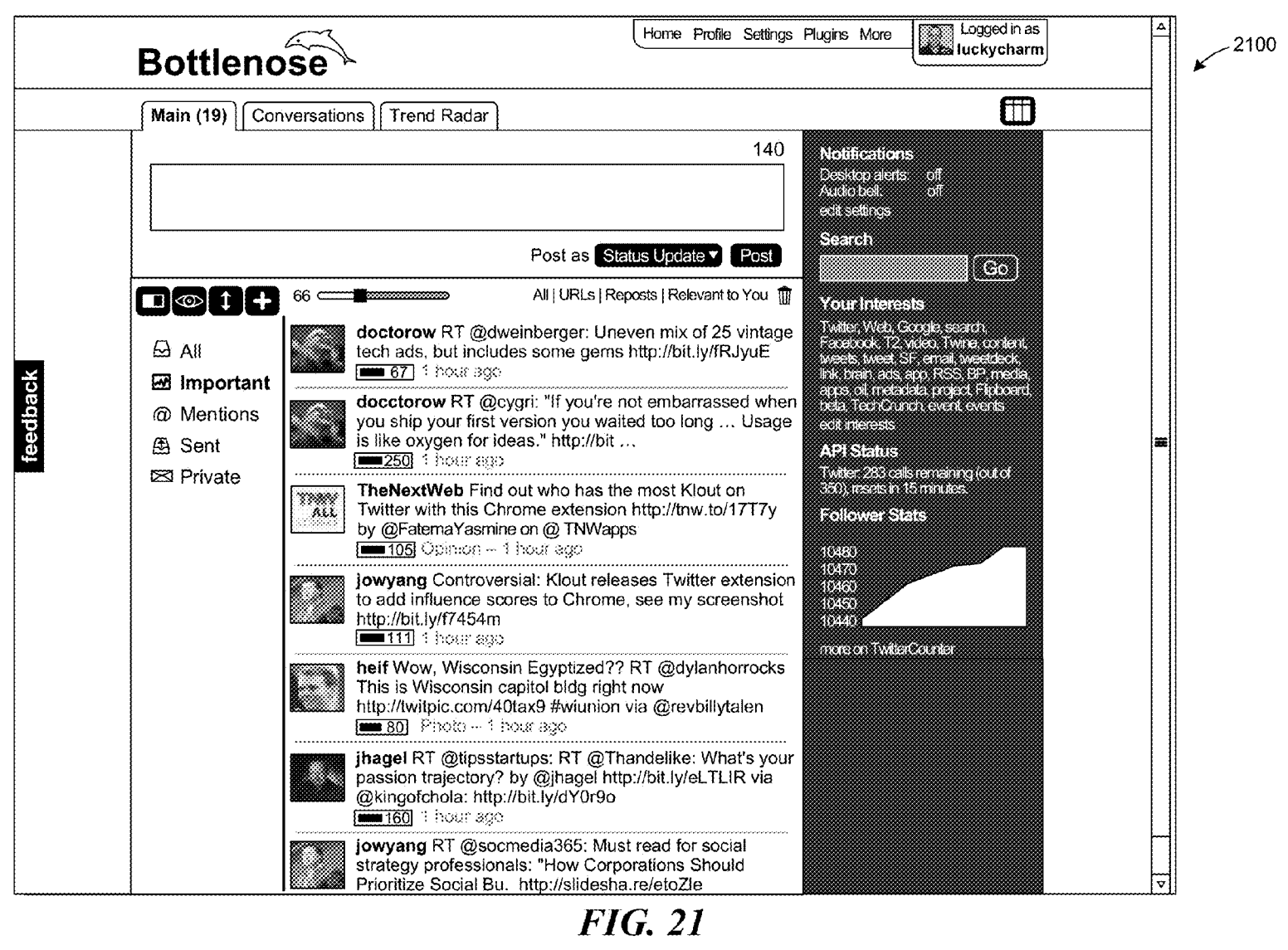
Figure 22:
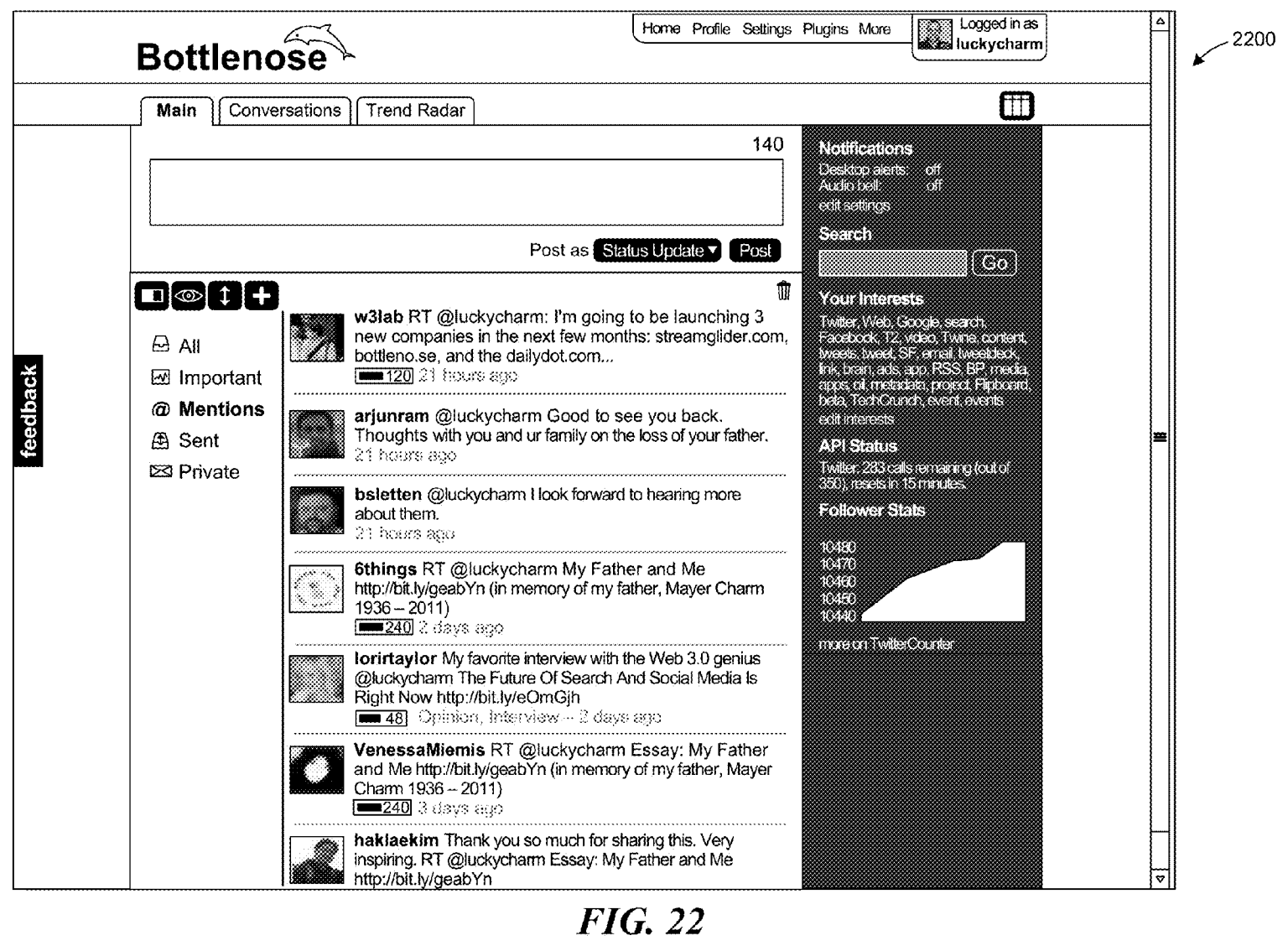
Figure 23:
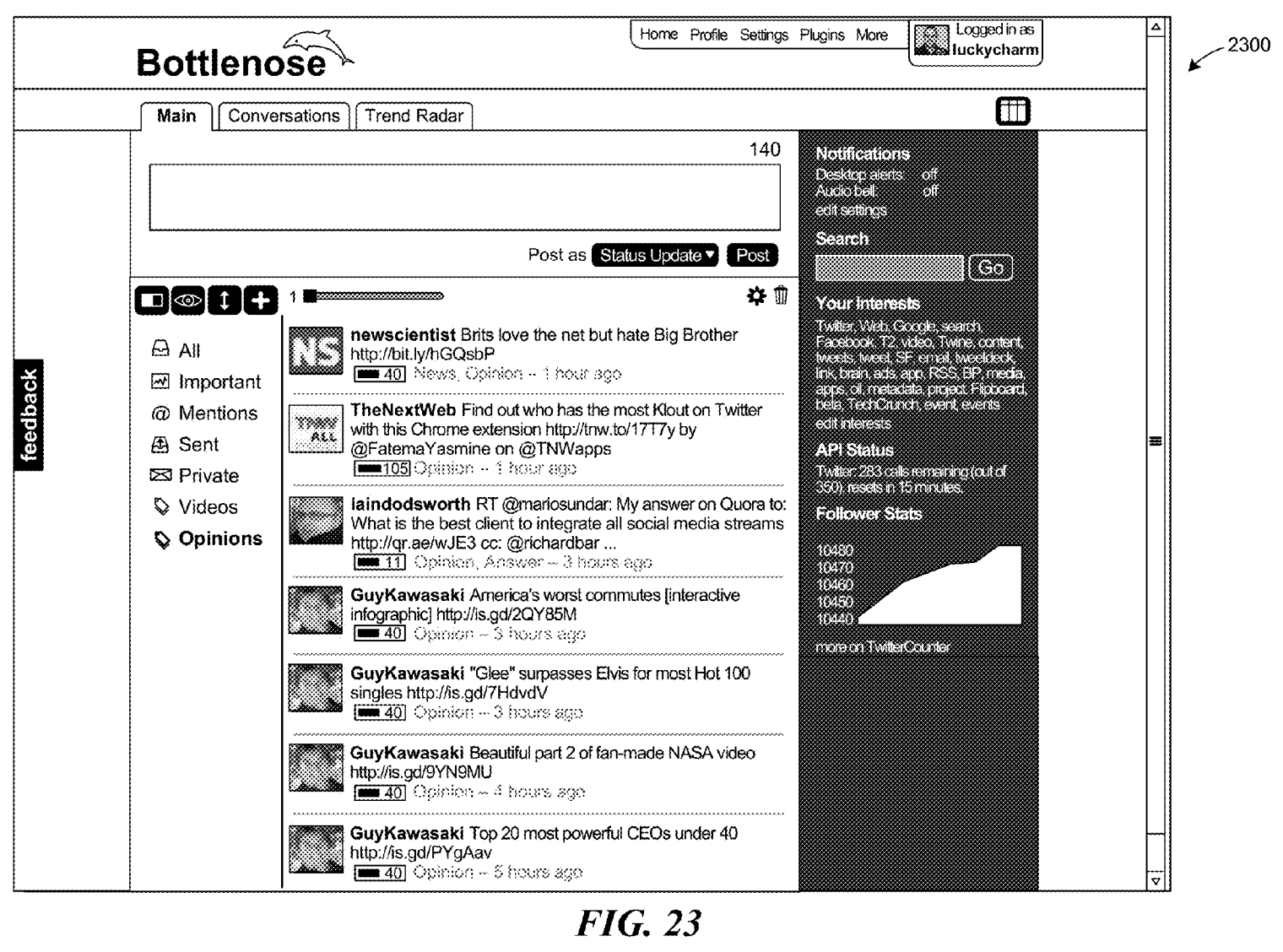
Figure 24:
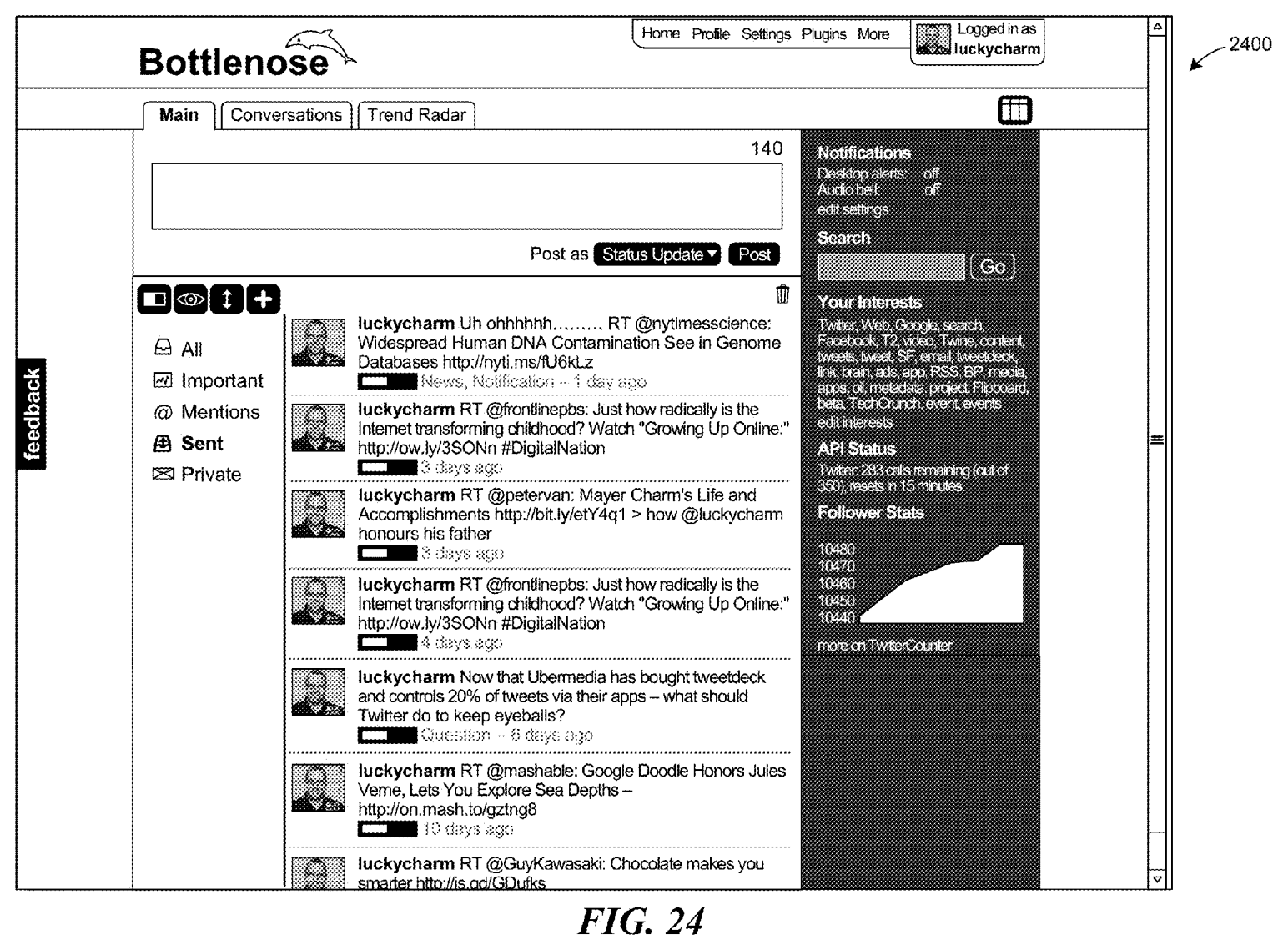
Figure 25:
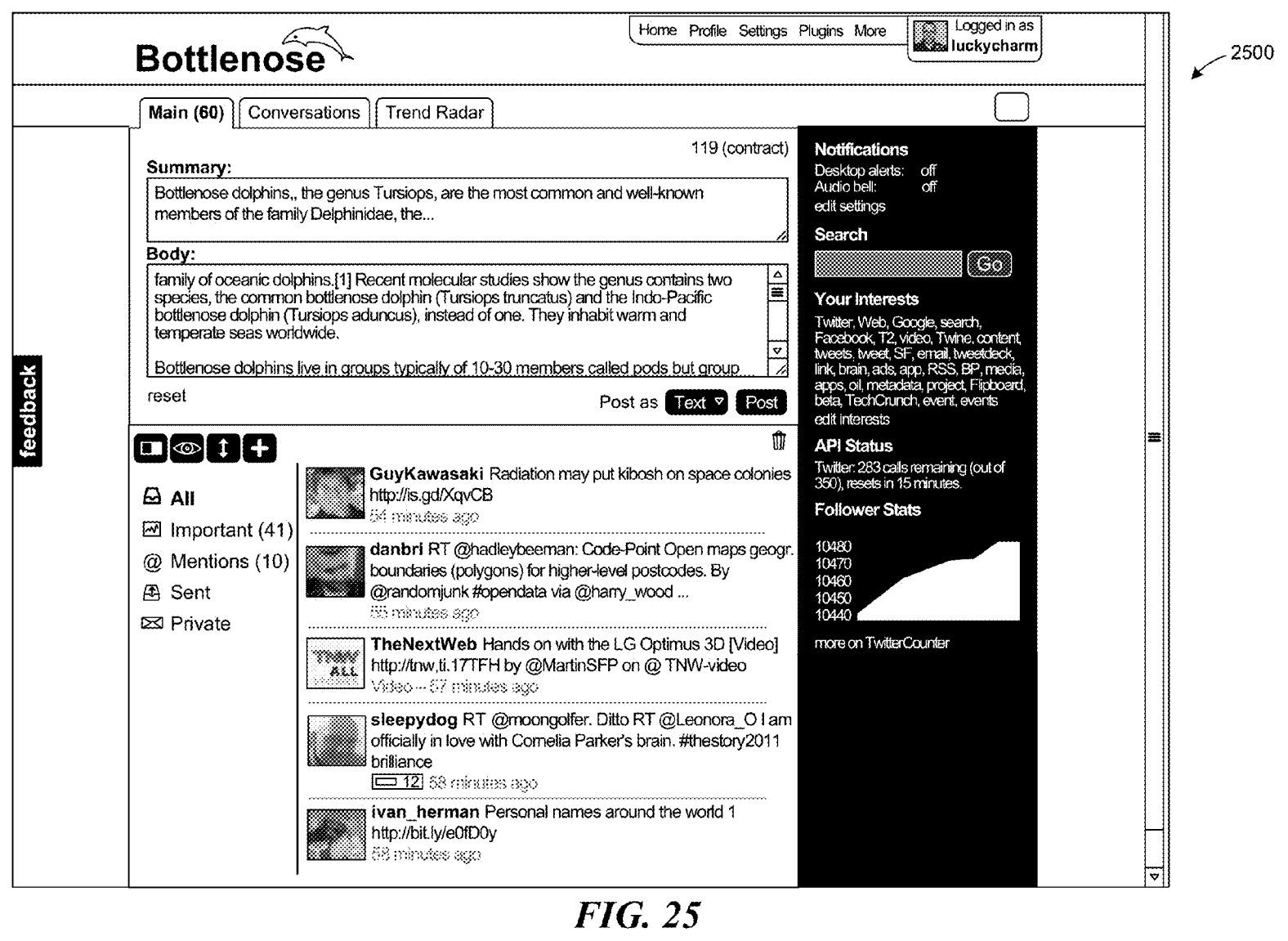

FIGS. 17-25 depicts example screenshots of messages/content streams shown when certain categories are selected (e.g., all messages, important messages, @mentions, sent messages, private messages, videos, opinions, etc.).

FIGS. 36-37 depict example screenshots showing user interface features enabling conversations or interactions with other users.

FIGS. 38-40 depict example screenshots showing a user's 'likestreams' accessible by category.

FIGS. 41-43 depict example screenshots showing graphical representations of a user's interests by category (concepts, tags, mentions, categorized).

FIGS. 44-45 depict example screenshots showing the ability to browse available and installed plug-ins.

DETAILED DESCRIPTION

Figure 1:
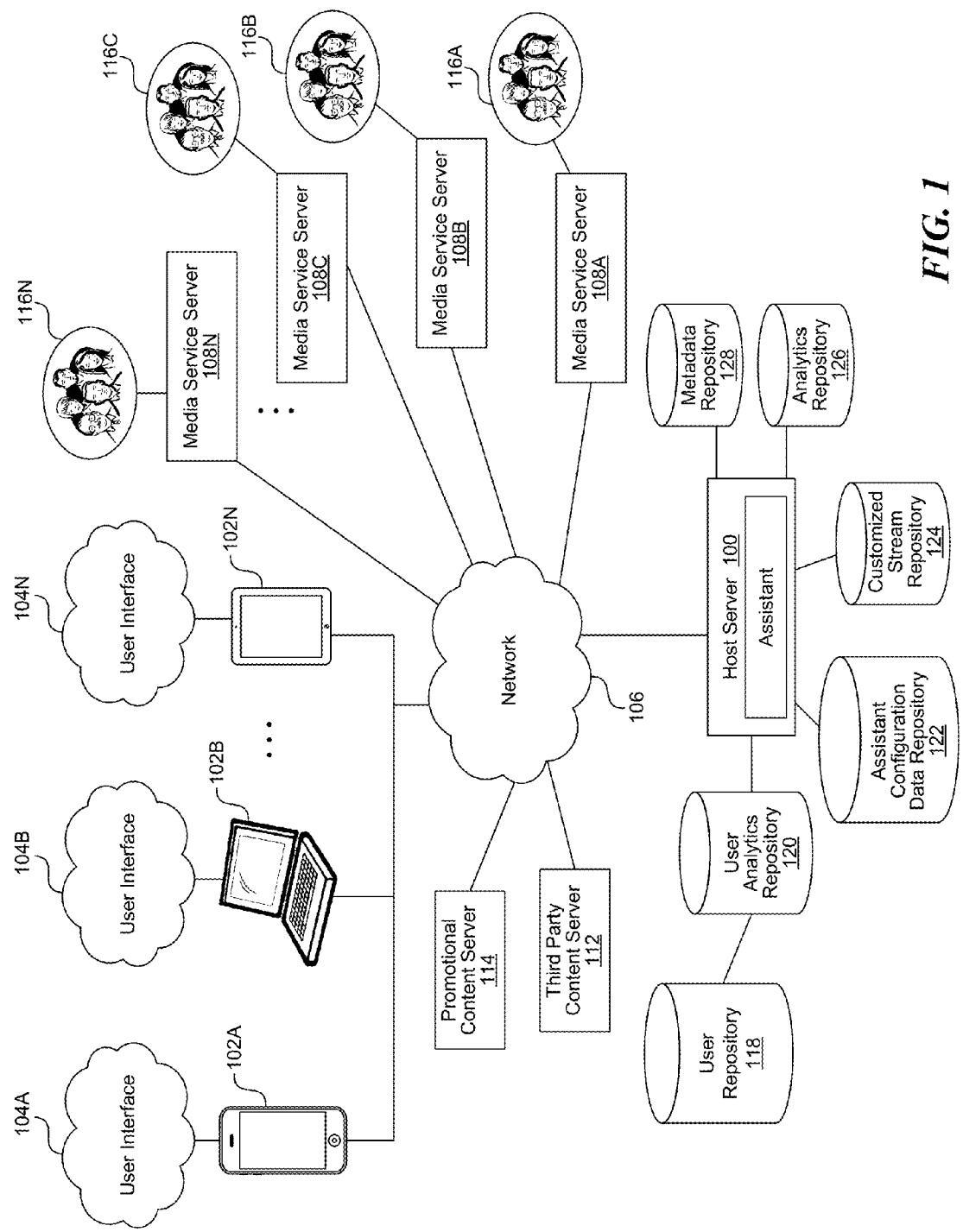
FIG. 1 illustrates an example block diagram of a host server of able to analyze messages in a network or across networks including messages to or from various online media services.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems and methods for analyzing messages in a network or across networks.

FIG. 1 illustrates an example block diagram of a host server 100 of able to analyze messages in a network 106 or across networks including messages to or from various online media services (hosted by media service servers 108A-N), third party content servers 112, and/or promotional content server 114.

The client devices 102A-N can be any system and/or device, and/or any combination of devices/systems that is able to establish a connection with another device, a server and/or other systems. Client devices 102A-N each typically include a display and/or other output functionalities to present information and data exchanged between among the devices 102A-N and the host server 100.

For example, the client devices 102 can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a smart phone, a PDA, a Blackberry device, a Treo, a handheld tablet (e.g. an iPad, a Galaxy, Xoom Tablet, etc.), a tablet PC, a thin-client, a hand held console, a hand held gaming device or console, an iPhone, and/or any other portable, mobile, hand held devices, etc. The input mechanism on client devices 102 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

The client devices 102A-N, media service servers 108A-N, the respective networks of users 116A-N, a content server 112, and/or promotional content server 114, can be coupled to the network 106 and/or multiple networks. In some embodiments, the devices 102A-N and host server 100 may be directly connected to one another. The media services hosted by the media service servers 108A-N can include any online or web-based media services or networking services whereby a crowd or network of users contribute to the distribution of original or reposted content. These media services include, for example, Twitter, Facebook, Google+, Linkedin, and any other sites, services, or platforms where users can share information and networks with other users.

Figure 2A:
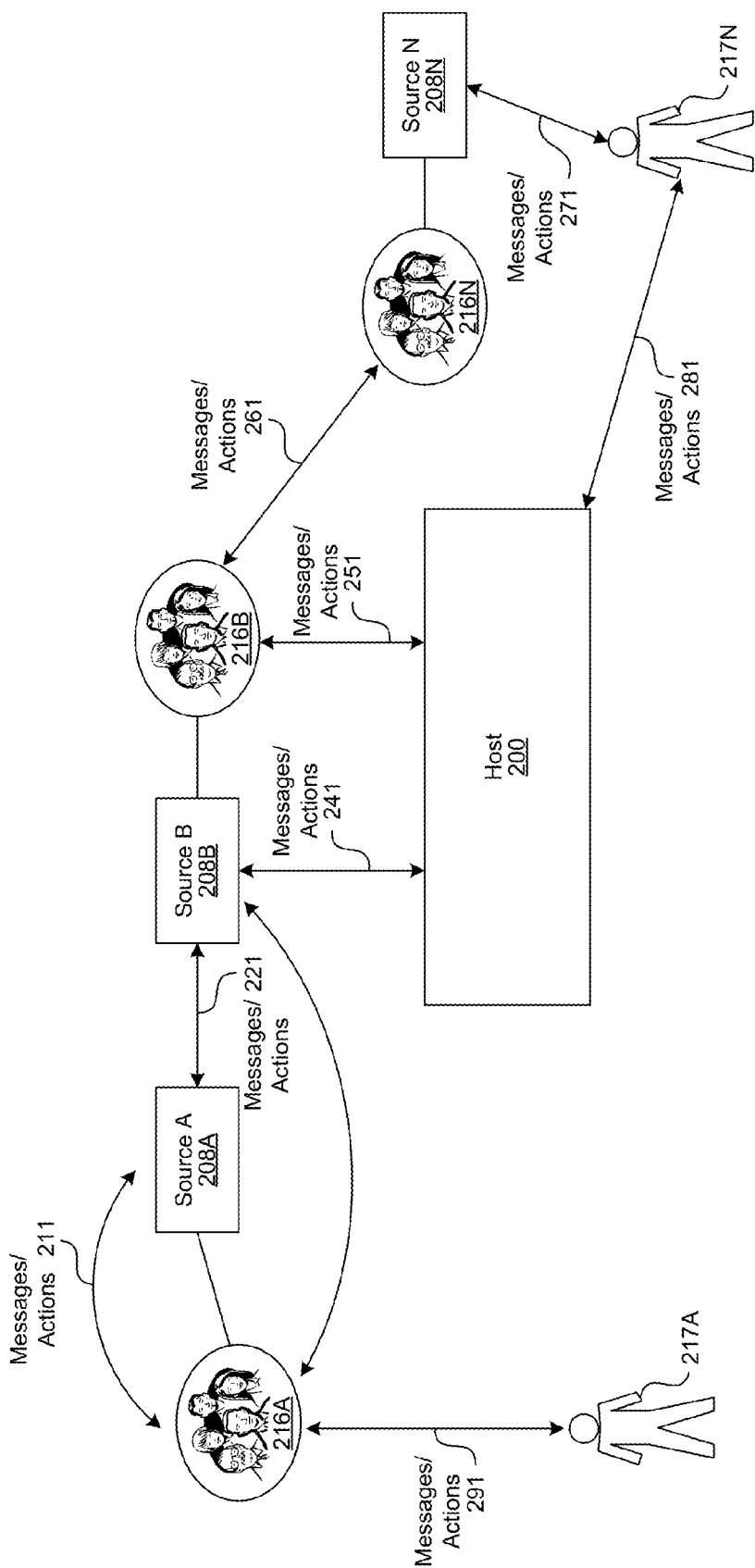
FIG. 2A depicts an example block diagram showing the various origins and destinations of messages which can be analyzed by the host server.

In one embodiment, the host server 100 is operable to analyze streams or sets of messages in a network or across networks to extract statistics to determine useful data such as trends, topics, behaviors, etc. The streams or sets of messages/content can be the target of any online or network-based activity, some of which are illustrated in the example of FIG. 2A. For example, any message or content resulting from or as the basis of activities between users and a network resource (e.g., content provider, networking site, media service provider, online promoter, etc.) can be analyzed for which analytics can be used for various applications including, content/message personalization/customization and filtering, trend/popularity detection (on certain sites (e.g., what's popular on Twitter in the last 2 hours), across all sites or select sets of sites, over a certain time period, in a certain geographical locale (e.g., in the United State), as relating to a certain topic (e.g., what's trending in sports right now), etc.) or a combination of the above. Additional applications include targeted advertising from a user-driven facet, platform-driven facet, timing-facet, delivery-style/presentation-style-facet, advertiser-facet, or any combination of the above.

In general, the host server 100 operates in real-time or near real-time and is able to generate useful analytics/statistics regarding network or online activity to detect current trends or predict upcoming trends for various applications. Delay time analytics and statistics can also be extracted in any specified timing window. In one embodiment, message/content analytics can also be used in generating unique user interfaces and UI features useful for displaying trends or popular topics/types/people/content in an intuitive manner for navigation, as illustrated and will be further described with reference to the screenshots of FIGS. 11-12.

Figure 3A:
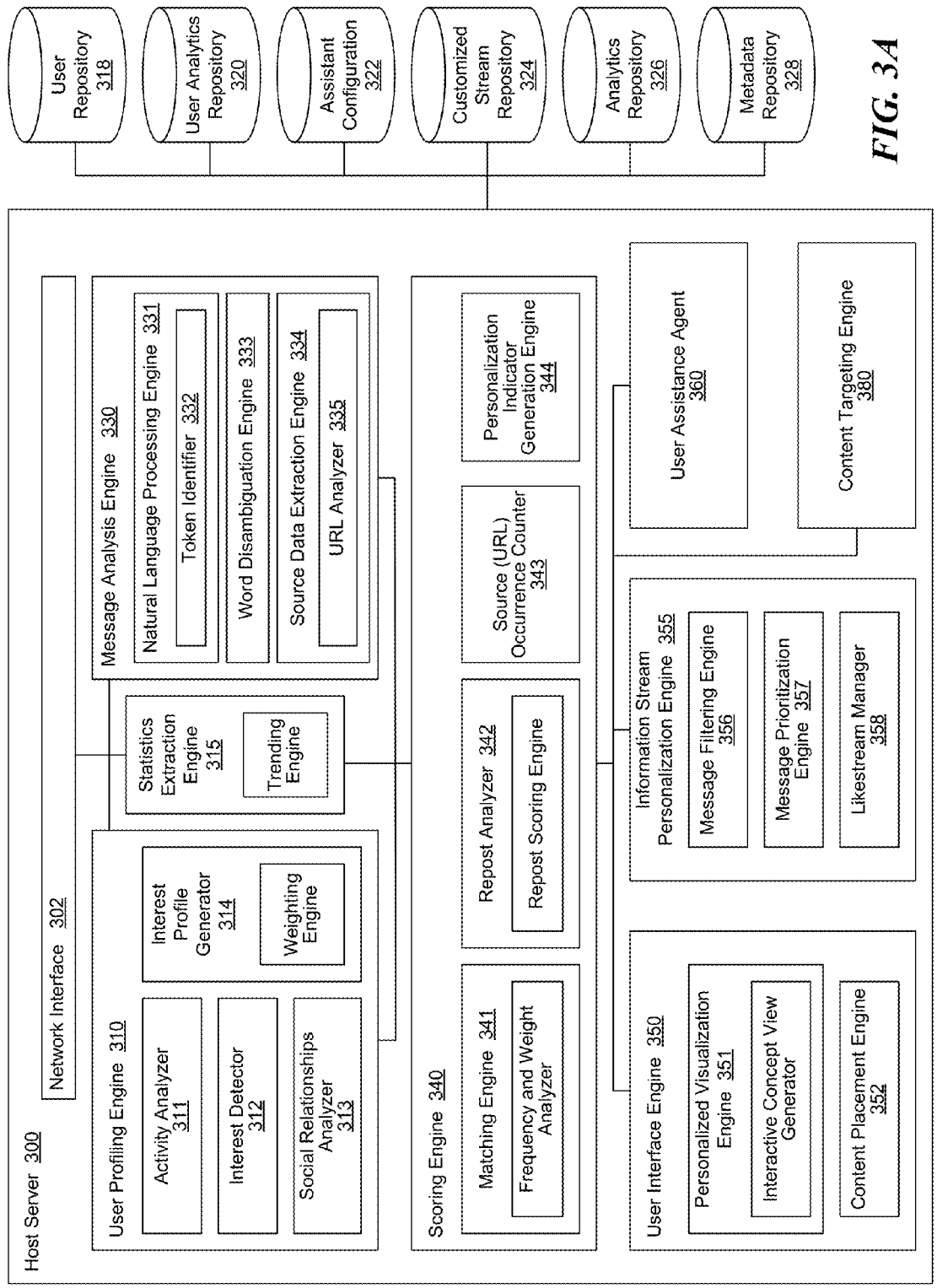
FIG. 3A depicts an example block diagram of a host server able to analyze messages in or across networks for various applications.
Figure 3B:
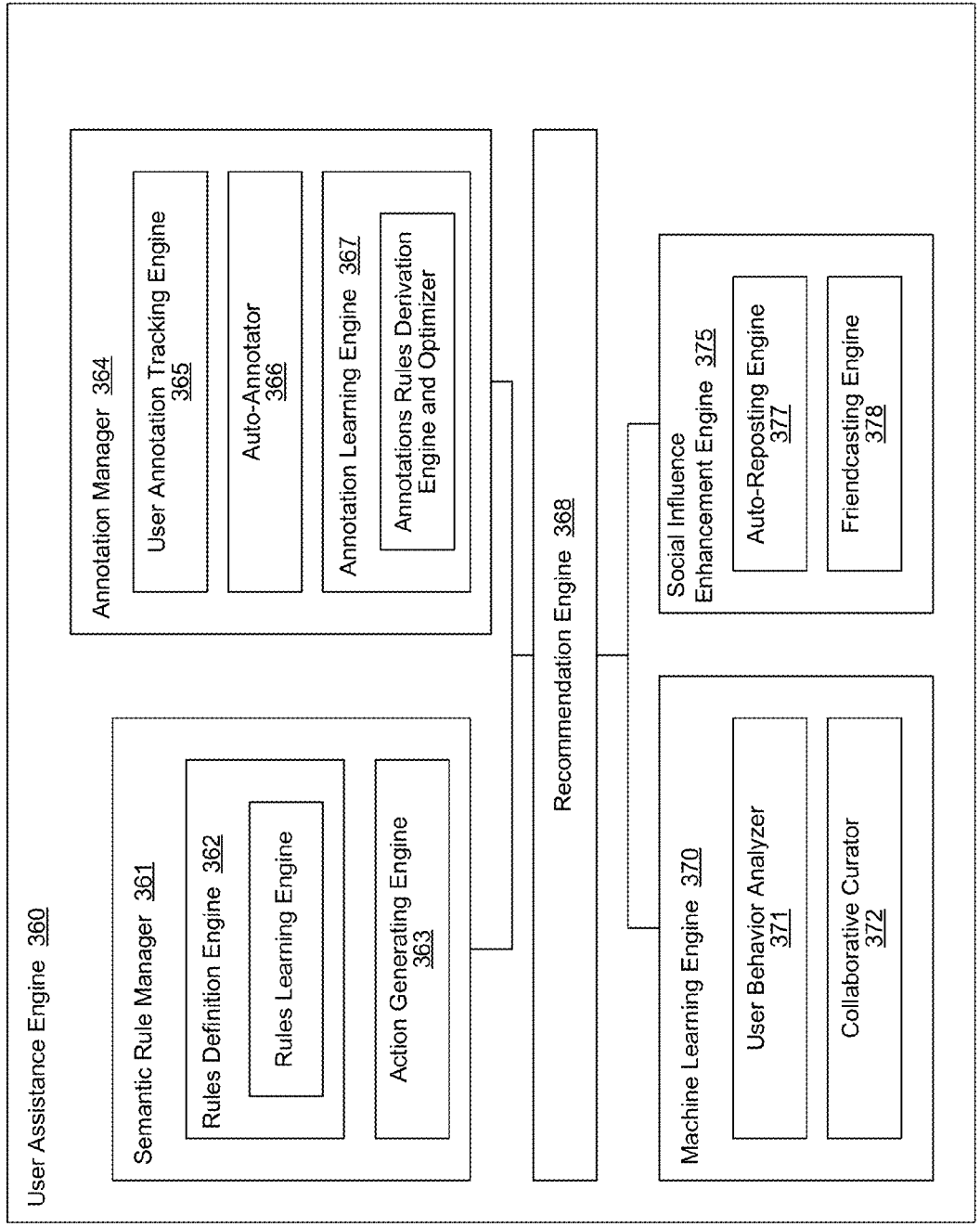
FIG. 3B depicts an example block diagram of the user assistance engine in the host server able to perform various customized actions on messages including to personalize and/or filter messages for users.

Functions and techniques performed by the host server 100 and the components therein are described in detail with further references to the examples of FIGS. 3A-B.

In general, network 106, over which the client devices 102A-N, the host server 100, and/or various media service servers 108A-N, content server 112, and/or promotional content server 114 communicate, may be a cellular network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102 and the host server 100 and may appear as one or more networks to the serviced systems and devices. In one embodiment, communications to and from the client devices 102 can be achieved by an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, IMT-Advanced, pre-4G, 3G LTE, 3GPP LTE, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

The host server 100 may include internally or be externally coupled to a user repository 118, a user analytics repository 120, a configuration data repository 122, a customized stream repository 124, an analytics repository 126 and/or a metadata repository 128. The repositories can store software, descriptive data, images, system information, drivers, and/or any other data item utilized by other components of the host server 100 and/or any other servers for operation. The repositories may be managed by a database management system (DBMS), for example but not limited to, Oracle, DB2, Microsoft Access, Microsoft SQL Server, PostgreSQL, MySQL, FileMaker, etc.

The repositories can be implemented via object-oriented technology and/or via text files, and can be managed by a distributed database management system, an object-oriented database management system (OODBMS) (e.g., ConceptBase, FastDB Main Memory Database Management System, JDOlnstruments, ObjectDB, etc.), an object-relational database management system (ORDBMS) (e.g., Informix, OpenLink Virtuoso, VMDS, etc.), a file system, and/or any other convenient or known database management package.

In some embodiments, the host server 100 is able to provide data to be stored in the user repository 118, the user analytics repository 120, the configuration data repository 122, the customized stream repository 124, the analytics repository 126 and/or the metadata repository 128. The user repository 128 and/or user analytics repository 120 can store user information, user profile information, demographics information, analytics, statistics regarding consumed content and posted content, user influence, usage trends, trending topics, search terms, search trends, user response rates, topics of interest, online activity profile, topics of expertise, social relationships, friends on various networks or online media sites, social statistics (growth in friends, change in influence, level of sentiment or trust about them from others, where they fit in the social graph, who they are related to, who they are similar to), etc.

One embodiment further includes the assistant configuration data repository 122 which can store rule sets which specify actions to be performed on a message based on a detected condition or sets of conditions, for a given user or users meeting certain criteria, etc. The rule sets can be user defined or machine created (e.g., from machine learning user behavior or aggregate user behavior) to customize the way messages and content from various sources are organized and presented to a user or groups of users. The customized stream repository 124 can store streams of messages or content that is personalized or customized to individual users including streams with liked content, filtered content, categorized based on topic, type, content, associated users, people, related sites or sources, and/or prioritized content based on relevance or importance.

One embodiment further includes the analytics repository 126 which can store analytics or statistical data regarding messages, content, websites, searches, media network activity, or any online or network activity surrounding messages, content, people, events, online media sites, social media sites, content providers, any other third party services or online services, etc. The metadata repository 128 stores metadata for online content and messages. The metadata can be machine annotated or user annotated and can include both static and/or dynamic metadata which specifies semantic type or attributes of messages or other content.

Specifically, the metadata can be extracted or attached to messages/content in or across networks 106 by the host server 100. Metatdata can also include formatting and display information such as a custom avatar image, background, layout, font choice, stylesheet or CSS attributes. Message metadata can be extended by plug-ins as well, enabling additional layers of metadata and functionality to be added to messages via the host server 100.

Additional details of examples of types of data stored in repositories are illustrated with further reference to database entries shown in examples of FIG. 4A-FIG. 4C.

FIG. 2A depicts an example block diagram showing the various origins and destinations of messages/actions and/or content that are the subject of online or network activity. Any message/action/content that is the subject of online or network activity which is user-driven or machine-driven can be detected and analyzed by the host server 200 to extract useful information for trending, personalization, customizing, or filtering purposes. The content sources 208A-N and users 216A-N and 217 can be destinations/origins of any message/content or be the originator/recipient on an action performed on a message/content.

Actions can include, by way of example but not limitation, posted, replied to, reposted, received, liked, annotated, read, saved, favorited, bookmarked, viewed, deleted, tagged, commented, tweeted, linked, searched for, etc. Messages and/or content can generally include, messages associated with video content, messages associated audio content, and messages associated photos, any message interacted with by humans or machines, user profiles, user events, user likes or dislikes, status updates, mentions, news, news feeds, current events, breaking news, tweets, messages associated links, notes, web pages, documents, email messages, comments, chat messages/logs, SMS messages, etc.

Messages or content 211 can be sent between a network of users 216A of a content source A 208A (e.g., an online networking site or other content sharing/networking sites) or be the subject of online activity by users 216A of the online site of content source A 208A. The messages and/or content 221 analyzed can also be transmitted between sites (e.g., source A 208A and source B 208B).

The messages and/or content can include messages 291 acted upon between a user 217A and a social network of user 216A, messages 231 between a social network of users 216A and a different online network site (e.g., content source 208A), messages 241 acted upon between the host 200 and a content source (e.g., content source B 208B), messages/content 251 between a network of users 216B (e.g., users of Facebook or Twitter) and host server 200, messages/content 261 acted upon between users of different online networks (e.g., 216B and 216N), or messages/content 271 between any user 217N (e.g., a user who is not necessarily part of a given social network or any social network) and a source N 208N, or content/messages 281 between any user 217N directly to the host 200.

Figure 2B:
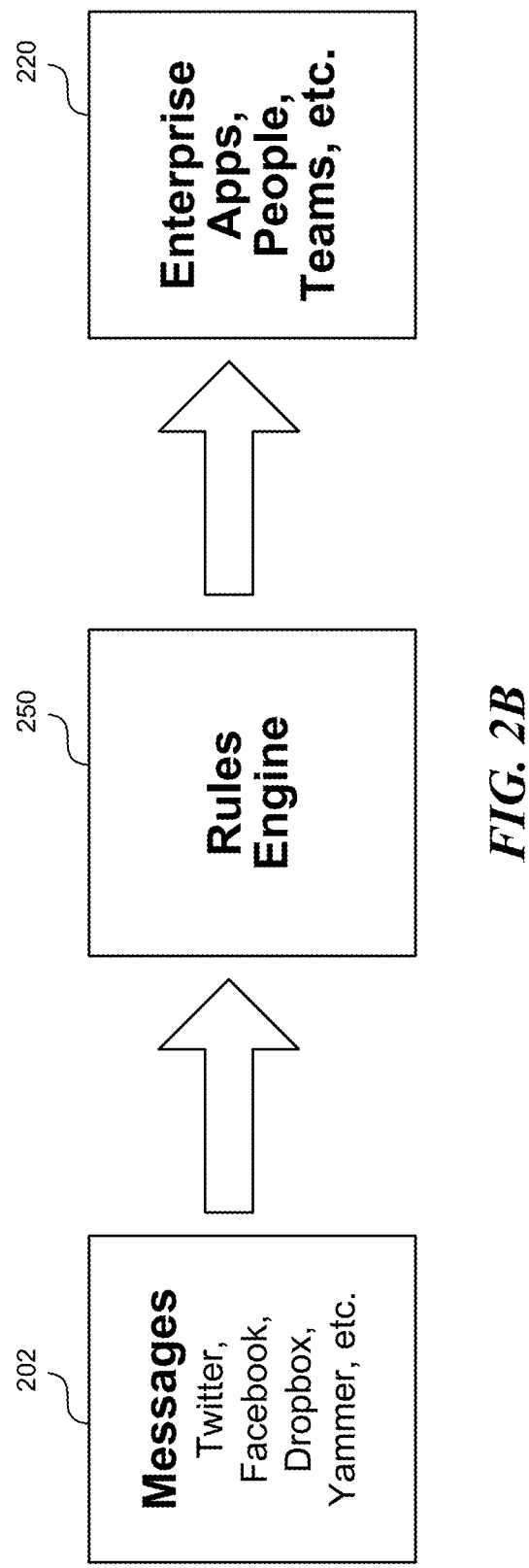
FIG. 2B depicts a diagram showing examples of media services whose messages can be analyzed for various applications.

FIG. 2B depicts a diagram showing examples of media services whose messages can be analyzed for various applications. The set of messages/content in question can be analyzed in accordance to set of rules applied by the rules engine. The results of the analysis and statistics can be used in various applications including individual users, for enterprises/companies or organizations, for teams of people or for specific applications, for detecting, identifying trends, filtering/prioritizing according to topics/trends/what's popular, and for generating interactive user interfaces which depict trends or popular topics/ideas/concepts updatable in real time or near real time. The interactive UI may also be actionable to navigate to or through related topics, tags, ideas, people, users, or content.

FIG. 3A depicts an example block diagram of a host server 200 able to analyze messages in or across networks for various applications.

The host server 300 can include, for example, a network interface 302, a user profiling engine 310, a message analysis engine 330, a scoring engine 340, a user interface engine 350, an information stream personalization engine 355, a user assistance agent 360, and/or a content targeting engine 380. Additional or less components/modules/engines can be included in the host server 300 and each illustrated component.

The network interface 201 can be a networking module that enables the host server 200 to mediate data in a network with an entity that is external to the host server 200, through any known and/or convenient communications protocol supported by the host and the external entity. The network interface 201 can include one or more of a network adaptor card, a wireless network interface card (e.g., SMS interface, WiFi interface, interfaces for various generations of mobile communication standards including but not limited to 1G, 2G, 3G, 3.5G, 4G, LTE, etc.), Bluetooth, a router, an access point, a wireless router, a switch, a multilayer switch, a protocol converter, a gateway, a bridge, bridge router, a hub, a digital media receiver, and/or a repeater.

As used herein, a "module," a "manager," an "agent," a "tracker," a "handler," a "detector," an "interface," or an "engine" includes a general purpose, dedicated or shared processor and, typically, firmware or software modules that are executed by the processor. Depending upon implementation-specific or other considerations, the module, manager, tracker, agent, handler, or engine can be centralized or its functionality distributed. The module, manager, tracker, agent, handler, or engine can include general or special purpose hardware, firmware, or software embodied in a computer-readable (storage) medium for execution by the processor.

As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

One embodiment of the host server 200 includes the user profiling engine 210. The user profiling engine 210 can be any combination of software agents and/or hardware modules (e.g., including processors and/or memory units) able to detect, aggregate, generate, create, predict, retrieve, determine, identity user interests and creating a profile from the user's interests, based from a user's online or network-based activities.

The user profiling engine 210 can, for example, determine the interests of a user without requiring any interaction other than to provide an online identity (e.g. Twitter or Facebook username or other online sites). The user profiling engine 210 can generate an interest profile (e.g., via the interest profile generator 214) with a list of concepts/topics that are of interest to a user. The concepts that are listed may be weighted (e.g., by the weighting engine) in accordance with level of relevance or level of interest to the user. For example, if a user is interested in the company "Microsoft" as detected from his/her feeds, status updates, messages, emails, etc. this word can appear in that profile, and it can be further weighted based on a level of interest as compared to other concepts/topics in the user's interest profile.

The user profile further includes an activity analyzer 211 which detects various user activities online for use in analyzing user behavior to detect/identify user interests in generating the interest profile. The activities that can be detected and analyzed include, by way of example, posted a message, shared a message, liked a message, favorited a message, tagged a message, annotated a message, rated a message, and commented on the message, replied to the message, viewed the message, saved or bookmarked the message.

The activities can also include activities/social relationships relating to other users as detected or analyzed by a social relationships analyzer 213 of the user profiling engine 210. For example, people parameters of people who interacted with a message, people who a user is friends with or connected to, followed people, following people, people who follow specified other people, people with a certain social influence level, geographical parameters of the people, membership or group affiliation, degrees of separation, screen name of an author, author follower count, author following count, author average messages per day.

User interests can be detected by the interest detector 212 by analyzing user content provided in the online activity at or via the online media services, the user content including user-submitted content or user-generated content. The interests of the user can also be determined from other users with whom the user is connected or is friends in the online media services.

The statistics extraction engine 215 reviews the results of the analysis and extracts quantitative information about the user and the associated interests. In one embodiment, the interests of the user are represented by concepts weighted according to analysis of user content which is subject of the online activities at the online media services, an example of which is illustrated in a data entry for user analytics shown in FIG. 4A. Weights can be assigned by the weighting engine based on results of activity and message analysis.

The statistics or any qualitative data computed as a function of time in a given time period or in real time can be used to detect trends (e.g., via the trending engine), potential trends or upcoming trends from any set of messages or online activity. For example, sets of messages relating to a given user can be analyzed to identify trends in the user's interest. Messages/content relating to a given platform can be analyzed to detect what is popular on that site right now. Messages/content relating to a specific topic (e.g., sports) can be analyzed to identify what's currently popular or trending in sports news.

Concepts or topics can be identified from messages by the message analysis engine 230 through natural language processing (e.g., by the natural language processing engine 231). The identified concepts or topics can be used to build a user's interest profile or to determine the related concepts/ideas of a given message, or piece of content to further determine appropriate action. When using message analysis to build an interest profile for a given user, the following steps can be performed:

1) Retrieve messages acted on (e.g., written, liked, commented, etc.) by user X. 2) For each message, detect language tokens (e.g. semi-colons, comma's, whitespaces, others, etc.) and identify social network tokens (e.g., hash tags, @ tags, + tags, or other tags, URLs/URIs, usernames, emoticons, micro-syntax, etc.). 3) For each message, assign part-of-speech tags to words using, for example, a dictionary (e.g. noun, adjective, verb, pronoun, unknown). 4) Collect nouns, pronouns and/or unknown words from all messages and take the most frequently occurring N words. 5) Refine/optimize this list of words by omitting common words and written expressions using dictionaries. The resulting interest profile will have a list of words. Each word can be assigned a weighting which is based on how often that word occurred in user X's online activity.

In general, the above analysis process can be applied to any set of messages to retrieve a list of words which can represent the common or frequently occurring topics, themes, concepts, places, people, or things, etc. Such detection can be used to detect, identify, predict, determine trends, upcoming trends, and/or popular topics/themes/concepts from any set of messages. The set of messages can be relating those across multiple platforms/services (e.g., all messages/content/activity on Twitter, Facebook and Linkedin in the last 10 hours), across a given platform/service (e.g., all activity on Twitter in the last 2 hours), across one or more platforms/services in a given geographical local (e.g., all activity on Twitter, Facebook in San Francisco), across one or more platforms/services for a given user, or a specific group of users, across one or more platform/services as pertaining to a specific topic (e.g., US Open, NBA, etc.), or any combination of the above parameters.

For example, a user can choose to detect trends in activities for people or a group of users that he follows on Twitter, or to access trends from last week. Changes in trends can also be determined, the strength of a given trend (e.g., how rapidly some topic/concept is becoming popular) can also be computed by performing quantitative analysis on messages/content and other activities occurring across a single network or multiple networks and any number of social media platforms.

In one embodiment, the concepts that are detected can be filtered/optimized from messages/content through disambiguation of a given keyword having multiple meanings (e.g. via the word disambiguation engine 333). For example, the word "Java" has multiple meanings/contexts including, for example, Java, the island in Indonesia, is it Java, the programming language. In this instance, disambiguation processes can be performed to determine which meaning of the word is applicable.

In some instances, disambiguation can be performed by analyzing the surrounding words in the sentence that the word occurred in. In this example, the surrounding sentence could be "I'm traveling to Java next week." VS "I was programming Java all day," which allows a system to decide the correct definition of the word.

In one embodiment, when the user profiling engine 310 builds an interest profile for the user, all words that are found are generally of interest to a user. So for this collection of words, the word disambiguation engine 333 can use the user, or the rest of the messages, as a context to disambiguate the meaning of the words. For example, in one embodiment, a large dictionary of known words and related categories can be locally stored, externally accessed/queried. For example, the dictionary can be synthesized by combining an encyclopedia's (e.g., Wikipedia or other databases) list of topics with the categories those topics belong to.

For messages/content pertaining to a user X, or for any given set of messages, there are a list of words P that need to be disambiguated. For each word in this list, all possible meanings can be retrieved. In this example, this would be "Java (programming language)", "Java" (the island). In one embodiment, for each meaning of each word, a list of all related categories can be determined and stored. In our example this would be "Programming, Computing, Programming Languages, etc." and "Indonesia, Asia, Country, Geography".

For the words in P, it can then be determined those categories that are most frequently occurring. This can be performed by counting and tracking the occurrences of each category across the words in list P. In one embodiment, the amount of category occurrences can then be used to assign a score to each meaning of each word. In this example, if "Programming" occurred multiple times, the meaning "Java (programming language)" will get a higher score. Therefore making this the most correct meaning of the word Java in a set of messages pertaining to user X, or any given set of messages.

In addition, in one embodiment, message analysis includes using information about the message source to detect and retrieve relevant information. For example, additional information about messages can be determined by retrieving and analyzing data for relevant URLs which host the message or content. In one embodiment, each URL or other types of content sources for a set of messages can be analyzed to retrieve and store the information. In addition, browser extension (e.g., bookmarklets) can be used to facilitate this.

For example, browser extensions can be provided to the users to share pages that they like when browsing the internet. In the background however, (without bothering the user), this extension can analyze the page, extract relevant meta-data (e.g. title, description, author, popularity, type, fields, media, etc.). The extracted information about the content source (e.g., URI or URL) can be sent to the host 300 and stored in a repository (e.g., the metadata repository 328).

The scoring engine 340 can determine the relevance of any message/piece of content to a given concept/theme/trend/topic/person/place, etc. The computed relevance of content/message to a concept can be used for various applications including, placement of the content/message (site, person, timing, etc.), retrieval of the content/message when relevant (e.g., when a search is conducted for the topic or a related topic, when a related topic is queried or selected, when the topic itself if queried or selected), placement of promotional content, relevance to a group of users, personalization of message streams for users through filtering and prioritization, etc.

In one embodiment, the scoring engine 240 can generate a score by matching message content against an interest profile or one or more concepts/topics/themes. The interest profile may be for a specific user or for a specific group of users, or just for any given context. The matching can be performed by the matching engine 241 by performing natural language processing to extract relevant concepts from the message or other content. These relevant concepts are then assigned a score by the scoring engine 340 based on, for example, the frequency with which a word occurs in a given interest profile (e.g., by the frequency and weight analyzer) and any associated weighting of the occurred word inside the interest profile (how interesting is that to the user or the query being made which is represented by the interest profile). In some instances, more than two occurrences or more can progressively increase the score.

In one embodiment, the scoring engine 340 modifies or determines the relevancy score based on any reposts (e.g., via the repost analyzer 342). For example, the repost analyzer 342 can compute or otherwise determine the number of times a given post or message occurred in other messages coming from connections or friends relevant to a given context (e.g., people in a certain user group, people with certain interest, people connected/friends with a given user, etc.). In order to compute the score based on reposts, the number of similar messages can be determined. However, in general, when users repost a message, they often modify the original message to make it fit within a certain character limit. Therefore simply finding messages with the same text might yield poor results since exact messages will only be found in limited numbers.

As such, for a reposted message R, a search needs to be done across all stored messages M. If there is a match, the Repost Score can be incremented and a similarity link can be stored by the repost scoring engine. In one embodiment, this can be performed by retrieving all stored messages M and compare each M to R and identifying the M that had the most words in the sentence that matched. In another embodiment, a database full-text 'OR search' can be performed with all words in the sentence of R. Then, rank the results according to the number of keywords that matched and select the top matching results as similar messages.

In one embodiment, for a reposted message R, a natural language processing tool can be used to extract words, keywords, symbols, and/or tokens for that message. The words/keywords can include, but are not limited to: Nouns, Proper Nouns and Adjectives; the tokens include, but are not limited to: URLs, hashtags, user names, emoticons or other symbols. The repost analyzer 342 can then sorted and packed the tokens and/or keywords/words together into a repost index RI which can be generated for each message in M. The Repost Score can now be determined by performing a single database lookup on RI in M. Such a query is resource and time efficient since it is an exact match on a database field that can be indexed a second time via database queries.

In some instances, content source occurrence frequency can also be factored in (e.g., determined by the source occurrence counter 343) to compute the score. For example, one message/piece of content may be more relevant if it is also from a source (e.g., as identified by a URL/URI) with some determined prior relevance to a context (e.g., a specific set of users, a topic, etc.). The score can be increased if the source is frequently occurring. The source occurrence counter 343 can compute how many times the URL in a message occurred in messages relevant to a given context (e.g., from friends or connections of a given user or people that the user is following, etc.).

One application of concept/idea/theme detection and trend identification is personalization of a message stream for a user. In one embodiment, personalized message streams can be created by filtering/prioritizing various messages for the user by the information stream personalization engine 355. The personalization engine 355 can use a score generated by the scoring engine 340 to determine relevance to a user, interest to a given user, based on any specified criteria (e.g., within sports news, tech news, within the last week, etc.). Based on the score with respect to any facet or context, the messages can be filtered by the filtering engine 356 and prioritized by the engine 357 such that a personalized/customized stream of messages can be created and presented to a user.

In one embodiment, one example of a personalized/customized stream of messages for a user is a "likestream," or a stream of messages/content that the user likes or might like, determined by explicit preferences or implicit preferences. For example, the host server 200 can provide a mechanism by which users may explicitly or implicitly "like" particular messages or people. By "liking" something a user explicitly tells the application that it is of interest. The host 300 (e.g., the personalization engine 355) then assembles a directory of the things the user likes. Within this directory, each faceted view, can be referred to as a "likestream" of things (e.g., messages, audio content, video content or any other content) that are liked by some set of users (such as a single user or even a community or group, such as people within an organization).

For each user x, a faceted directory hierarchy can be generated dynamically that contains all their implicitly or explicitly liked messages and/or people. This directory includes sub-directories, each itself a likestream, for various semantic types of messages liked by user x. For example, a typical likestream directory can include, one or more of:

All liked items by user x;
Videos liked by user x;
Audio liked by user x;
News liked by user x;
Products liked by user x;
Services liked by user x;
Applications liked by user x;
Photos liked by user x;
Quotations liked by user x;
Opinions liked by user x;
People liked by user x;
Ideas/concepts liked by user x;
<other type> liked by user x.

Implicitly liked messages for user x may include any/all messages that user x has authored, replied to, reposted, saved, or shared. User x may also explicitly liked messages or people by taking an action to "like" them in the application. In one embodiment, rating scales for likes can be provided such that users can indicate the degree to which they dislike or like an item.

In one embodiment, Likestreams can be subscribed to by other users who are subscribers of the host service 300 or users of other platforms (e.g., users of other social media networks). For example, when user x views the likestream for user y it is possible for them to subscribe to it as a stream or interest. By subscribing to a likestream, it appears as a stream (with a corresponding editable rule definition) in user x's main dashboard, alongside other streams they can track (generated by other rule definitions). User x may opt to subscribe to user y's top-level root likestream or they can navigate directory facets to reach sub-level likestreams that match a specific patterns (for example, a likestream of only the videos, or only the news articles, that user y likes).

In one embodiment, Likestreams enable users to follow facets of people they are interested instead of everything those people post. This enables users to filter their message streams for only the kinds of messages they want from various people. When adding a likestream for another user y, user x automatically follows user y so that they can get their messages, although in a variation of this feature it is also possible to subscribe to a likestream without following the originator of the likestream.

In addition, Likestreams can also be browsed and searched, both by their owners and by anyone with permission to view them, and in such capacity they provide a means to aggregate and discover knowledge. Messages may have specific permissions associated with them which govern which users may take which actions on the message including, for example:

Read
Write
Edit
Delete
Share
Annotate
Change permissions
Rank, score, prioritize In one embodiment, likestreams can also be generated for sets of people, such as groups, lists, or communities of people. For example, a likestream, or any customized/personalized stream of messages could be generated for the set of all people a user follows, or just for all people tagged as "friends" or "family." A likestream can also be generated for all people who share specific attributes such as interests, relevance to specific topics, geolocations, or affiliations. In one embodiment, a likestream can also be generated for all members of the hosted service 300, or for all members of any social network. In general, likestreams can display messages chronologically and/or ranked by the degree to which they are liked and/or the number of people who like them.

The user interface engine 350 can customize the presentation of messages or content based on a given context with may be user or administrator specified. For example, the user interface can present topics or trend relating to 'tech news' or 'elections.' The user interface can also be configured to present messages/content in a personalized manner based on implicit and/or explicit user interests and/or preferences. In one embodiment, the visualization engine 351 creates a graphical visualization of concepts or topics contained in the messages/content based on a given facet (e.g., the context may be topic/concept driven, user driven, location driven, platform driven, or based on any other facet), with each concept or topic is represented by a label which is arranged radially from a node (e.g., as generated by the interactive concept view generator). Around this facet (represented by the common node), there are connected topics, keywords and tags all of which are relevant to that facet in a certain configurable/specifiable timeframe (minutes, days, weeks).

The graphical visualization can be interactive, where, responsive to detection of selection or activation of the label, information related to the represented concept or topic can be further depicted in the graphical visualization. The user interface engine 350 can also update the graphical visualization continuously or periodically (e.g., in real time or near real time) such that the depicted trends/popularity or relevance levels to various facets/users are current. The graphical visualization can also be manipulated to plot and depict past trends at or around a certain time or within a past time period. In general, each node has a different visual style (color, edge thickness, etc.) which is based on how interesting and relevant the node is to a facet or a user (when creating a personalized graph of concepts for a user). When clicking a node, it will show related topics, tags and keywords and it will display related messages/content in a new window or side panel, as illustrated in the example screenshots of FIGS. 11-13.

In one embodiment, the host server 300 can provide mechanisms to reward users for certain social media behaviors and achievements.

Rewards can be provided in many forms—virtual currency such as points for use in the services hosted by server 300, facebook credits, etc., coupons or gift cards, physical goods and services, or physical currency, or in the form of digital achievement badges, or increases in a user's status, visibility, influence or relevance to others in the hosted network and/or any other networks.

Rewards can be provided for achievements such as:
 Getting n followers
 Recruiting n new users to bottlenose
 Sending n messages
 Liking n messages
 Annotating n messages
 Getting n likes on a message from others
 Getting n likes in total from others
 Getting n likes on their user profiles from others
 Getting n replies on a message
 Making n replies to other users
 Getting n reposts on a message
 Getting n views on a message
 Getting n clicks on a URL in a message
 Getting n views on their profile page
 Getting n followers for a particular likestream of theirs
 Achieving an expertise rank of n on a topic or interest
 Achieving influence rank of n
 Detecting and reporting spam or abuse
 Rating content or users of the system
 Adding plug-in to the system
 Getting n downloads of a plug-in they added
 Getting n likes on a plug-in they added In addition to gaining points, users may also lose points if they do things that are considered unwanted or harmful to the system, such as:
 Adding content that is rated as spam or abuse by other members
 Miscategorizing content when annotating it The host server 300 represents any one or a portion of the functions described for the modules. The host server 200 can include additional or less modules. More or less functions can be included, in whole or in part, without deviating from the novel art of the disclosure. The repositories 318, 320, 322, 324, 326 and 328 were discussed in conjunction with the description of FIG. 1.

FIG. 3B depicts an example block diagram of the user assistance engine 360 in the host server able to perform various customized actions on messages including actions to personalize and/or filter messages for users.

The user assistance engine 360 can further include a semantic rule manager 361, an annotation manager 364, a recommendation engine 368, a machine learning engine 370, a social influence enhancement engine 375 and/or a subscription manager.

Additional or less components can be included in the host server 200 and each illustrated component.

As used herein, a "module," a "manager," an "agent," a "tracker," a "handler," a "detector," an "interface," or an "engine" includes a general purpose, dedicated or shared processor and, typically, firmware or software modules that are executed by the processor. Depending upon implementation-specific or other considerations, the module, manager, tracker, agent, handler, or engine can be centralized or its functionality distributed. The module, manager, tracker, agent, handler, or engine can include general or special purpose hardware, firmware, or software embodied in a computer-readable (storage) medium for execution by the processor.

As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

The semantic rule manager 361 provides a rules interface, and engine, to manage, create, implement, revise, and/or optimize the rules which facilitate customized, application-specific, user-specific, use-specific manipulation, processing, retrieval, filtering, prioritizing of messages and any content in a given network, across networks, or across any number of different online media sites or platforms. The rules can be defined by a user, by a platform, a media site, the host server 300, a platform partnering with the host 300, an organization or any other consumer or business entity. In one embodiment, the rule set is specified by the user or other types of entities, via a user interface provided by the service which is independent of the online or web based media services. Based on the set of rules, the manager 361 can cause the server 300 to perform an action on an incoming message in accordance with a rule set to process the incoming messages. One example of an action is the likestream comprised of messages implicitly or explicitly liked by the user as defined by the rule set described in the example of FIG. 3A.

The rules managed and tracked by the manager 361 can be defined to perform actions on messages/content based on one or more specified criteria. The rules can be defined or specified by the rules definition engine 362 and can include application actions such as annotating a message, reposting a message, notifying a user, making a recommendation to a user, launching another application, presenting with increased or decreased visibility or taking some other action. In some instances, the rules are automatically determined by default or automatically created by observing and learning system or user behavior (e.g., by the rules learning engine), as will be further described with reference to the machine learning engine 370.

The criteria can also be specified, defined, tracked or updated/revised by the rules definition engine 362 and can include, by way of example not limitation, if messages is received/acted upon via one or more of the following services, and/or message was (any or all) of (posted, replied to, reposted, received, liked, annotated, read, saved, tagged, etc.) by (any or all) of (one or more specific people, people I follow, people who follow me, people who follow some person, people with Klout score >x, people near some geographic place, people checked into some present activity, members of a list, any bottlenose user, people who have some attribute, people who do not have some attribute, or any person, etc. In general, the rules and criteria may take many features of messages, actions, and relationships, and any combination of the above into account.

The rule sets can be created and applied to create robots or assistance which can identify and customize message/content streams for any application, setting, context, or facet. An example table showing example rules sets to configure these assistants is illustrated in the example of FIG. 4C.

One feature of the host server 300 is the ability to support machine learning, creation, generation of rules of the machine learning engine 370 from observing, tracking, identifying, detecting, revising, and updating explicit and/or implicit user preferences/feedback from user specifications and/or behavior (e.g., by the user behavior analyzer).

Many learning rules are possible within the application framework, including by way of example but not limitation:

By analyzing user annotations, the machine learning engine 370 or the annotation learning engine 367 can infer and optimize rules that learn to automate user annotations in the future, and that learn to repost messages on behalf of a user.

Rules relating to people by adding people to a given user's interests or as being relevant to any given facet: The user behavior engine 371 can for instance, determine how much a user X interacts with user Y—for example by measuring how often they interact in one or both directions via replies, mentions, direct private messages, and reposts, or how often they "like" messages by one another, or click on links in messages that are posted by one another. When user X is measured to interact with user Y above a quantitative or qualitative threshold, recommend that user X adds user Y as an interest (interest stream and/or relationship), or automatically add user Y as an interest (which may be a function of yet a higher threshold or the same threshold).

Rules relating to site or content by adding sites to a user's interests or as being relevant to any given facet: The user behavior analyzer 371 can detect sites that a user X cites a lot in their outgoing messages, reposts, mentions, replies, or "likes," can automatically become interests, or can be recommended to be added as interests for user. Once added as an interest, any messages that are received that cite URLs in sites of interest may then have a higher personalization score for user X or any other specified context/facet automatically.

Add a message to as an interest (via explicit learning) to a user or relevant to a facet: For a given message, a user can add it to their interests manually—they can specify what they want to add (the author, the content, particular topics, everything). The machine learning engine 370 can add the person who made the message automatically (even if the user doesn't follow them yet), as well as relevant keywords or patterns in the message such as the URL and tags etc. By adding to their interests in this manner, the engine 370 learns they are interested in this pattern such that future messages which are received and match the interest will receive a higher personalization score for the user. Similar process can be performed for facets/applications other than specific users, to identify relevant content based on key words, patterns or other criteria.

Ignore messages: The machine learning engine 370 can learn to automatically filter out or ignore messages that match certain patterns such that spam, offensive content, or all content from a specific party can be screened out for a user or for any specific application/context/facet.

Boost messages: The machine learning engine 370 can also learn to automatically boost the visibility or personalization score of messages that are more likely to be relevant to a user or any other given facet/context. In the case of a user, if a user X likes a lot of messages by some author Y, then the engine 370 can learn to make all messages by that author Y more important for user X. Similarly, the engine 370 can learn to boost the personalization score of messages that match various other patterns such as having specific attributes or being relevant to specific interests.

In addition, through the host server 300, anyone can mark any message as having any semantic type or attributes. This may eventually result in some percentage of miscategorized messages. The server 300 may be configured to leverage collaborative filtering in order to curate messages, and detect and filter out errors (e.g., via the collaborative curator 372 of the machine learning engine 370).

One example method for collaborative filtering is as follows:

1. When user a marks item P as type x, then it shows up as type x for that user only no matter what (even if other people disagree).

2. Types added to item by the item's author are innocent until proven guilty: They automatically show up for the crowd until and unless >n non-authors of item subsequently disagree by unmarking type x from item. If the item is unmarked by the crowd, then x doesn't show up on item for anyone other than author anymore. In other words, the author's types show up for everyone, but are removed for everyone other than the author, if enough people disagree.

3. Types added to item by non-authors of item are guilty-until-proven innocent. If >m non-authors of item mark item as type x, then x shows up for everyone. In other words, there must be some agreement before an item will show up as type x, for people other than the person who marks it as x. One exception is of course if the author marks the item as x—in which case see (2).

4. The variables n and m (the thresholds for "disagreement" and "agreement") can be changed dynamically to adjust the curation thresholds.

Another aspect of machine learning or learning from the user crowd is leveraging message annotations by users (e.g., via the annotation manager 364). For example, if a user shares a message with a URL to the Youtube website, the server 300 can, based on various analysis techniques determine that the message is associated with a video. In some instances, the user can be queried to assist in determining what a message relates to. For example, the host server 300 (e.g., via the annotation manager 364) can query a user when it is posting a new message, reposting an existing message, liking an existing message, or otherwise acting on some message or content.

Once the message has one or more types associated with it (as tracked by the annotation tracking engine 365), the server 300 now has the ability to better provide better filtering of that message or related/similar messages/content all other users. For example if user A and user B have a filter specified for receiving messages that are marked as "News", there could be a message M that has no type associated with it. When user A likes the message and assigns the type "News" to it, then the message will be filtered as "News" for both user A and user B.

In addition to enabling manual annotation of messages/content by users, rules can be generated which are capable of automatically annotating messages (e.g., by the auto-annotator 366) with metadata when the messages match specific patterns—such as originating from specific URLs or URL fragments, containing specific keywords, being posted or authored by specific parties, containing specific strings.

In addition, by analyzing sets of manually annotated messages, new annotation rules can be automatically derived and optimized over time (e.g., by the annotation learning engine 367), that generalize from collective annotation behavior. For example, if a community of users consistently annotate messages containing pattern x as being of semantic type y, then a rule can learn to make such an annotation automatically when a high enough degree of evidence is accumulated to have sufficient confidence in what has been learned.

In one embodiment, the host server 300 includes the ability to recommend online actions (e.g., including identification of online messages/content) that facilitates enhancement of social influence by a user or any other entity (e.g., business entity, organization, application, idea, concept, or theme). In one embodiment, the host server 300 through the social influence enhancement engine 375 can add an additional indicator (e.g., an influence weight indicator) to detected, tracked, stored, and/or analyzed messages/content. This weighting or indicator resulting in an overview identifying messages/content that can be reposted by the user (or some other physical entity such as a corporation or physical entity representing some ideology) to gain more network influence. The social influence enhancement engine 375 can also recommend certain actions in addition to posting/reposting messages (e.g., liking posts, friending certain people or entities, commenting on certain messages/content) which can also result in enhancement of social influence of a user or entity.

In one embodiment, the engine 375 computes the weighting by looking at the strength of a friend connection and the number of friends of that friend. Also, more sophisticated influence information is gathered by integrating with influence metric services like Klout.com. By measuring the relevance of a message to the interests of a user's followers an algorithm can determine whether the message should be reposted. By measuring historical diffusion of similar messages in a social network, the algorithm may estimate to what degree a particular message might spread further, via a person's followers, and may also recommend what times of day it should be posted in order to attain the maximum attention and spread.

In one embodiment, the server 300 provides auto-reposting capabilities for messages/content (e.g., via the auto-reposting engine 377) based on conditions or criteria that is user configured, auto-configured, or determined by any other third party services/interests.

For example, the auto-reposting engine 377 can provide a variation of Auto-RP in where certain messages are recommended for repost. The user or some other entity can then decide to repost the message or dismiss it. The criteria for auto-reposting or recommending a message/piece of content for repost, or for recommending that some other action be performed, can be based on multiple scores. These can include by way of example but not limitation:

Repost Score (see above)
URL Score (see above)
Frequency of interactions with the user that posted the message
An automatically learned weighting of previous interactions with similar messages
Explicitly user defined matches
The level of influence (such as Klout score) of the author of the message
The strength of relationship between the user and the author of the message (determined for example by the number of times the user has reposted, direct messaged, mentioned, or replied to the author, and/or the number of times the author has reposted, direct messaged, mentioned, or replied to the user.
The number of people who the user follows, who also follow the author of the message—a measure of similarity between the user's interests and the interests of the author.
The degree to which followers of the user may be interested in the author's message, determined for example by measuring the relevance of the message to each of the user's followers.

Formulas that include the above criteria and/or others, can generate a cumulative score for the message/content, or some other related action with respect to a network activity on a media site. A threshold may be defined such that if the score crosses the threshold, then a recommendation to repost a message is made. Users may opt to configure the auto-repost engine 377 to repost qualifying messages automatically, or to simply recommend them so that they can choose to repost them manually.

In one embodiment, the auto-reposting engine 377 can learn reposting rules for specific users or entities or other contexts, for example, by analyzing which messages they have reposted in the past in order to develop statistical models and/or pattern rules that can infer when to repost a new message. For example, if a user x has often reposted messages by another user y in the past, then the probability weight that they should repost any new message by user y in the future is increased. Similarly, by analyzing the features of such messages, the times of day, and the social relationships between user x and y, the precision of such rules can be adjusted and further optimized.

One embodiment of the host server 300 further includes a friend casting engine 378 which provides a default 'Friendcasting Assistant'. This assistant allows a user x to specify rules that will automatically repost a message from another user under certain conditions. For example, a user x can define that all messages that match a pattern y (such as having a certain hashtag like, '#cast', @ tag, + tag, and/or containing certain keywords or strings or URLs, and/or originating from a user u that matches whitelist W) will be automatically reposted by user x. This enables people to request that their friends repost particular messages by simply attaching the appropriate hash tag (such as #cast) or @ tag, or other tags to their messages, instead of having to make a direct request for a repost via a message to each person.

The recommendation engine 368 can, using the output of the annotation manger 264, the machine learning engine 370, and/or the influence enhancement engine 375 and make the appropriate recommendations to a user, entity, or any other party or representative accessing the services/features of the host server 300. The recommendations can include rule/action sets defining assistants which are use, application, context, and/or user specific, recommended or suggested annotations based on observation of system and/or user actions/behaviors, recommendations of actions including posts/comments/reposts of content/messages which may enhance social influence of a user or any entity/party/representative, concept, theme, organization.

FIG. 4A illustrates an example entry 400 in a user analytics repository. An example entry 400 can include a user identifier 402 (user name, real name, logon name), demographic information including age 404 and/or other information, an identification of registered media sites 406, influence score of the user 408, for example. The entry can also include the interest profile 410 of the user represented by a list of topics/concepts which can include ideas, products, services, people, sites, or any other entities. In one embodiment, the list of topics/concepts can be weighted to indicate relative level of interest of the user in each of the represented topics/concepts.

FIG. 4B illustrates an example entry 430 in a message analytics repository. The example entry 430 can include, an identification of the message 432, the action type 434 relating to the message, the user who acted on the message 436, an identification of the media platform 438 through which the action was generated, an original content source 440, and/or the analytics 442 associated with the message 432. The analytics can include, for example, metadata, annotations, URL metadata (metadata from cnn.com), and/or an identification of similar messages with may represent reposts. The analytics can be derived or generated by the host system shown in the example of FIGS. 3A-3B. The analytics can also be derived or generated by hosted components residing on the client side, or in any part contributed by end users, consumers, or other third party entities.

FIG. 4C illustrates a table 450 showing various configuration settings in a semantic rules set.

The semantic rule set can be specified to configure assistants to customize media content/messages or activities from one or more media sources (e.g., social media sites or platforms) to be optimally presented for various applications. For example, one assistant can be configured to aggregate and show all posts across multiple media sites by a popular figure (e.g., Mitt Romney), one assistance can be configured to show all posts on Twitter relating to an entity (e.g., the Boston Celtics, or the World Trade Center site) in a given time frame, assistants can also be configured to filter and show content relating to certain users or posted/acted on by certain users (e.g., select users who are members of a group or certain select users that specified according to some other criteria).

Multiple assistants can be created from different rule sets such that multiple content or message streams are generated for different applications. Each rule set can implement one or a combination of conditions (e.g., as shown in sets 452, 454 an 465), and when the condition(s) are met, any number of the actions x 458 can be performed.

The action x can include, for example, any number of such actions as: show me the message in a particular view or stream, adjust the relevance or visibility of the message, play a specific sound, alert me by email, alert me by SMS, generate a desktop alert, highlight the message, automatically annotate or tag the message, repost the message, delete the message, hide the message, file the message, reply to the message, translate the message, change the personalization score of the message, save the message, add the message to my interests, add the author of the message to my interests, share the message, launch a plugin or another application, call a function, send the message to another application, export the message as data, view the message in a specific viewer, learn something from the message, etc.

Figure 5:
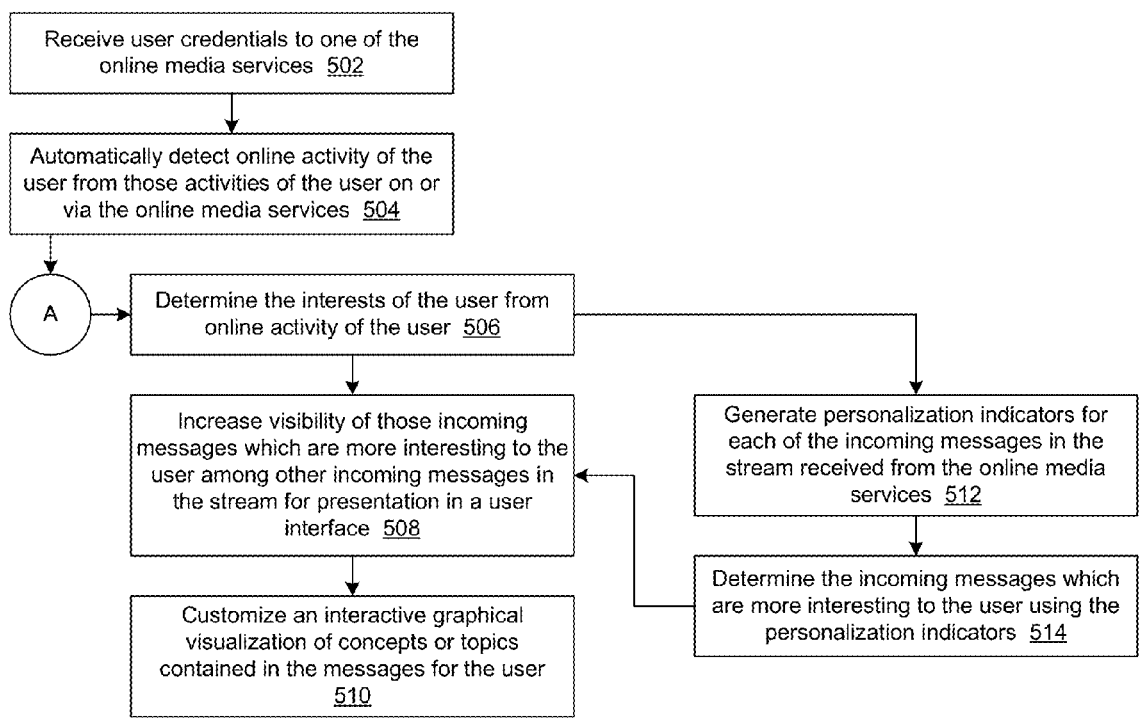
FIG. 5 depicts a flow chart illustrating an example process for analyzing a stream of incoming messages from online media services for a user.

FIG. 5 depicts a flow chart illustrating an example process for analyzing a stream of incoming messages from online media services for a user.

In process 502, user credentials to one of the online media services are received. In process 504, online activity of the user is automatically detected from those activities of the user on or via the online media services. In general the online activity of the user is automatically detected without requiring additional interaction or input from the user, for example, once login credentials are received. For example, the interests of the user can be automatically determined upon receipt of user credentials to one of the online media services (e.g., Twitter, Facebook, Yelp, Yammer, Linkedin, etc.).

In general, the online activities which can be detected include any user interaction with content on or via the online media services. Content which can be interacted with can include, user profiles, user events, user likes or dislikes, status updates, mentions, feeds, tweets, links, notes, video content, audio content, news, logs, text messages, photos, web pages, documents, email messages, comments, chat messages, etc.

Figure 6A:
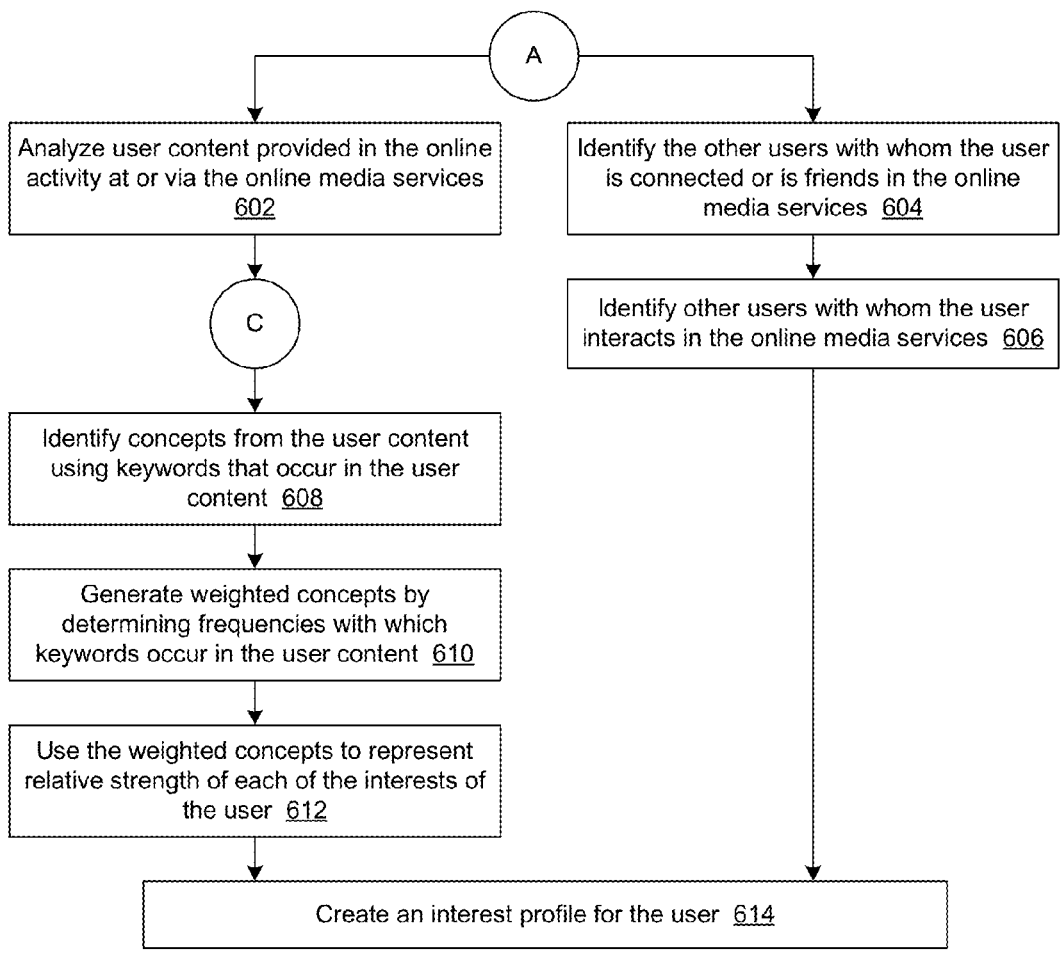
FIG. 6A depicts an example flow chart for creating an interest profile for a user and presenting an information stream of messages from a social networking service for a user.

In process 506, the interests of the user from online activity of the user are determined from Flow 'A' illustrated in FIG. 6A. In one embodiment, from the determined interest, personalization indicators are generated for each of the incoming messages in the stream received from the online media services in process 512. The personalization indicators assigned for the incoming messages correspond to relevancy of the message to interests of the user. In process 514, the incoming messages which are more interesting to the user are determined using the personalization indicators.

Based on the interests, in process 508, visibility of those incoming messages which are more interesting to the user is increased among other incoming messages in the stream for presentation in a user interface. In one embodiment, the user interface is a part of a platform which is independent of any of the online media services. In one embodiment, the interests of the user are represented by concepts weighted according to analysis of user content which is subject of the online activities at the online media services. The user content which is subject of the online activities includes, one or more of, user liked content, user disliked content, user status updates, user posted content, user shared content, saved content, content favorited by the user, and user tweets.

In process 510, an interactive graphical visualization of concepts or topics contained in the messages is customized for the user. In one embodiment, each concept or topic is represented by a label which is arranged radially from a node in the graphical visualization. In one embodiment, a radial distance of the label with the node is determined by a level of interest of the user in the concept or topic. In one embodiment, graphical characteristics of the label or edges connecting the label to the node are adjusted based on a level of interest of the user in the concept or topic determined using the personalization indicators.

In one embodiment, the graphical visualization is interactive, and, responsive to detection of selection or activation of the label, information related to the represented concept or topic is further depicted in the graphical visualization. Further information related to the represented concept or topic is depicted in the interactive graphical visualization upon detected interaction with the label. The information further related can include, for example, one or more of, related topics, related tags, or related keywords. In general, graphical visualization can be updated continuously or periodically in accordance with an adjustable timeframe such that the popularity of concepts or topics are current and up to date. For example, labels representing each concept or topic corresponds are sized according to frequency or number of occurrence of the concept or topic. The size and/or placement (radial distance) of the labels are dynamic to represent how popular the represented concept/topic/theme/ person is in real-time or near real-time. Past time or delay time popularity/trends can also be queried and charted in the interactive graphical visualization. The graphical visualization is illustrated in the example screenshots of FIGS. 11-12. Note that the graphical visualization, can be created by a platform independent of any of the online media services through which users interact.

FIG. 6A depicts an example flow chart for creating an interest profile for a user and presenting an information stream of messages from a social networking service for a user.

In process 602, user content provided in the online activity at or via the online media services is analyzed. Through the process illustrated at Flow 'C' in FIG. 6B, concepts are identified from the user content using keywords that occur in the user content in process 608. In process 610, weighted concepts are generated by determining frequencies with which keywords occur in the user content.

In process 612, the weighted concepts are used to represent relative strength of each of the interests of the user.

Similarly, in process 604, from a user's online activities, the other users with whom the user is connected or is friends in the online media services are identified. In process 606, other users with whom the user interacts in the online media services are also identified. In process 614, an interest profile can be generated for the user using the identified concepts and the identified other users or connections.

Figure 6B:
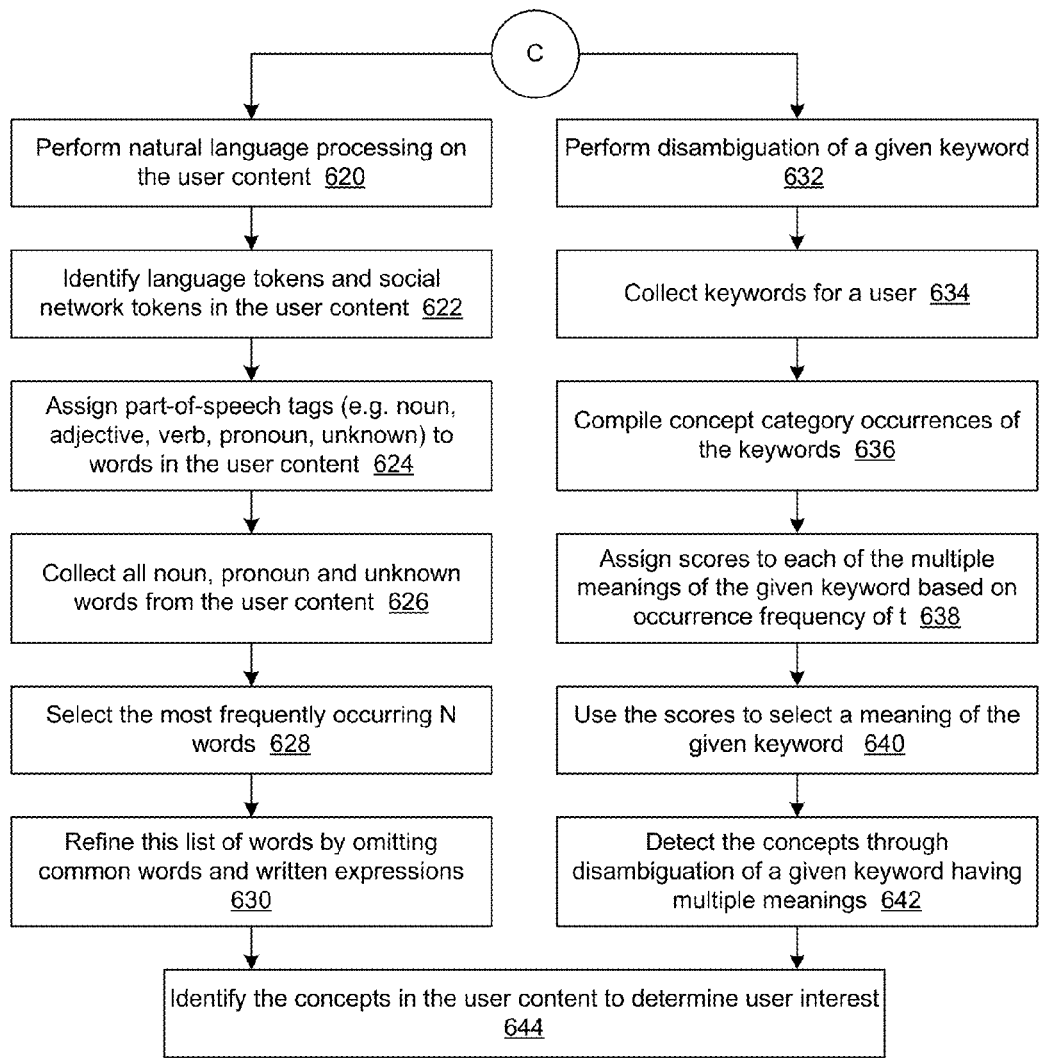
FIG. 6B depict example flows for using natural language processing and disambiguation techniques to identify concepts in user content for identifying user interests.

FIG. 6B depict example flows for using natural language processing and disambiguation techniques to identify concepts in user content for identifying user interests.

In process 620, natural language processing is performed on the user content. In process 622, language tokens and social network tokens in the user content. The natural language tokens can include, for example, one or more of hashtags, @ tags, + tags, URLs, user names, and emoticons In process 624, part-of-speech tags (e.g. noun, adjective, verb, pronoun, unknown) are assigned to words in the user content.

In process 628, the most frequently occurring N words are selected. In process 630, the list of words is refined by omitting common words and written expressions. In addition, in process 632, disambiguation of a given keyword is performed. In process 634, a set of keywords are collected for a user. In process 636, concept category occurrences of the keywords are complied. In process 638, scores are assigned to each of the multiple meanings of the given keyword based on occurrence frequency. In process 640, the scores are used to select a meaning of the given keyword. In process 642, the concepts are detected through disambiguation of a given keyword having multiple meanings. In process 644, the concepts are identified in the user content to determine user interest from the natural language processing and/or via the disambiguation techniques.

Figure 7:
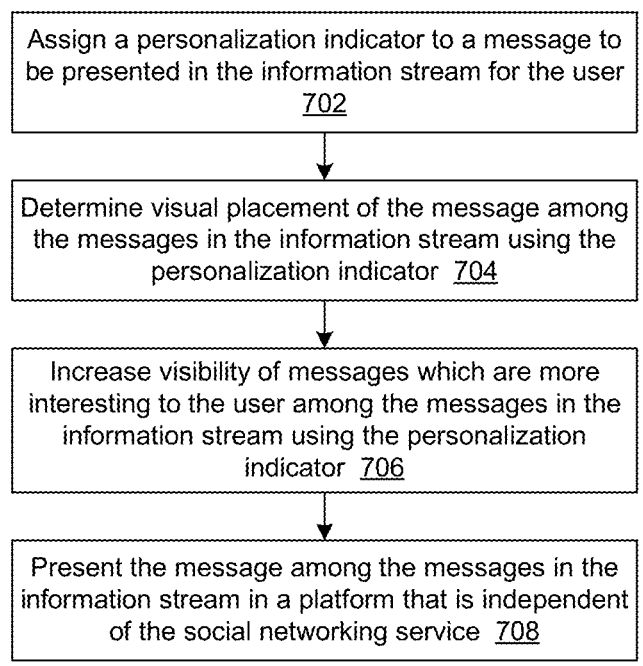
FIG. 7 depicts a flow chart illustrating an example process for filtering incoming messages from online media services for a user into an information stream.

FIG. 7 depicts a flow chart illustrating an example process for filtering incoming messages from online media services for a user into an information stream.

In process 702, a personalization indicator is assigned to a message to be presented in the information stream for the user. The personalization indicator for the message generally corresponds to relevancy of the message to interests, preferences of the user and can include a quantitative or qualitative indicator. User interests can be determined by analyzing user content provided in the online activity at or via the social networking service, by for example, identifying concepts from the user content using keywords that occur in the user content through the processes described in the examples of FIG. 6B. Note that keyword scan include single words, a string of words, or a phrase. Keywords can also include a tag (hash tag, @ tag, + tags, etc.), a username, or a name, a resource identifier such as a URL or URI.

In general, the user content can include user-submitted content and/or user-generated content. Weighted concepts can be generated by determining frequencies with which keywords occur in the user content where concepts corresponding to more frequently occurring keywords are assigned higher weights. An interest profile for the user can be created using the weighted concepts to represent relative strength of each of the interests of the user.

In one embodiment, the personalization indicator is assigned to the message by performing one or more of, comparing message content against the interests of the user, identifying connections of the user who have interacted with the message, and/or identifying connections of the user who have interacted with content from a URL or URL fragment associated with the message.

In one embodiment, the identifying the connections of the user who have interacted with the message includes, one or more of, posted the message, shared the message, liked the message, favorited the message, tagged a message, annotated a message, rated a message, commented on the message, replied to the message, viewed the message, saved or bookmarked the message.

In one embodiment, personalization indicators are also generated for each of the messages in an information stream, where the messages are received from multiple social networking services.

In process 704, visual placement of the message among the messages in the information stream is determined using the personalization indicator. In process 706, visibility of messages which are more interesting to the user are increased among the messages in the information stream using the personalization indicator.

In process 708, the message is presented among the messages in the information stream in a platform that is independent of the social networking service. Note that the platform can be web-based and accessed via a browser. The platform can also be accessed via a desktop application, or a mobile application accessed from a mobile/portable device such as a smartphone, PDA, tablet, or other portable/handheld devices.

Figure 8A:
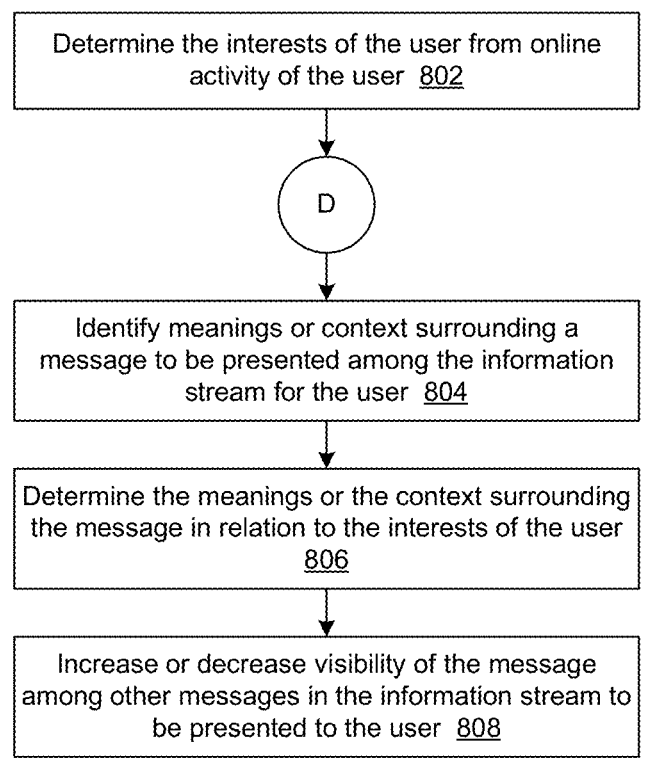
FIG. 8A depicts and example flow chart illustrating an example process for aggregating an information stream of content from a content sharing service.

FIG. 8A depicts and example flow chart illustrating an example process for aggregating an information stream of content from a content sharing service.

In process 802, the interests of a user are determined from online activity of the user with respect to the content sharing service (e.g., directly or indirectly interacting with content via the content sharing service). For example, the online activity of the user is from activity on the content sharing service (e.g., a user posting on Facebook or another site) or on other online sharing services (e.g., a user Tweeting whose Tweets are also posted on Facebook or another site).

In one embodiment, the online activity includes web-page browsing detected by a browser extension. When used, the browser extension can analyze the web-page and extract the relevant metadata. The addition the metadata can be sent to a repository, either central or distributed, for future use in personalizing streams for the user or other users. For example, the user's browser (e.g., part of a user interface component of a platform for behavior and message analysis) can compute and extract webpage or content analysis information for the content or pages viewed/accessed by the user. The computed data or extracted metadata can be stored for subsequent use, either for the same user or for other users.

In general, the metadata can include information about the content source (e.g., a given website or web page) and can also include annotations such as the semantic type and attributes of a message, as well as formatting and display information such as a custom avatar image, background, layout, font choice, stylesheet or CSS attributes. Message metadata can be extended by plugins as well, enabling additional layers of metadata and functionality to be added to messages via the platform In process 804, meanings or context surrounding a message to be presented among the information stream for the user are identified through an example process 'D' illustrated in FIG. 8B. In one embodiment, the meaning or context surrounding the content is determined from associated metadata, which can identify, for example, an ontology type of the message or content, geolocation information, manual annotations contributed by any user or other users (e.g., who may be of the same platform, the same content sharing service or other content sharing services), as further described in the example flow of FIG. 8B. The content identified can include, one or more of, video content, audio content, news, breaking news, popular content, content relating to certain people, opinions, business news, sports news and technology news.

In generally ontology types can include by way of example but not limitation, a message content type, a media content type, a marketplace content type, or a knowledge content type. The message content type identified includes one or more of, an event, humor, an invitation, news, a note, a notification, and a status. The media content type identified can include, one or more of, animation, audio, collections, documents, a game, a map, a picture, publication, software, video and websites. The marketplace content type identified can include, one or more of, advertisements, offers, wanted, products, and services. The knowledge content type identified can include, one or more of, a factoid, a how-to, an opinion, a Q & A, and a quotation.

In process 806, the meanings or the context surrounding the message in relation to the interests of the user are determined. In process 808, visibility of the message among other messages in the information stream to be presented to the user is increased or decreased, by for example, using the meanings or the context surrounding the content in relation to the interests of the user.

In one embodiment, the visibility of the content is increased or decreased for presentation in a user interface component of a third-party platform independent from the content sharing service. In some instances, the interests of the user and the meanings or the context surrounding the content are also determined by the same platform.

Figure 8B:
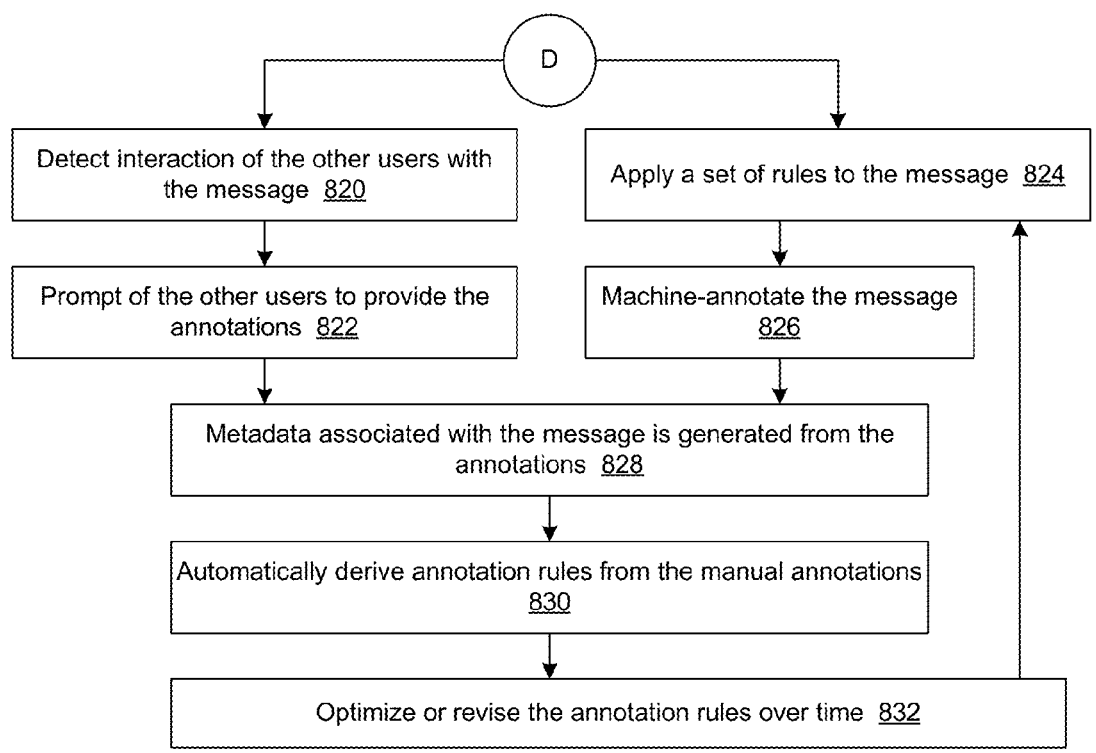
FIG. 8B depicts example flows illustrating example processes for annotating messages.

FIG. 8B depicts example flows illustrating example processes for annotating messages.

In process 820, interaction of the other users with the message is detected. In process 822, the other users are prompted to provide the annotations. In process 824, a set of rules are applied to the message. In process 826, the message is machine-annotated. The set of rules applied to a message can include criteria based on, for example, one or more of, a pattern of the message, a keyword contained in the message, a regular expression contained in the message and a string contained in the message. The set of rules can further include, criteria based on, one or more of, a source of the content as identified by a URL or URL fragment, an author or poster of the content.

In process 828, metadata associated with the message can be generated from the annotations. In process 830, annotation rules are automatically derived from the manual annotations. In process 832, the annotation rules are optimized or revised over time.

Figure 9A:
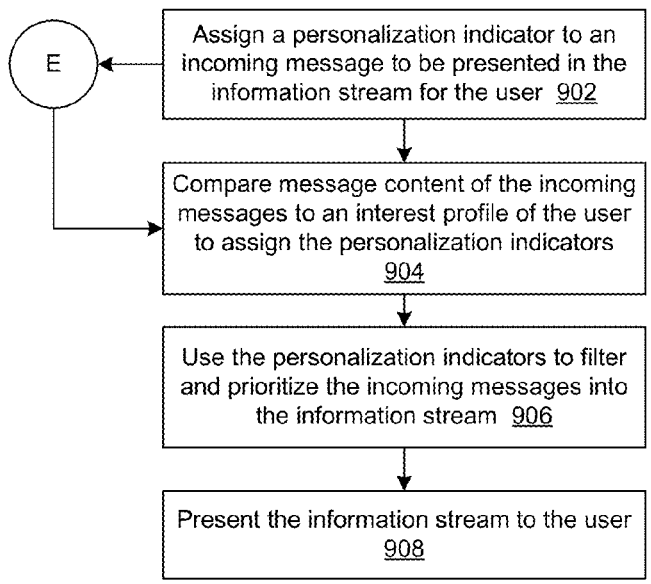
FIGS. 9A-B depict example flow charts illustrating example processes for generating personalization indicators and using personalization indicators to filter incoming messages from online media services for a user into an information stream.
Figure 9B:
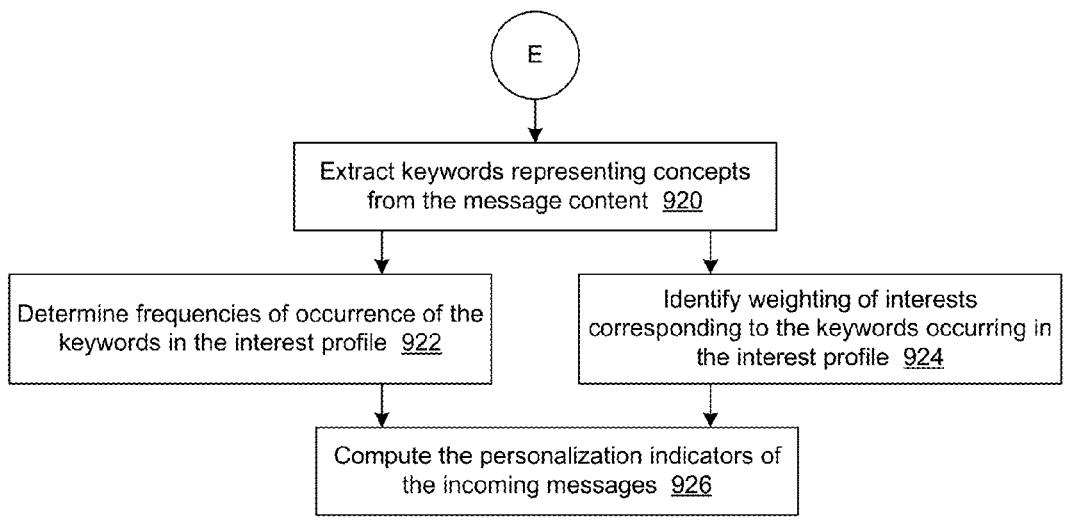

FIGS. 9A-B depict example flow charts illustrating example processes for generating personalization indicators and using personalization indicators to filter incoming messages from online media services for a user into an information stream.

In process 902, a personalization indicator is assigned to an incoming message to be presented in the information stream for the user. The personalization indicator can be computed via the process illustrated at flow 'E' in the example of FIG. 9B. For example, in process 920, keywords representing concepts from the message content are extracted. In process 922, frequencies of occurrence of the keywords in the interest profile are determined. In process 924, weighting of interests corresponding to the keywords occurring in the interest profile are identified. In process 926, the personalization indicators of the incoming messages are computed.

In process 904, message content of the incoming messages is compared to an interest profile of the user to assign the personalization indicators. In process 906, the personalization indicators are used to filter and prioritize the incoming messages into the information stream. In process 908, the information stream is presented to the user.

Figure 10:
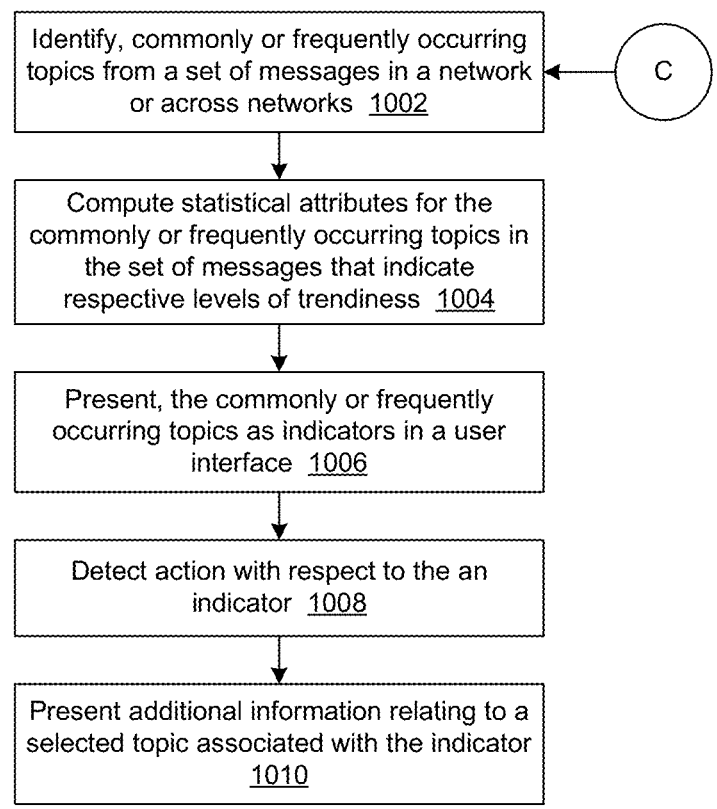
FIG. 10 depicts a flow chart illustrating an example process for detecting trends from a set of messages in a network or across networks.

FIG. 10 depicts a flow chart illustrating an example process for detecting trends from a set of messages in a network or across networks.

In process 1002, commonly or frequently occurring topics are identified from a set of messages in a network or across networks. In general, the set of messages can include messages with different destinations and different origins. For example, a destination site includes one or more of, a social media network and a user and an origin site can also include one or more of, a social media network and a user. The set of messages can originate from a single source or multiple sources including multiple social media networks. The set of messages can also be directed to a single destination user, a single destination site, or multiple destinations including multiple social media networks.

In one embodiment, the commonly or frequently occurring topics are identified from the set of messages via natural language processing of the set of messages or other known or convenient means. An example of the natural language processing and/or disambiguation techniques which can be performed is illustrated in the example flow chart shown in FIG. 6B.

In process 1004, statistical attributes for the commonly or frequently occurring topics in the set of messages that indicate respective levels of trendiness or popularity. In general, the set of messages can include any set of messages analyzed in aggregate for any configurable application or purpose. For example, the set of messages selected to be analyzed can include feeds and updates or other messages with which action is detected or generated which relates to sporting events, scores, or athletes. Such an analysis of all messages relating to sports acted upon, created, or interacted with over the last two hours could facilitate detection of upcoming trends or recent games/scores or popular plays.

In addition, new emerging relationships between words/concepts can also be identified by analyzing messages and detecting frequently co-occurring words. The frequent co-occurrence of words which otherwise do not readily represent detectable related concepts can be discovered and tracked. For example, concepts represented by the person 'Jeremy Lin' and 'NBA' may not have been identified as being related until fans and sports community began blogging, tweeting, and posting about recent games and results due to his coming off the bench. The co-occurrence of the two terms/key words/strings can be detected and thus the emerging relationship//trend can be identified by the system.

The set of messages can also be all messages/activities on a given platform (e.g., Facebook). All Facebook messages/content can be analyzed over a period of time to determine what is or was popular within the specified time frame. Various parameters can be used to select the messages to be analyzed to extract the information sought. Note that the set of messages can be associated with a given user, and the levels of trendiness computed can correspond to levels of interest of the user in the commonly or frequently occurring topics. In general, messages can refer to, one or more of, user events, user likes or dislikes, status updates, mentions, feeds, tweets, messages associated links, notes, messages associated with video content, messages associated audio content, messages associated photos, web pages, documents, email messages, comments, chat messages, and any other media or online content/activity interacted with by humans and/or machines.

In general, interactions can include by way of example but not limitation, user events, user likes or dislikes, status updates, mentions, feeds, tweets, messages associated links, notes, messages associated with video content, messages associated audio content, messages associated photos, web pages, documents, email messages, comments, chat messages.

In process 1006, the commonly or frequently occurring topics are detected as indicators in a user interface. In one embodiment, the indicators are depicted in a radial arrangement from a common node; wherein a radial distance from the common node varies based on relevance to a facet represented by the common node using the statistical attributes. The visual characteristics of the indicators can correspond to the levels of trendiness of the corresponding topic in the commonly or frequently occurring topics. In process 1008, an action with respect to the indicator is detected. In process 1010, additional information relating to a selected topic associated with the indicator is presented.

Figure 11A:
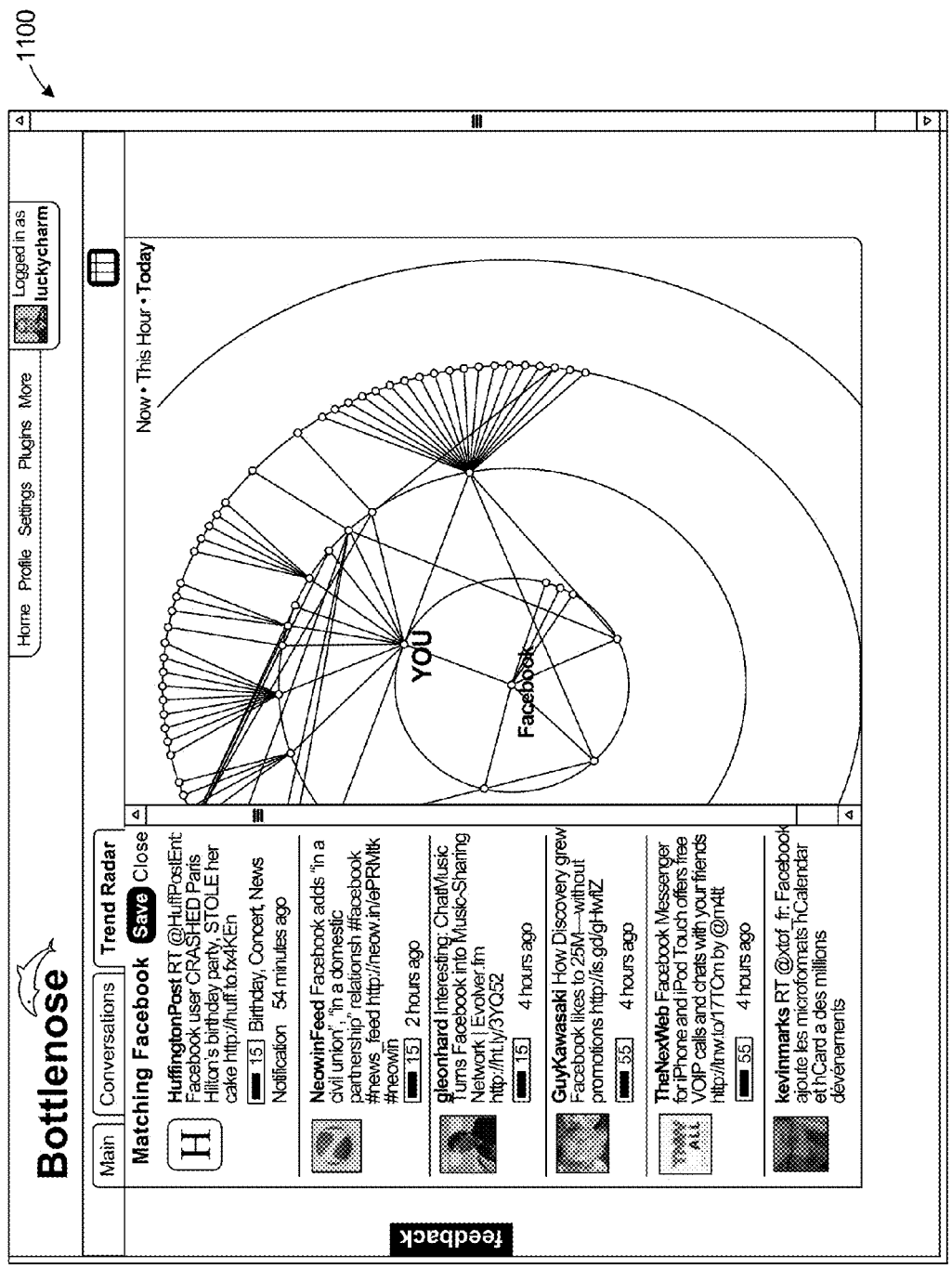
FIGS. 11A-B depict example screenshots showing an interactive graphical representation of relevant topics/concepts/themes.
Figure 11B:
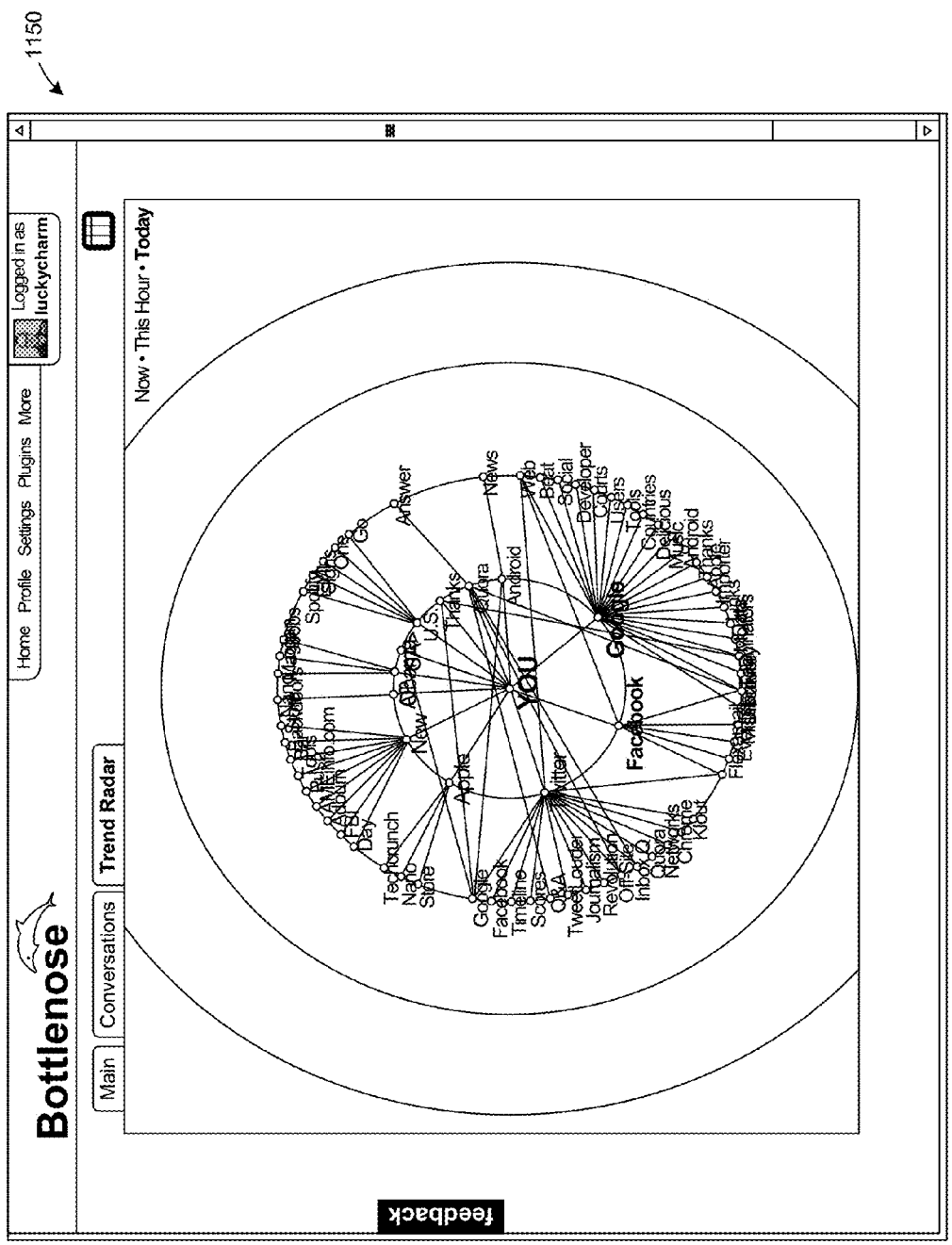

FIGS. 11A-B depict example screenshots showing an interactive graphical representation of relevant topics/concepts/themes.

Figure 12:
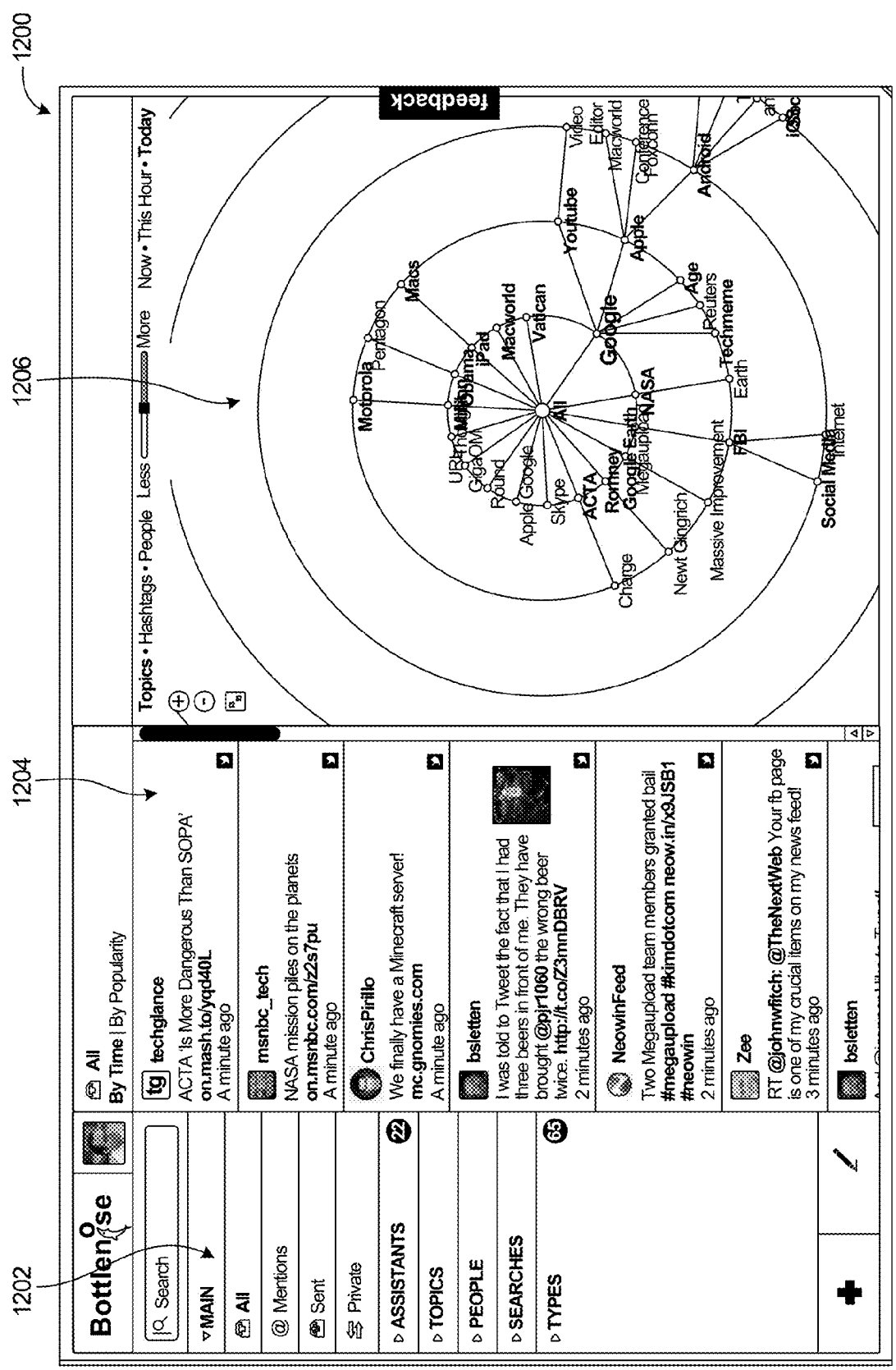
FIG. 12 depicts another example screenshot showing the radial representation of relevant topics/concepts sharing a user interface with additional navigation panels for accessing and viewing specific types of messages/content.

FIG. 12 depicts another example screenshot showing the radial representation 1206 of relevant topics/concepts sharing a user interface 1200 with additional navigation panels for accessing 1202 and viewing 1204 specific types of messages/content.

Figure 13A:
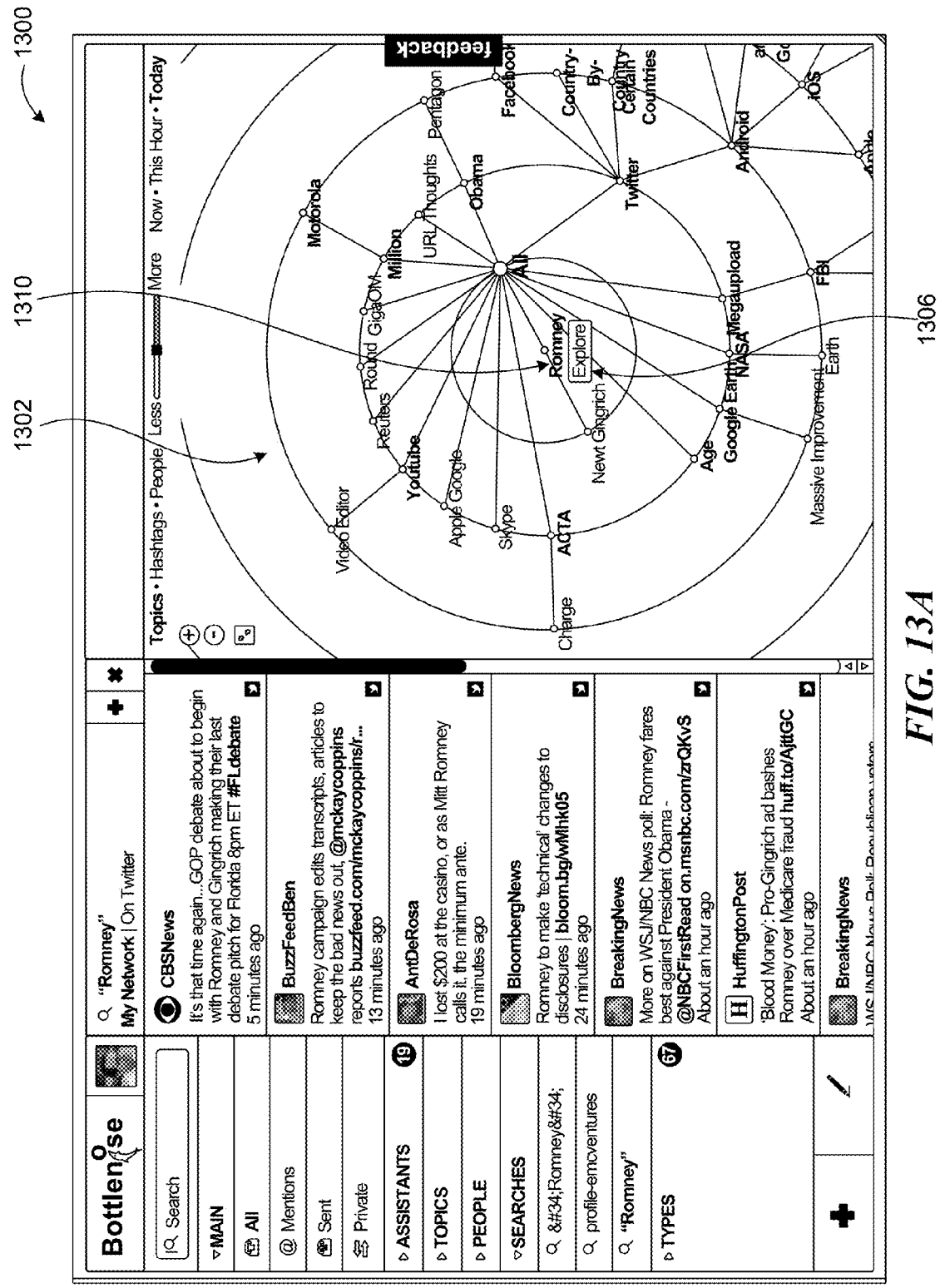
FIGS. 13A-B depict additional example screenshots showing how the interactive graphical representation of relevant topics/concepts/themes includes labels and features which can be accessed to view additional related topics/concepts.
Figure 13B:
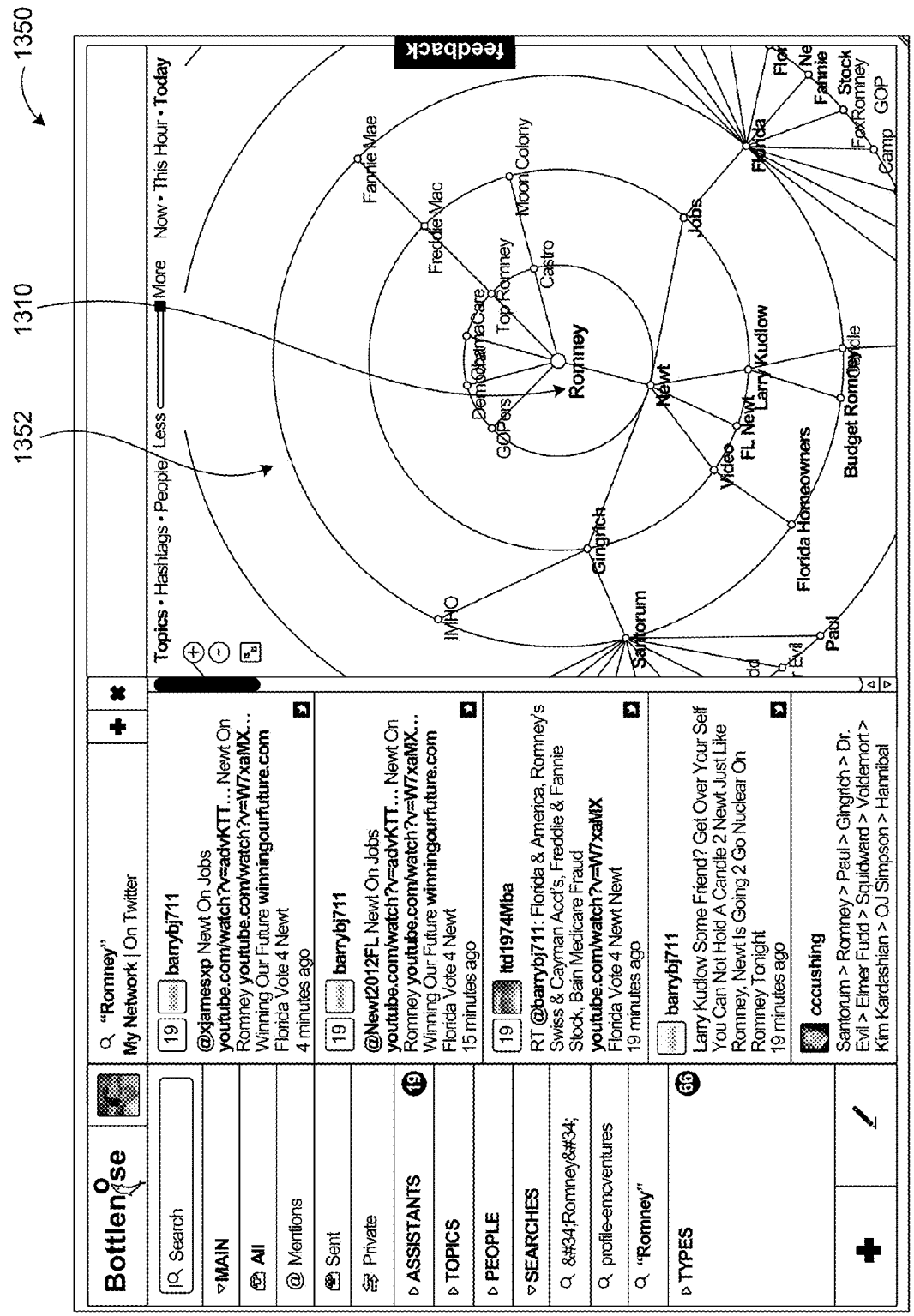

FIGS. 13A-B depict additional example screenshots showing how the interactive graphical representation 1302 of relevant topics/concepts/themes includes labels 1310 and features 1306 which can be accessed to view additional related topics/concepts (e.g., updated graph of labels in 1352 upon selection of feature 'explore' 1306).

Figure 14:
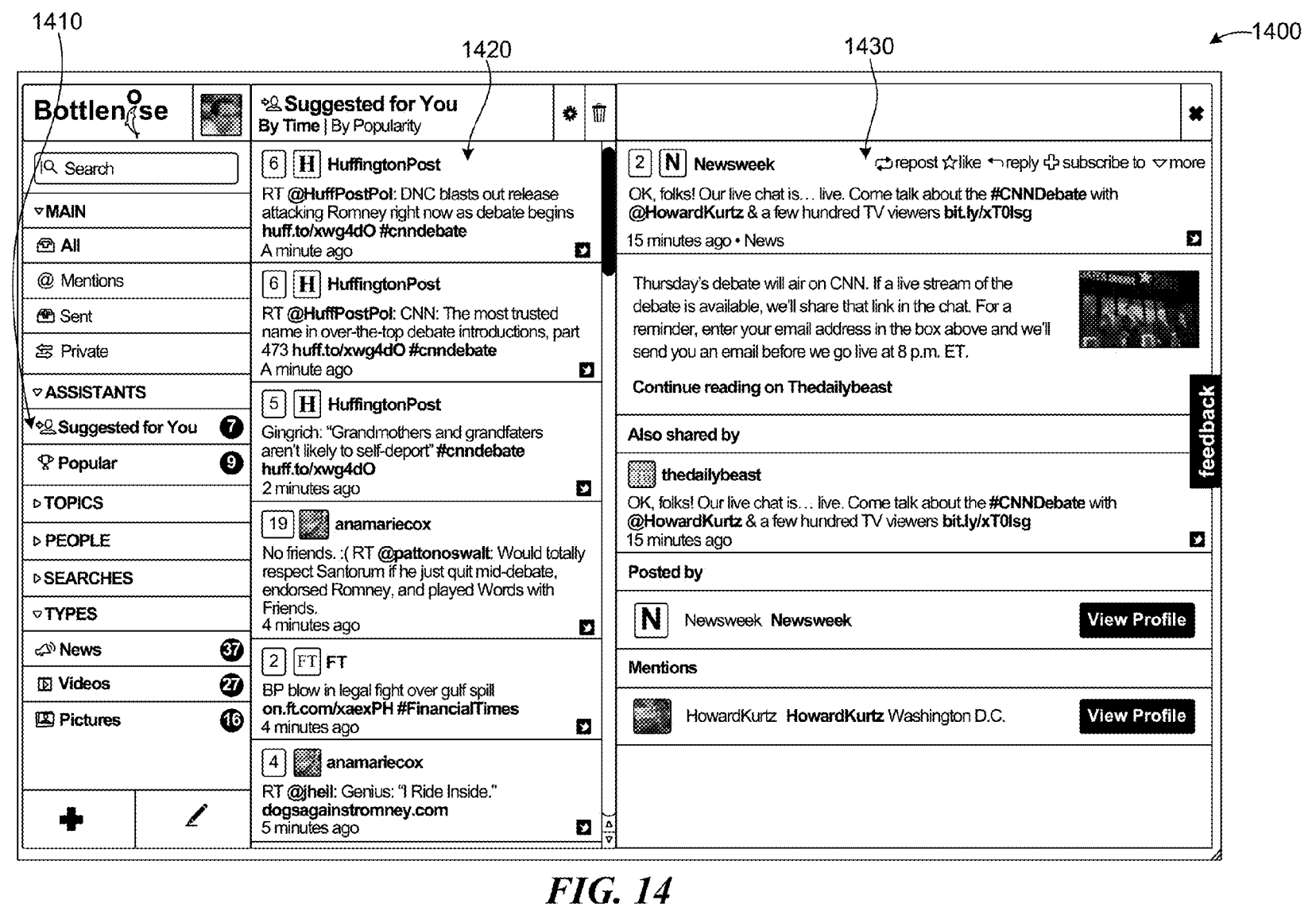

FIG. 14 depicts an example screenshot 1400 showing a panel 1410 for accessing various types of content, viewing assistants, a panel 1420 for accessing the message or content streams based on the selected content type, and another panel 1430 for accessing/viewing the content. Suggested content ("Suggested for You" in panel 1410) for a user is selected and shown in this example.

Figure 15:
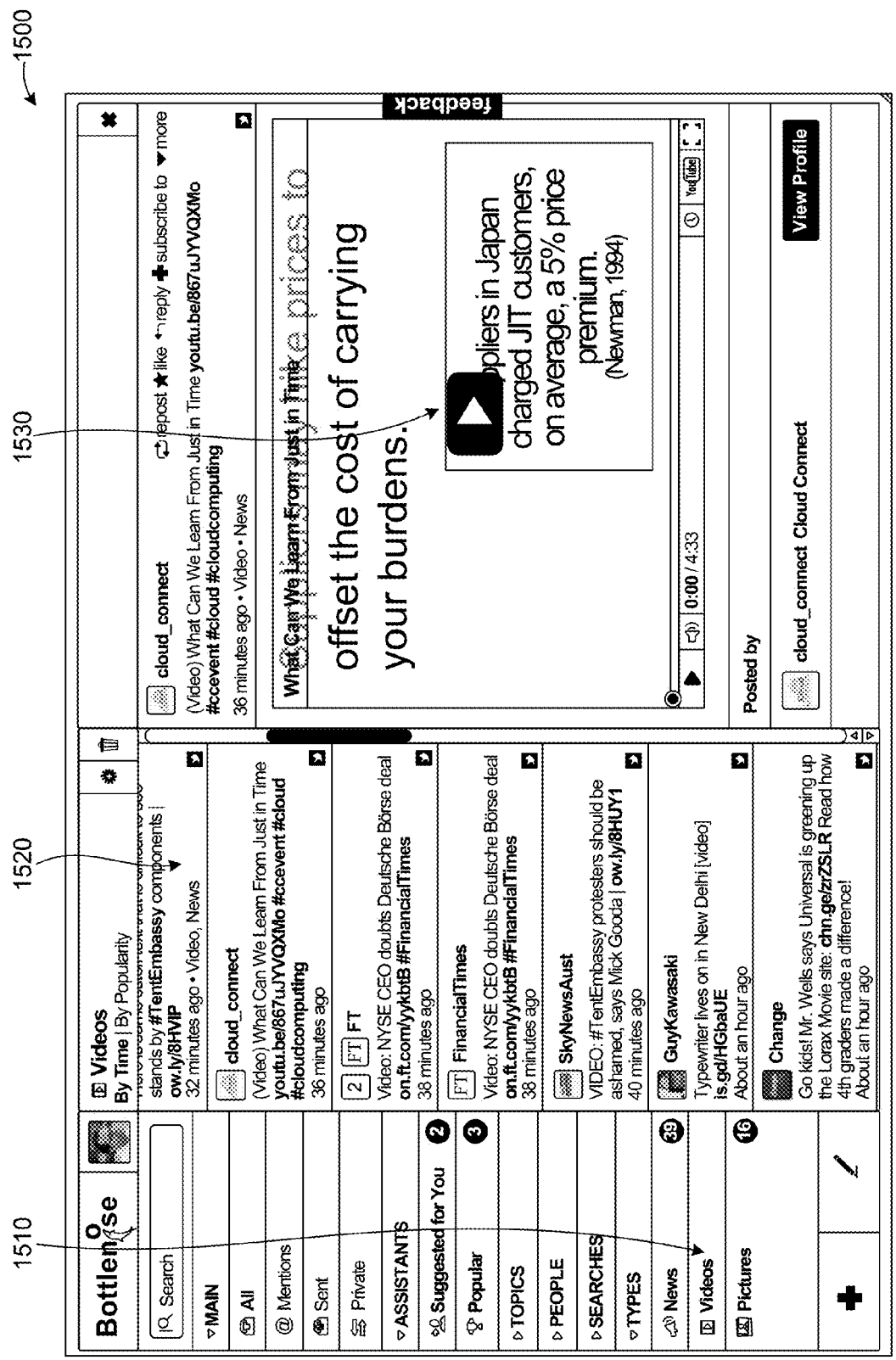
FIG. 15 depicts another example screenshot showing a panel for accessing various types of content, viewing assistants, a panel for accessing the message or content streams based on the selected content type, and another panel for accessing/viewing the content. Video content is selected in this example.
Figure 17:
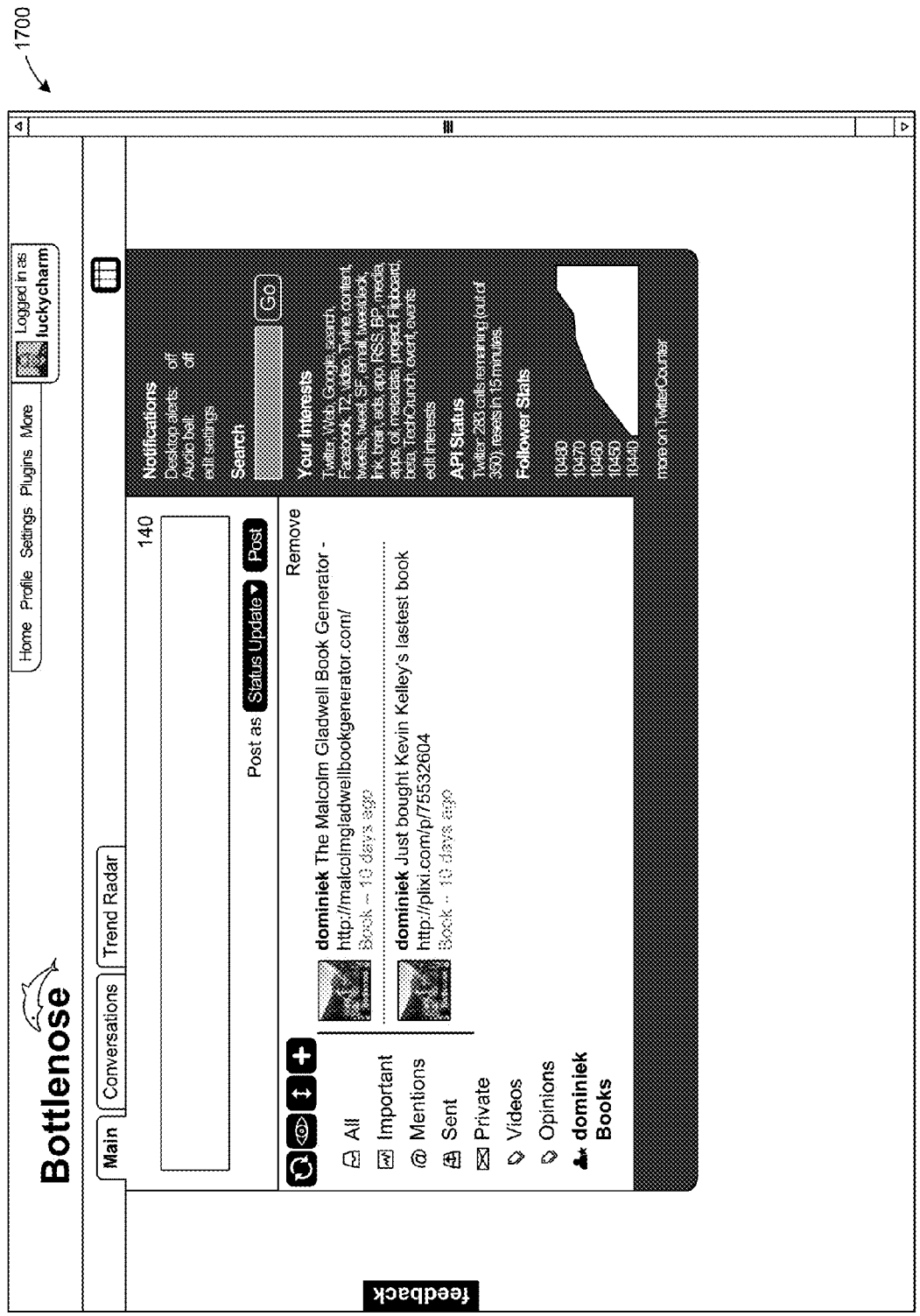
Figure 18:
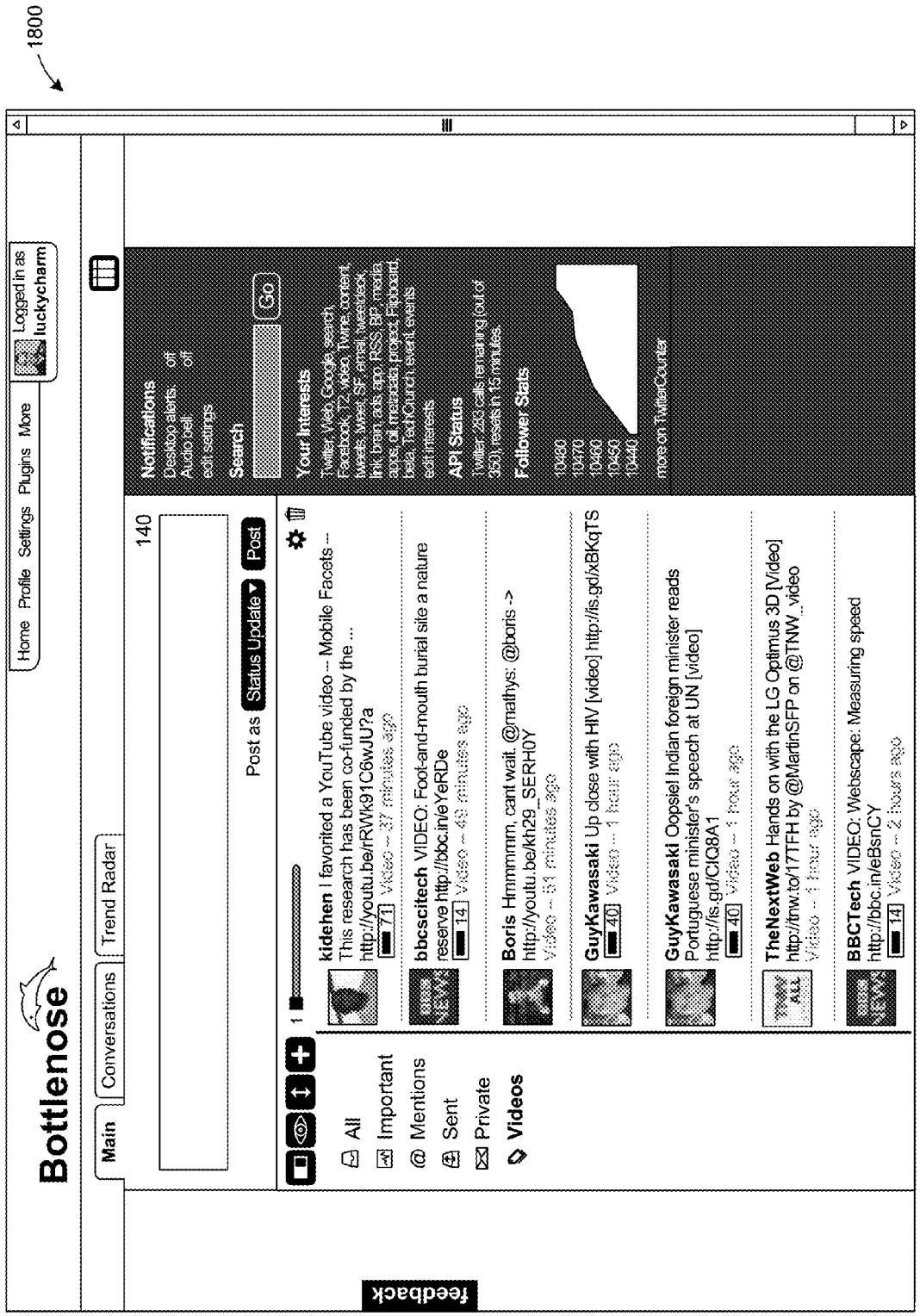
Figure 26:
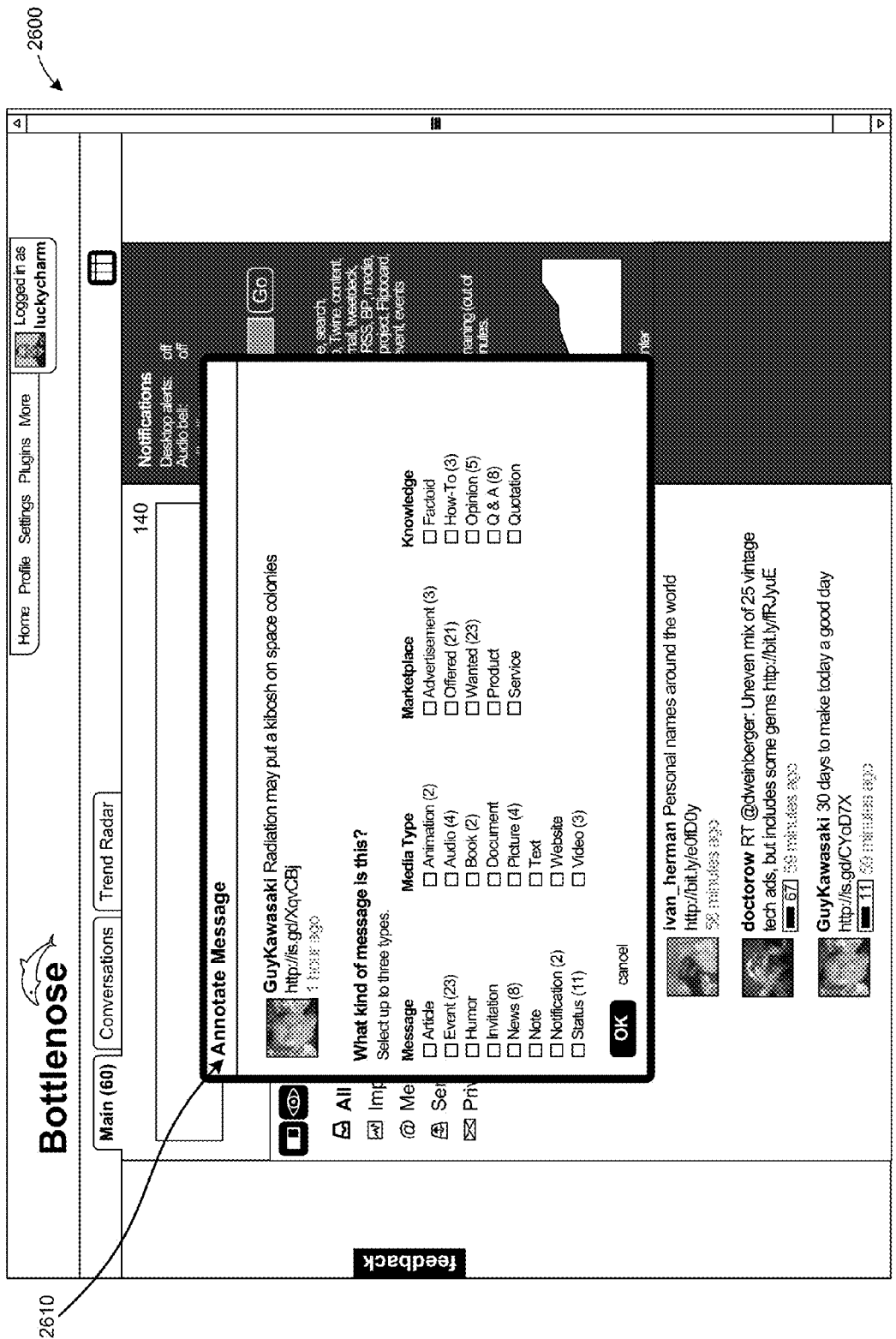
FIGS. 26-29 depicts example screenshots showing prompts enabling a user to identify message/content type when they perform an action (e.g., like, comment, post, repost) with respect to some piece of content.
Figure 27:
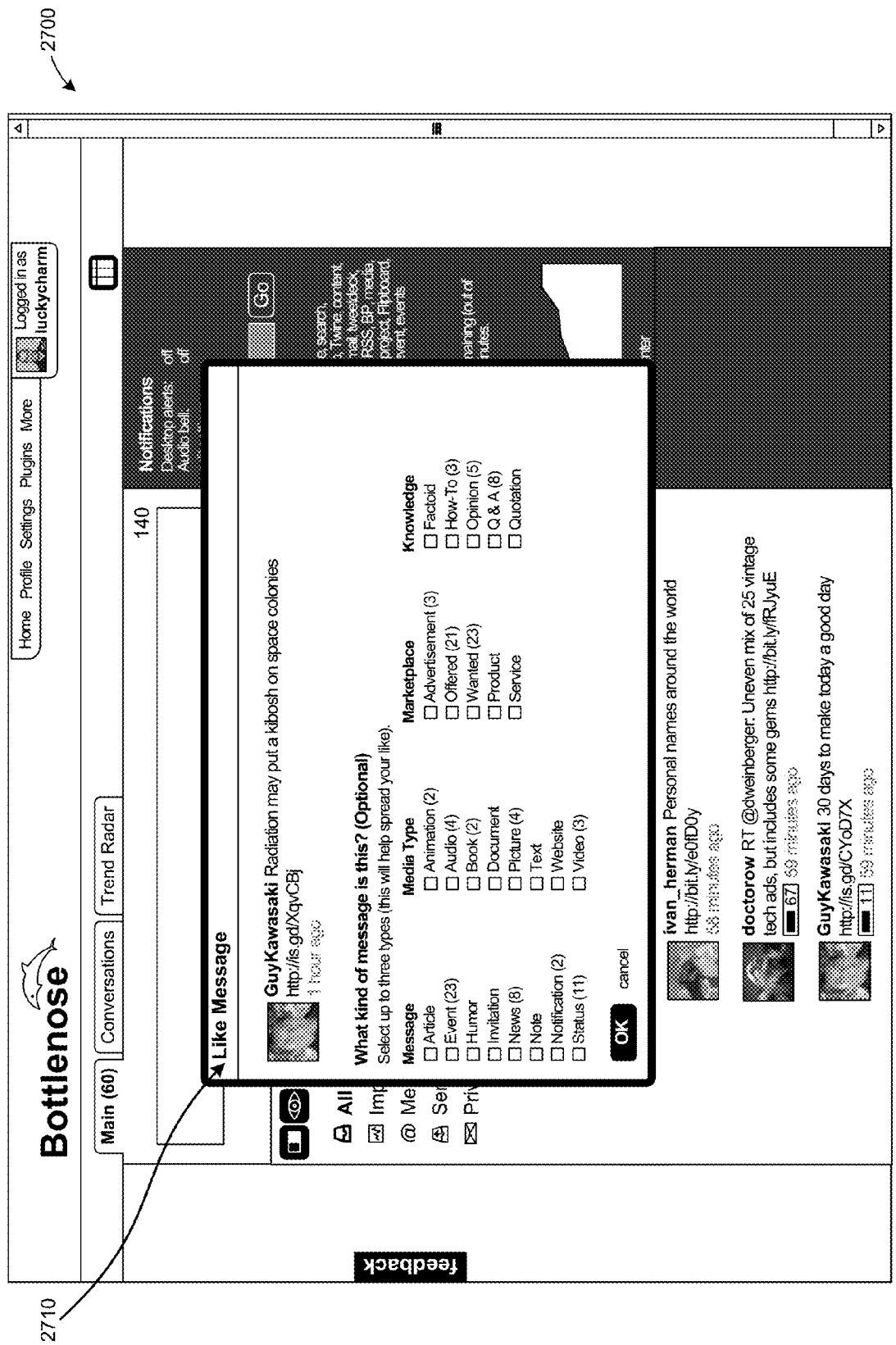
Figure 28:
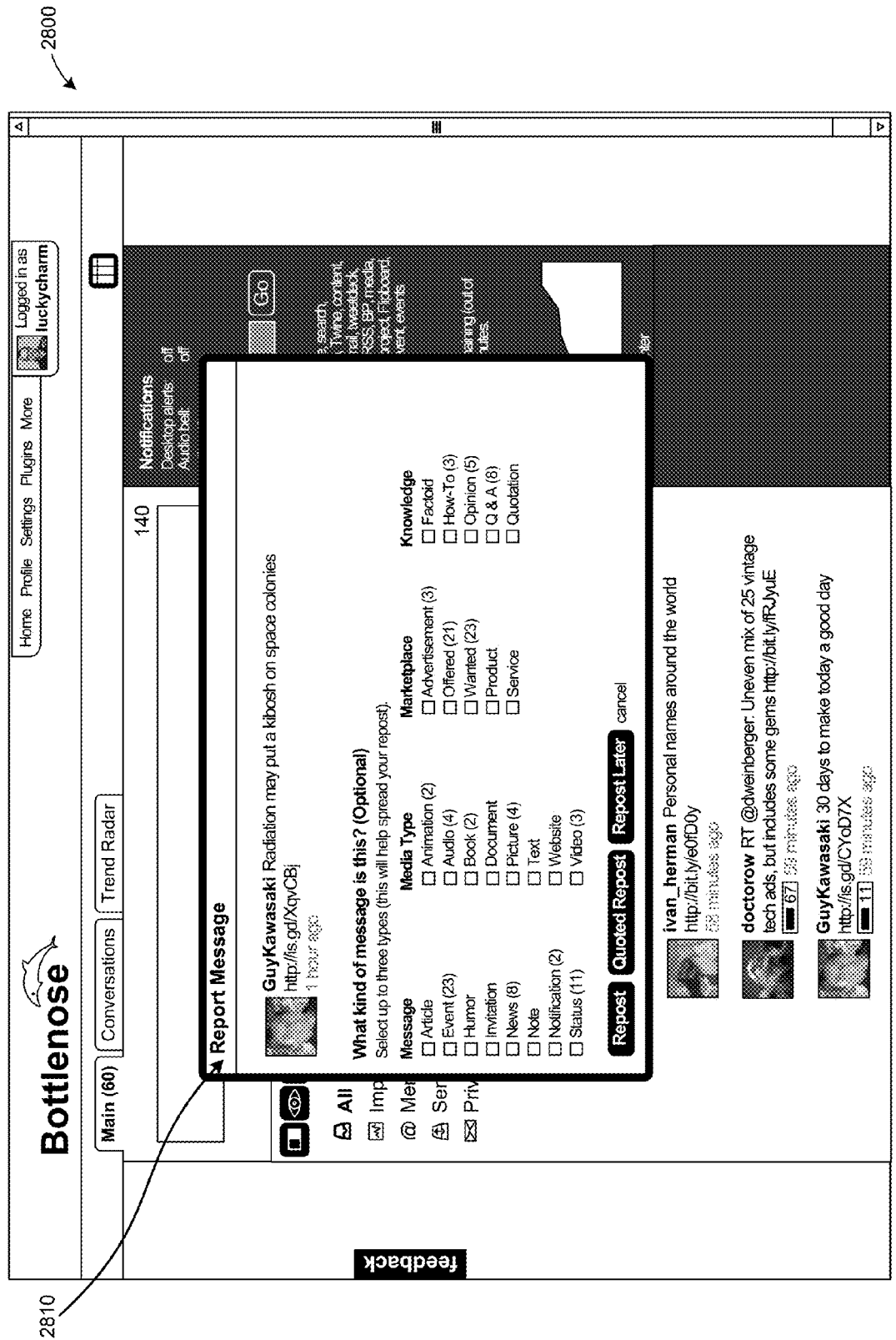
Figure 29:
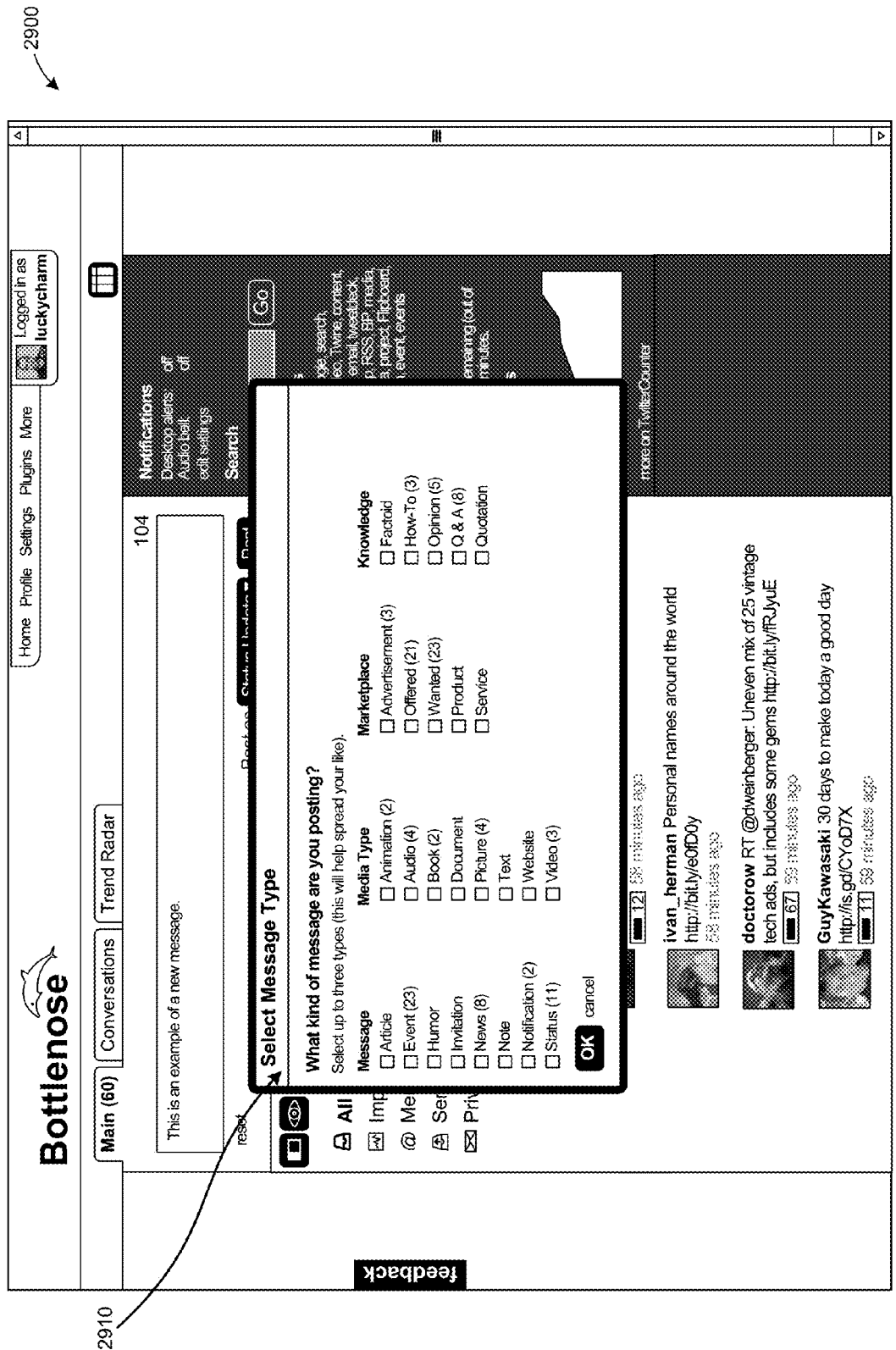
Figure 30:
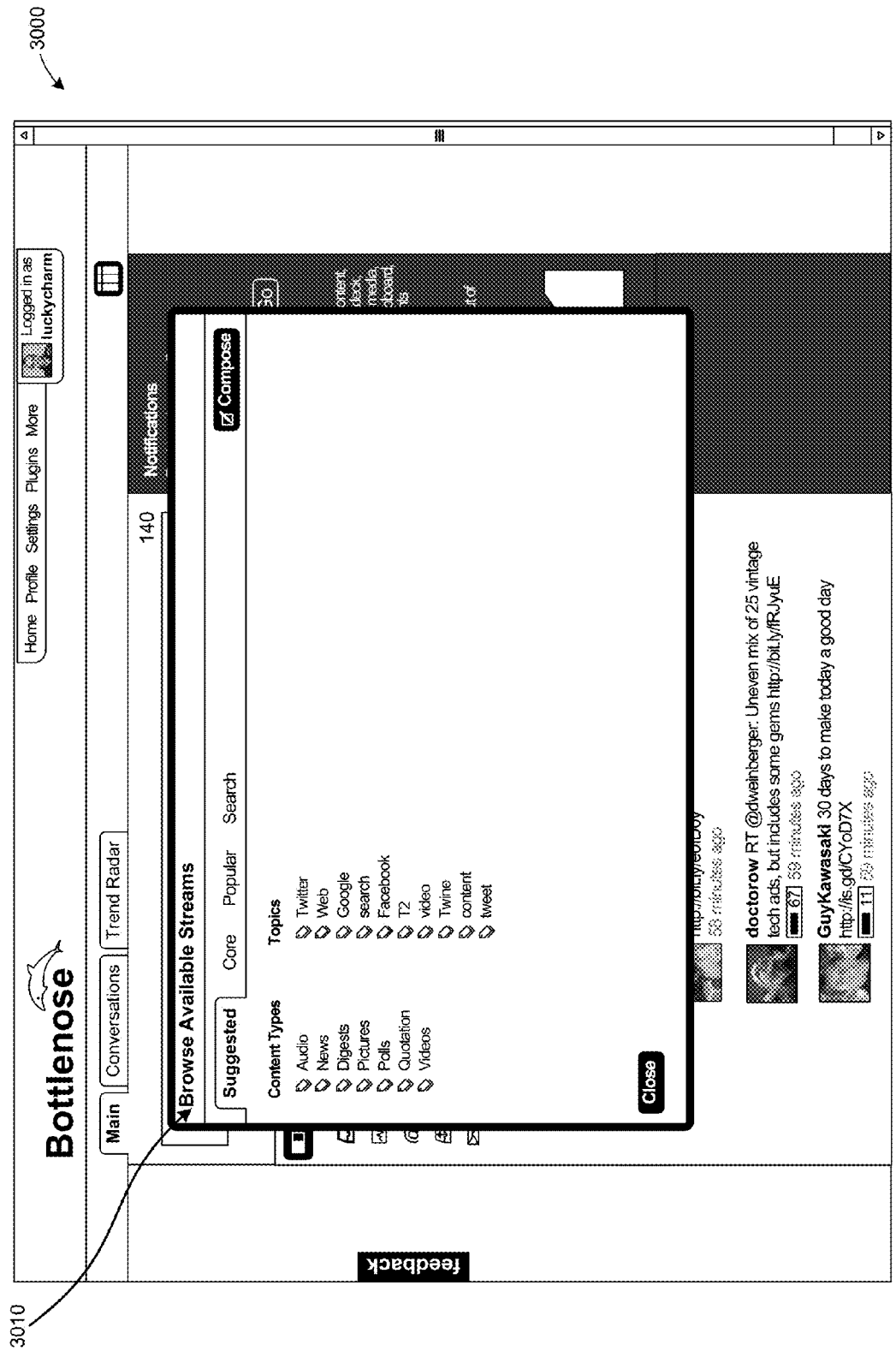
FIGS. 30-33 depict example screenshots showing customized or categorized message/content streams (e.g., suggested, core, popular or search).
Figure 31:
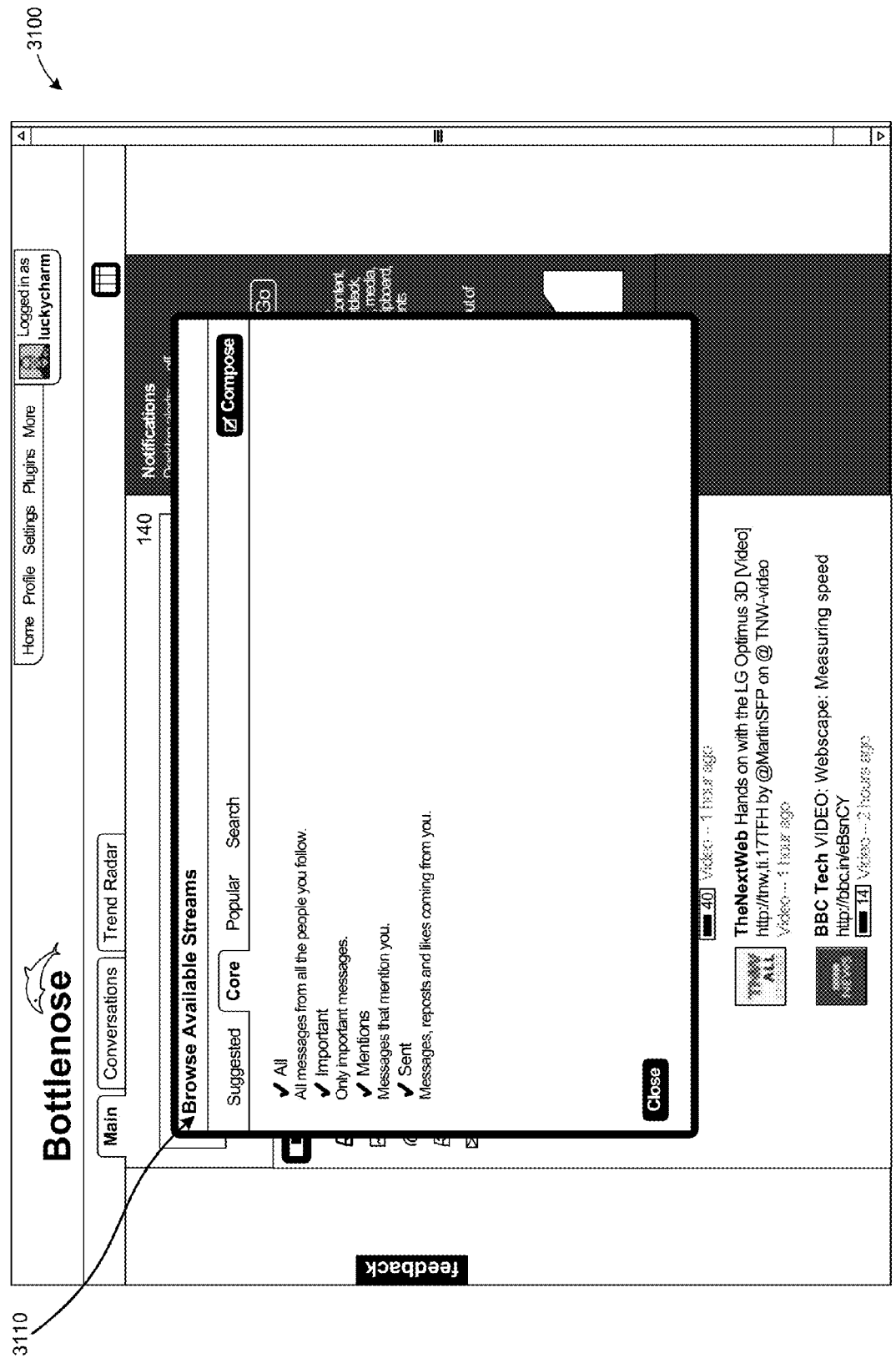
Figure 32:
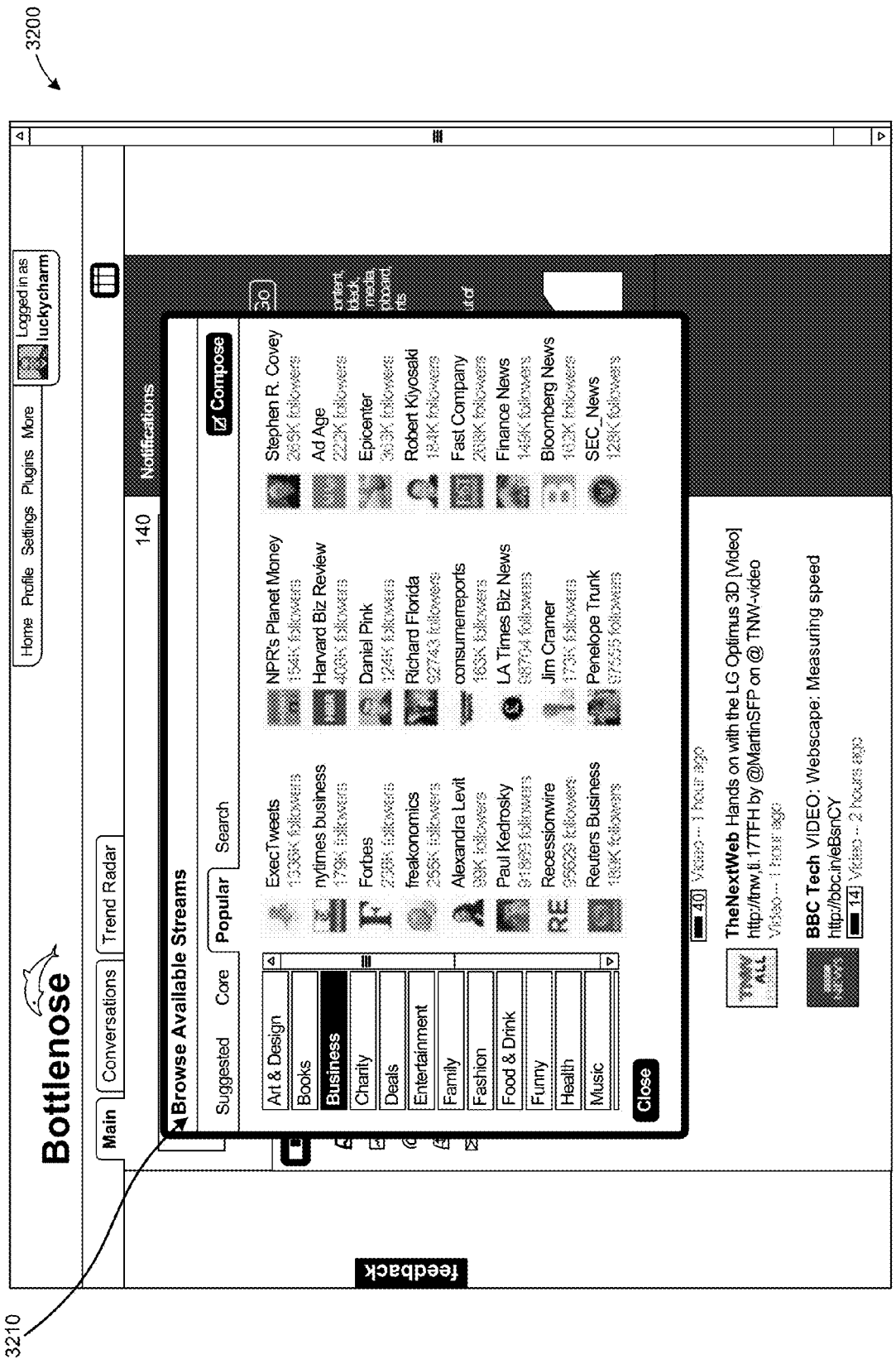
Figure 33:
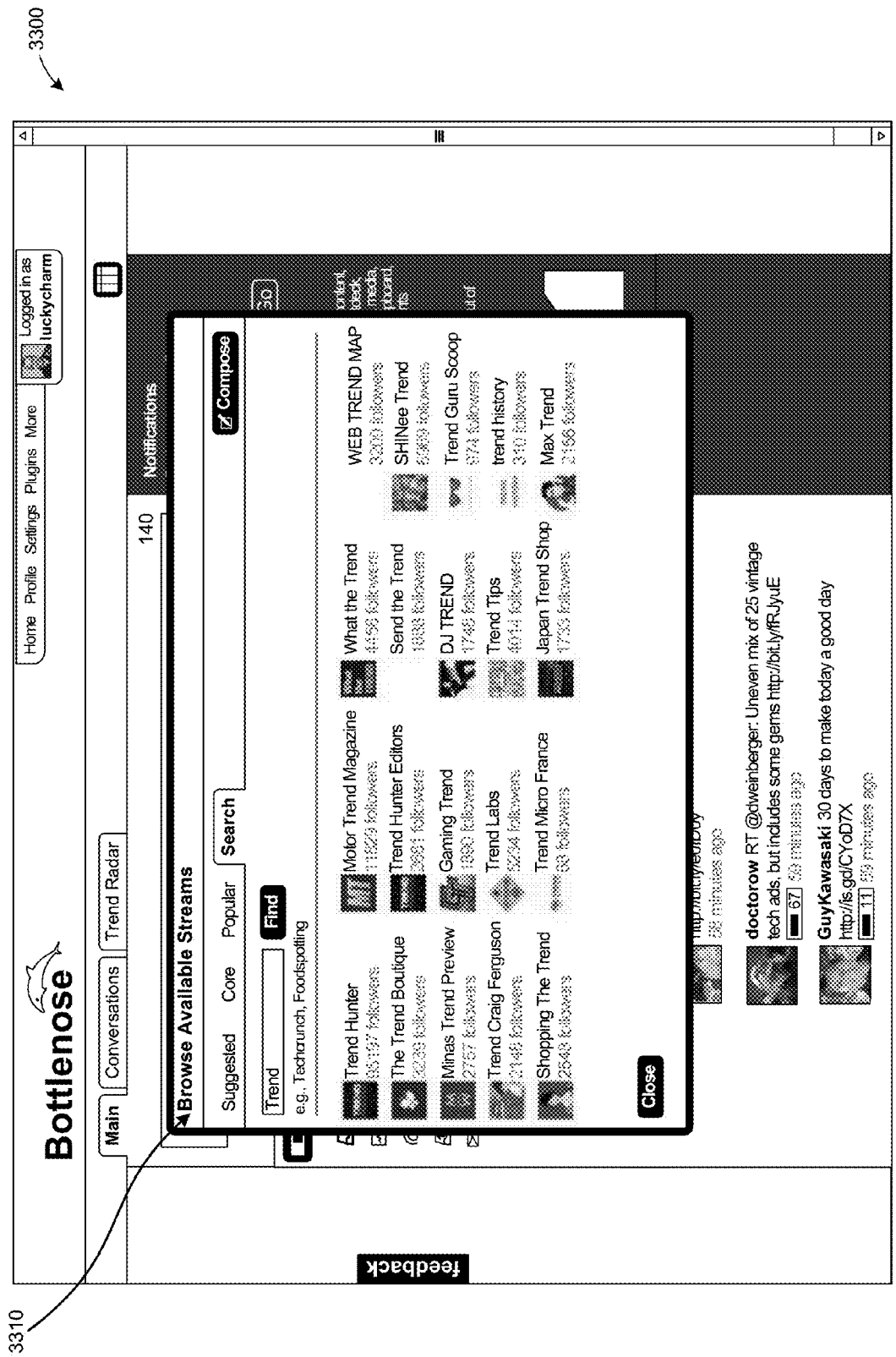

FIG. 15 depicts another example screenshot 1500 showing a panel 1510 for accessing various types of content, viewing assistants, a panel 1520 for accessing the message or content streams based on the selected content type, and another panel 1530 for accessing/viewing the content. Video content is selected in this example.

Figure 16:
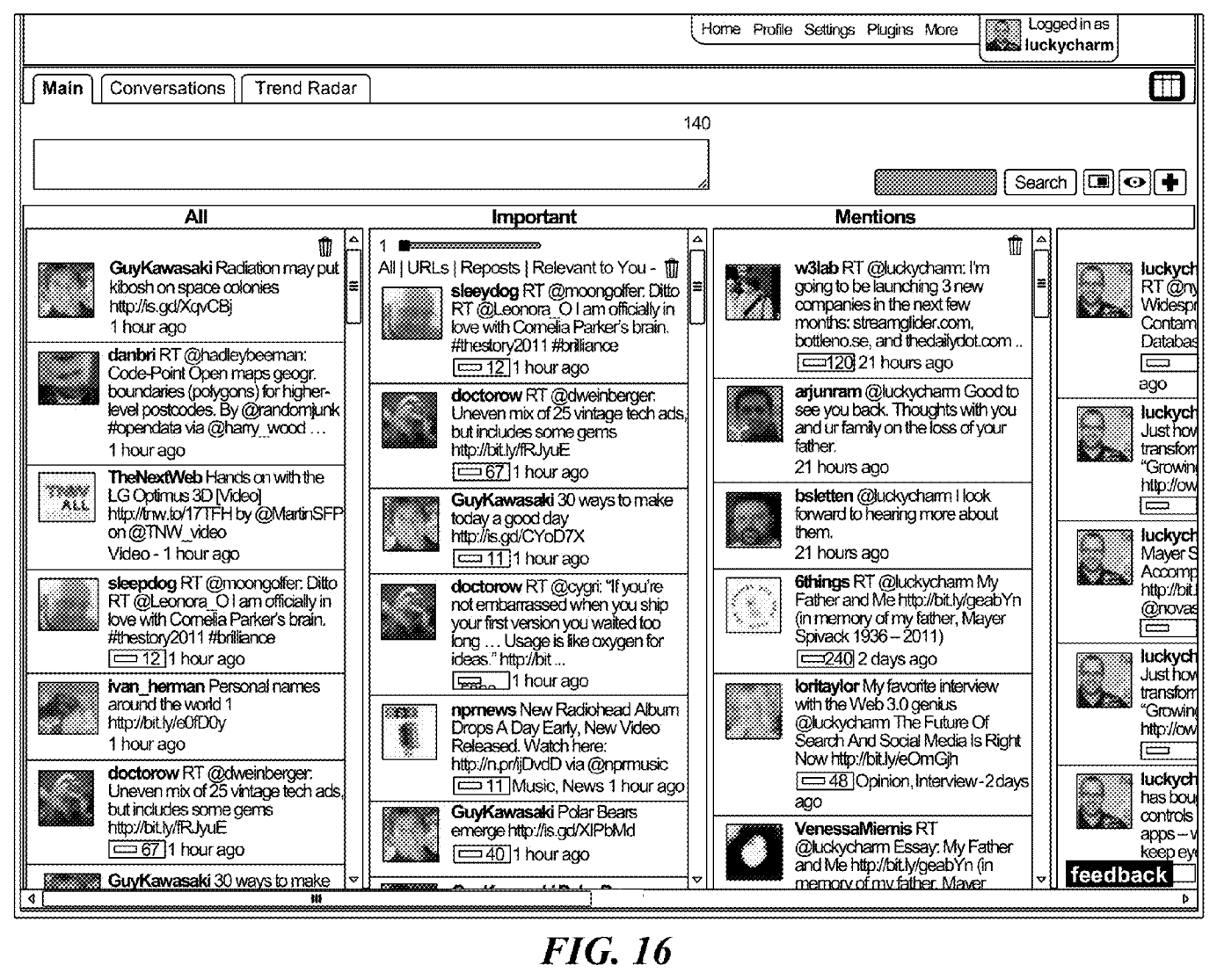

FIG. 16 depicts an example screenshot 1600 showing message/content streams categorized based on certain facets in a multi-panel view.

FIGS. 17-25 depicts example screenshots of messages/content streams shown when certain categories are selected (e.g., all messages, important messages, @mentions, sent messages, private messages, videos, opinions, etc.).

FIGS. 26-29 depicts example screenshots showing prompts enabling a user to identify message/content type when they perform an action (e.g., like, comment, post, repost) with respect to some piece of content. The message/content type can also be detected or determined in part or in whole by the system.

FIGS. 30-33 depict example screenshots showing customized or categorized message/content streams (e.g., suggested, core, popular or search). The categorized streams can include further subcategories such as content types (audio, news, digests, pictures, polls, quotes, videos) and/or topics (e.g., Twitter, web, Google, search Facebook, T2, Video, Twine, content), etc. all of which may be selectable by a user. In one embodiment, the search panel shown in 3310 can further be used to find messages/content based on a search criteria in any aggregated set of message/content streams.

Figure 34:
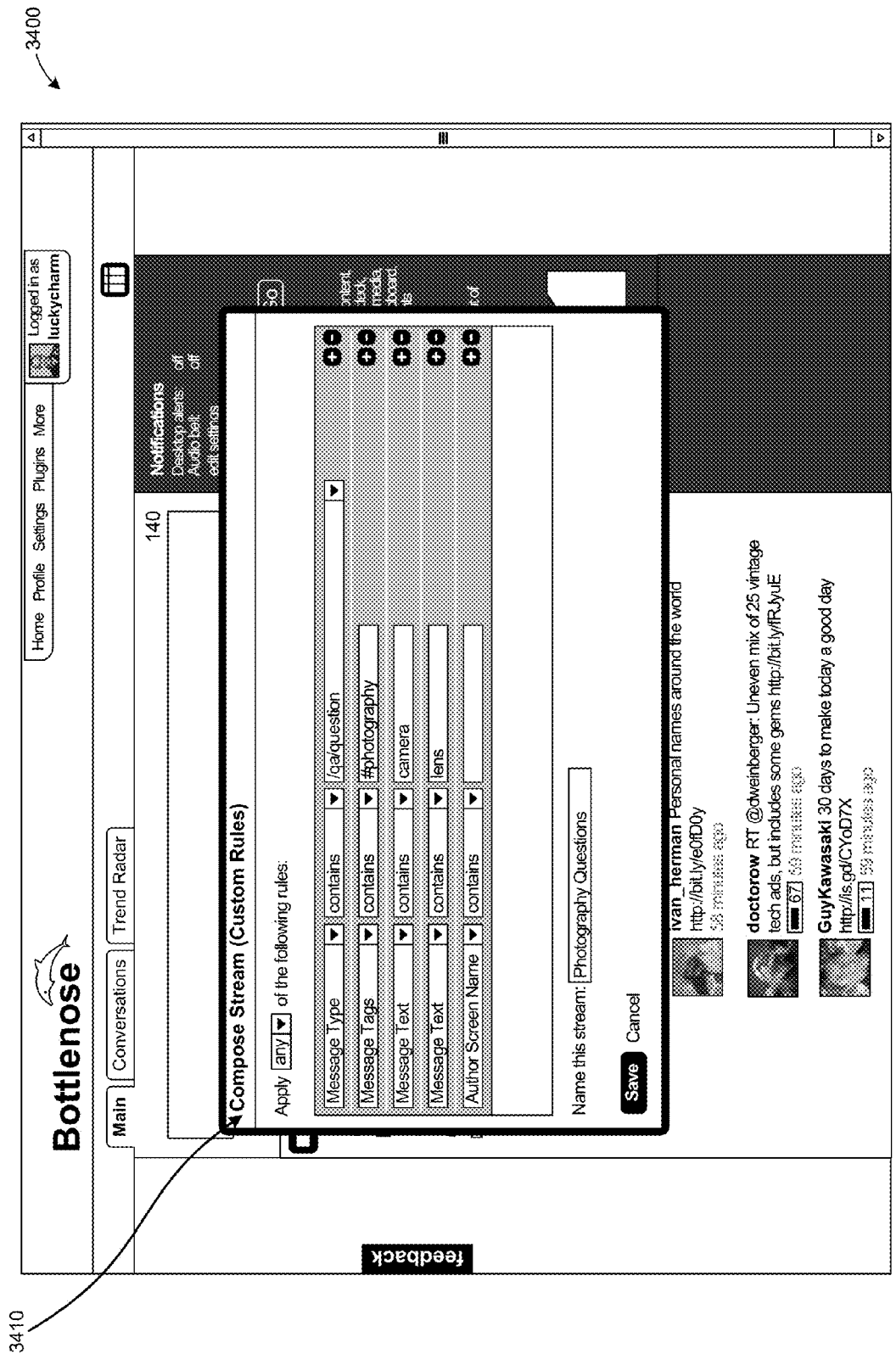
FIGS. 34-35 depict example screenshots showing prompts enabling definition of custom rule sets for use in aggregating personalized or customized message/content streams.
Figure 35:
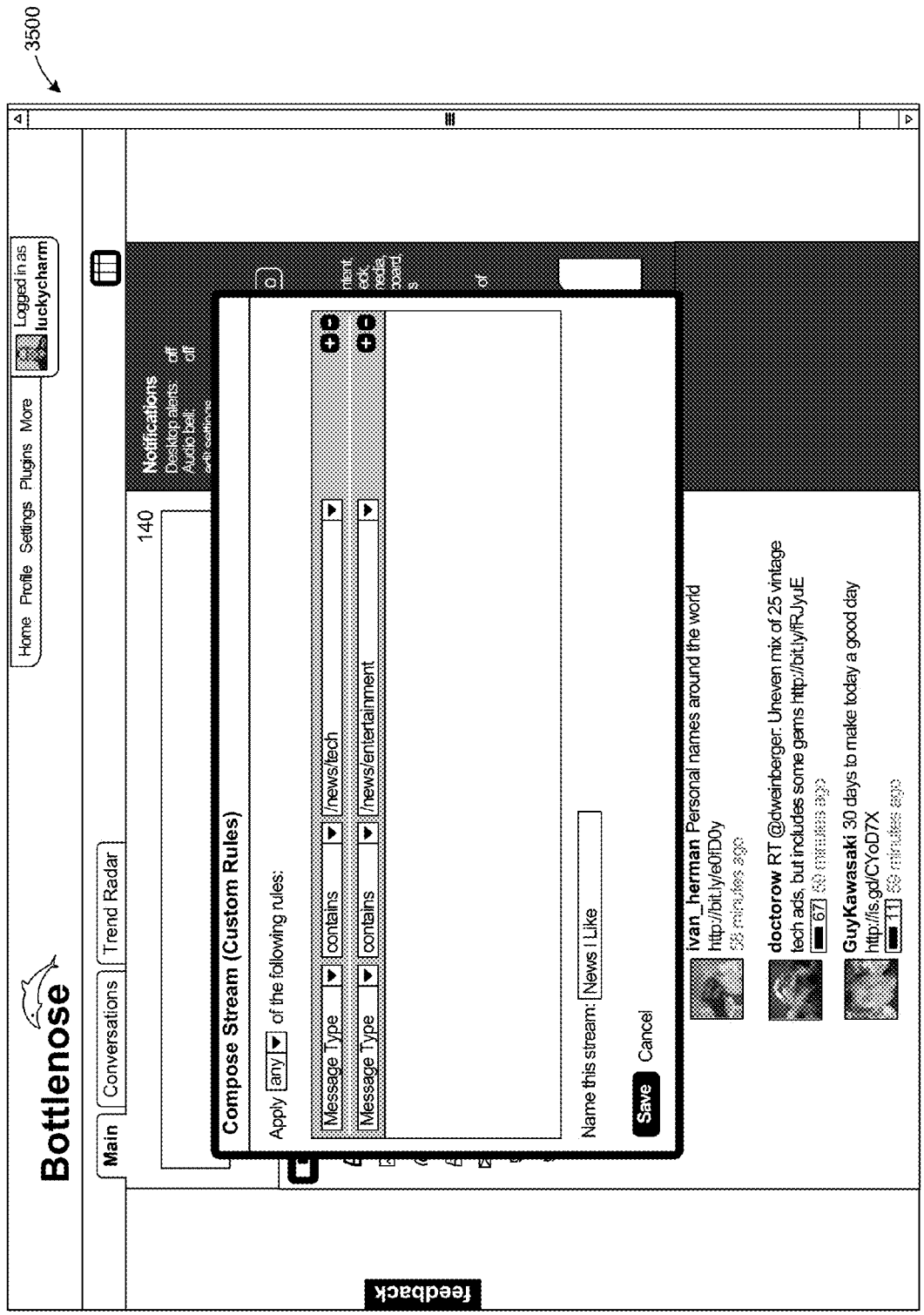

FIGS. 34-35 depict example screenshots showing prompts enabling definition of custom rule sets for use in aggregating personalized or customized message/content streams. Example rule sets are illustrated in FIG. 4C.

Figure 36:
Figure 37:
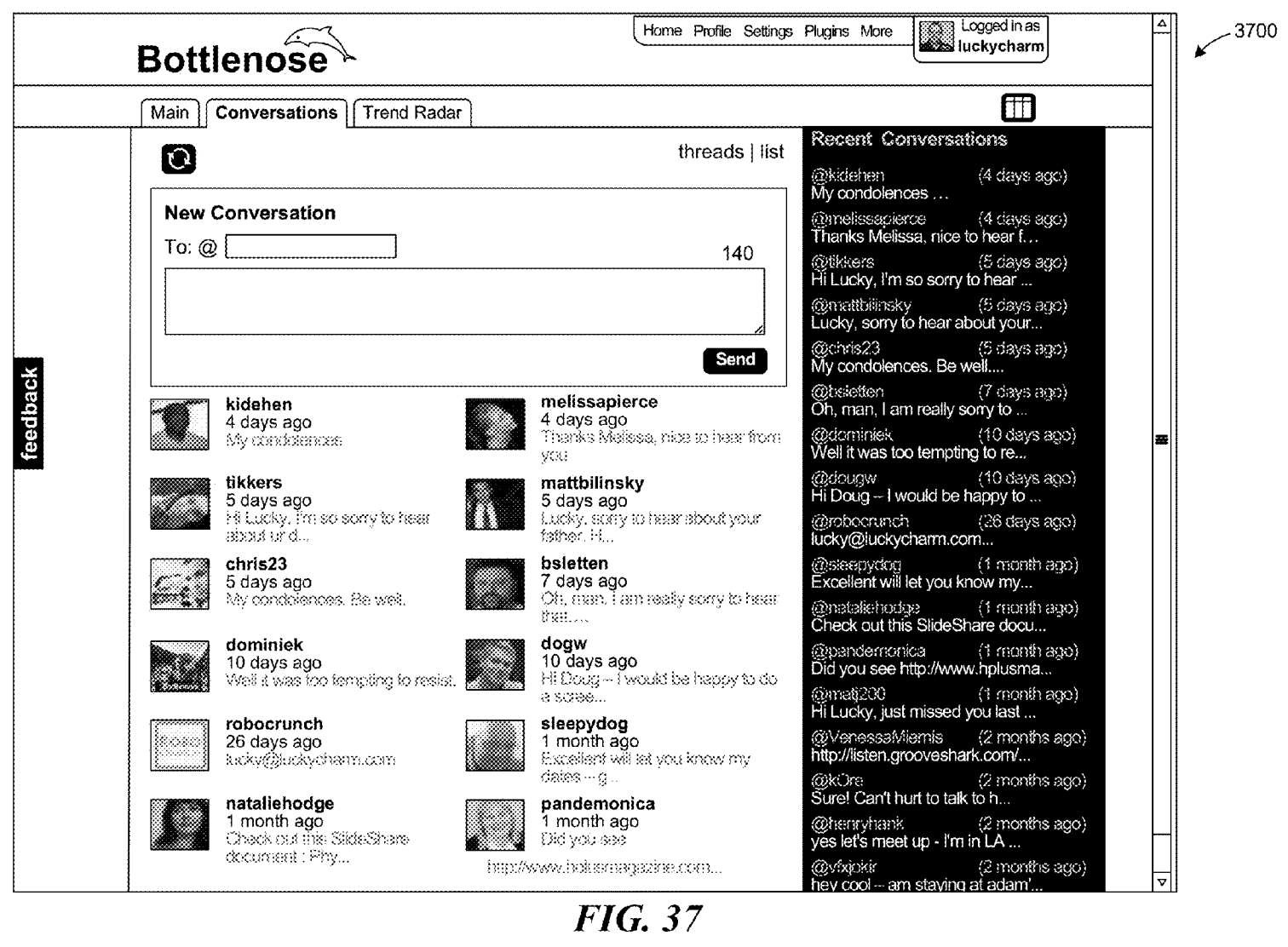

FIGS. 36-37 depict example screenshots showing user interface features enabling conversations or interactions with other users.

Figure 38:
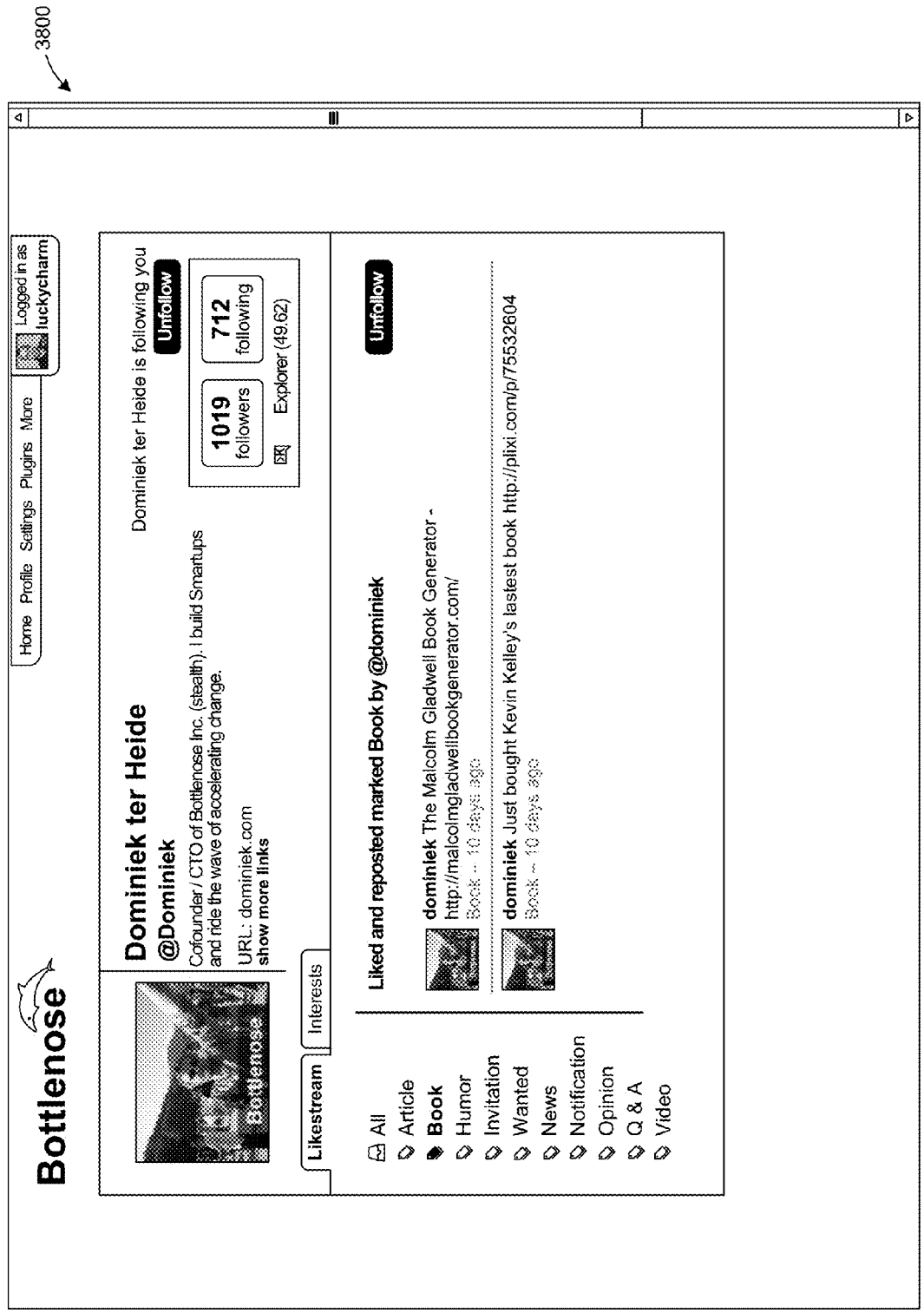
Figure 40:
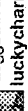

FIGS. 38-40 depict example screenshots showing a user's likestreams' accessible by category (e.g., article, book humor, invitation, wanted, news, notification, opinion, Q&A, or video).

Figure 41:
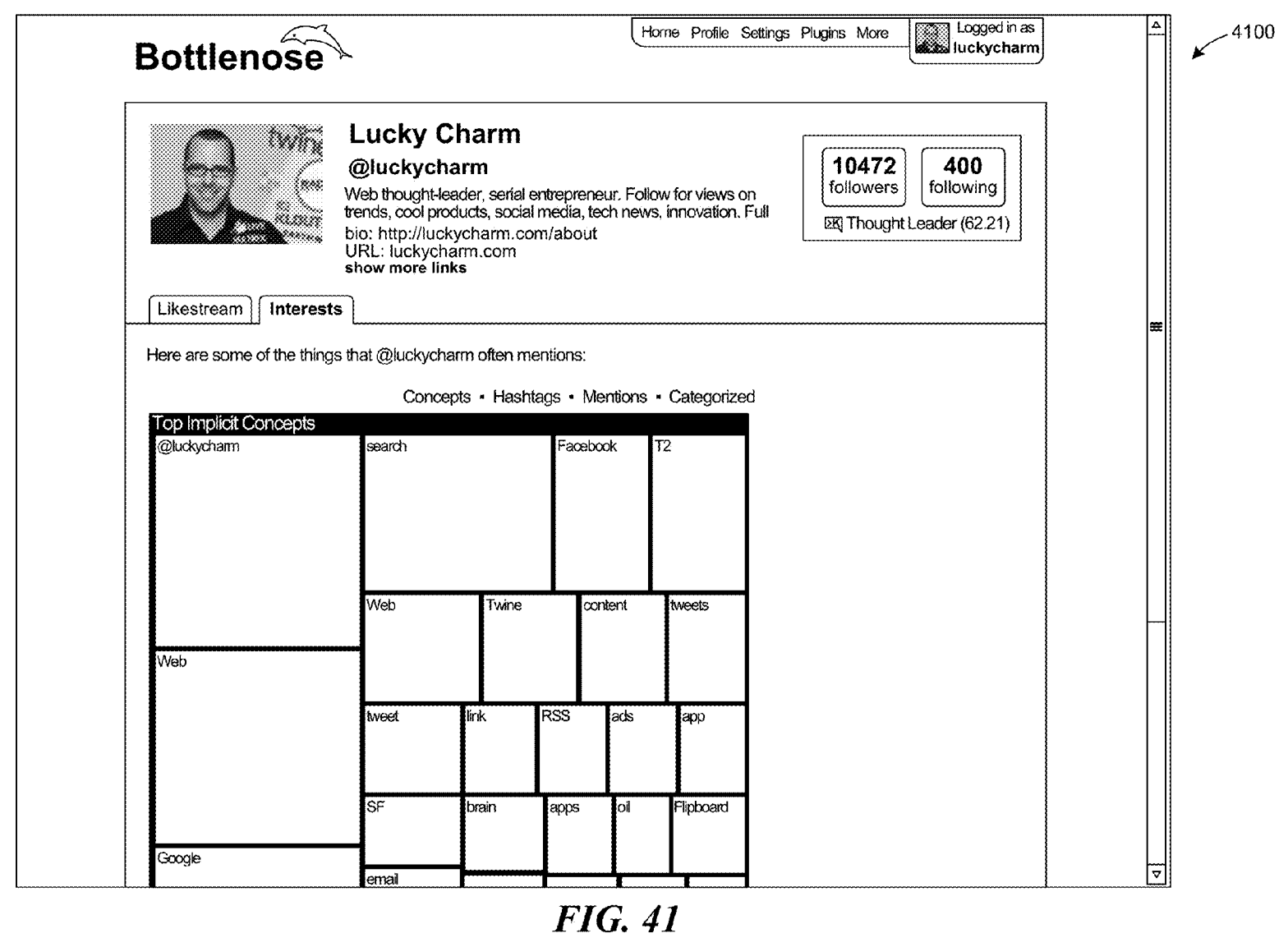
Figure 42:
Figure 43:
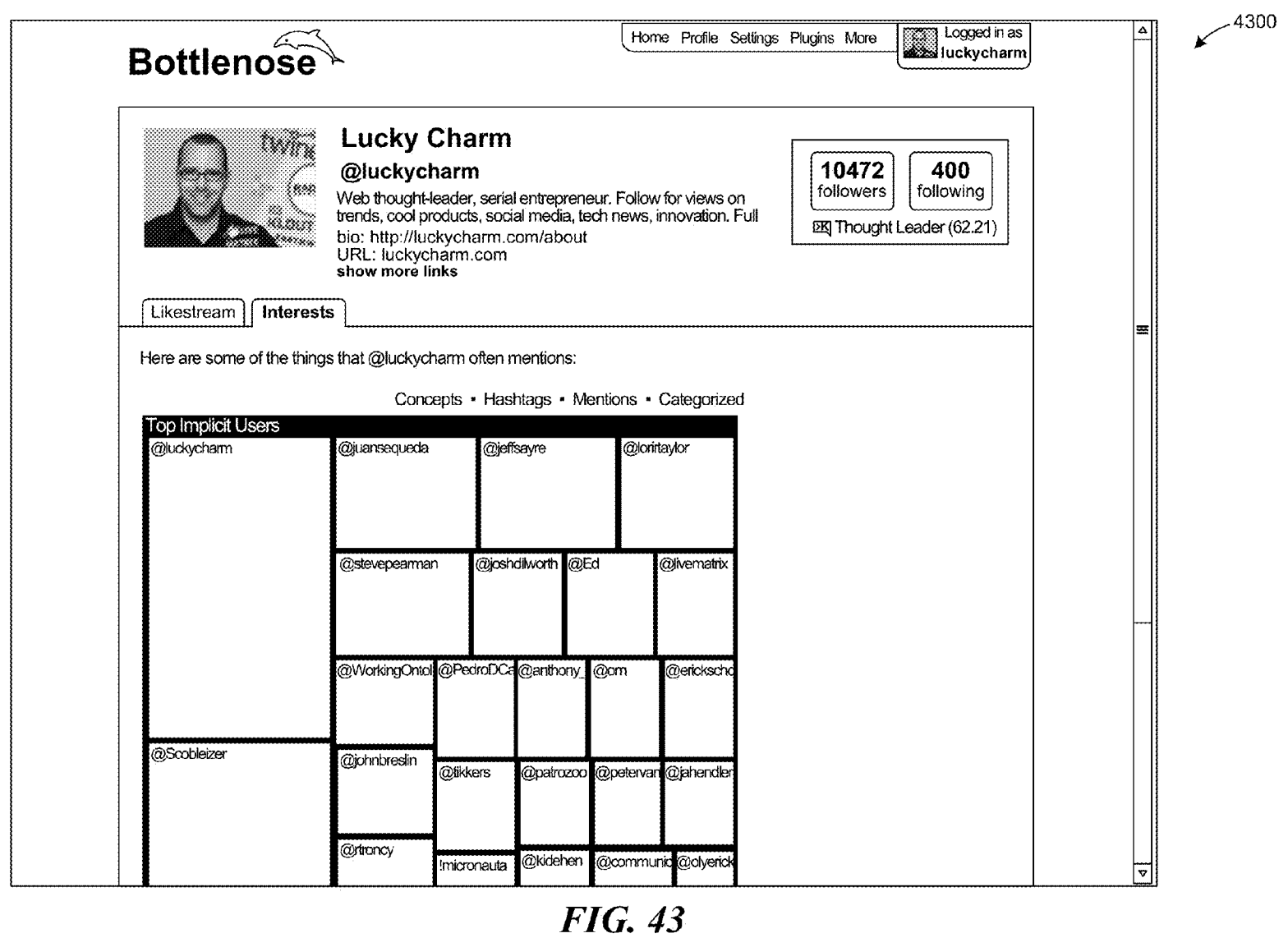

FIGS. 41-43 depict example screenshots showing graphical representations of a user's interests b y category (concepts, tags, mentions, categorized).

FIGS. 44-45 depict example screenshots showing the ability to browse available and installed plugins.

Figure 46:
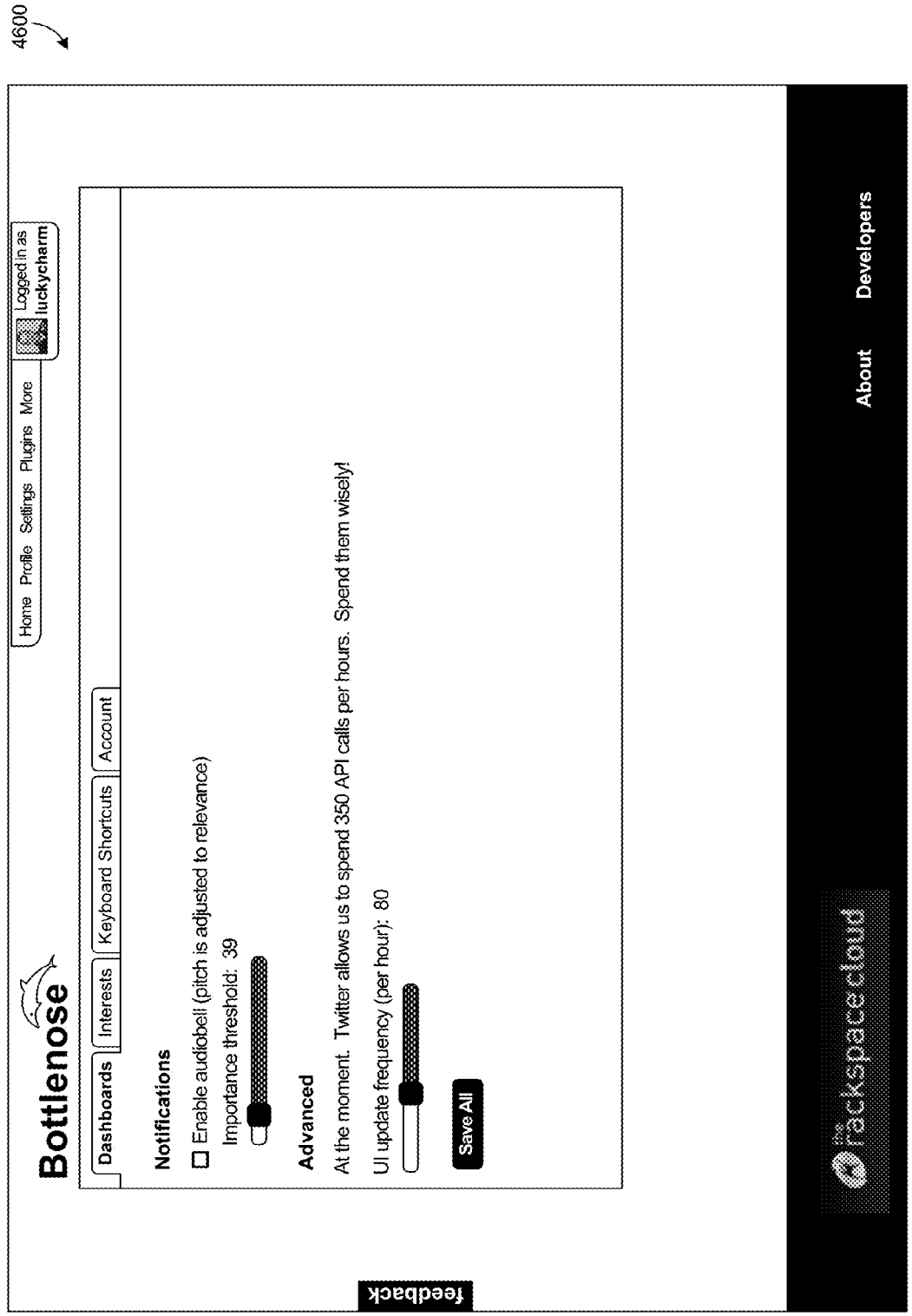
FIG. 46 depicts an example screenshot allowing a user to adjust notification settings and update frequency settings.

FIG. 46 depicts an example screenshot allowing a user to adjust notification settings and update frequency settings.

Figure 47:
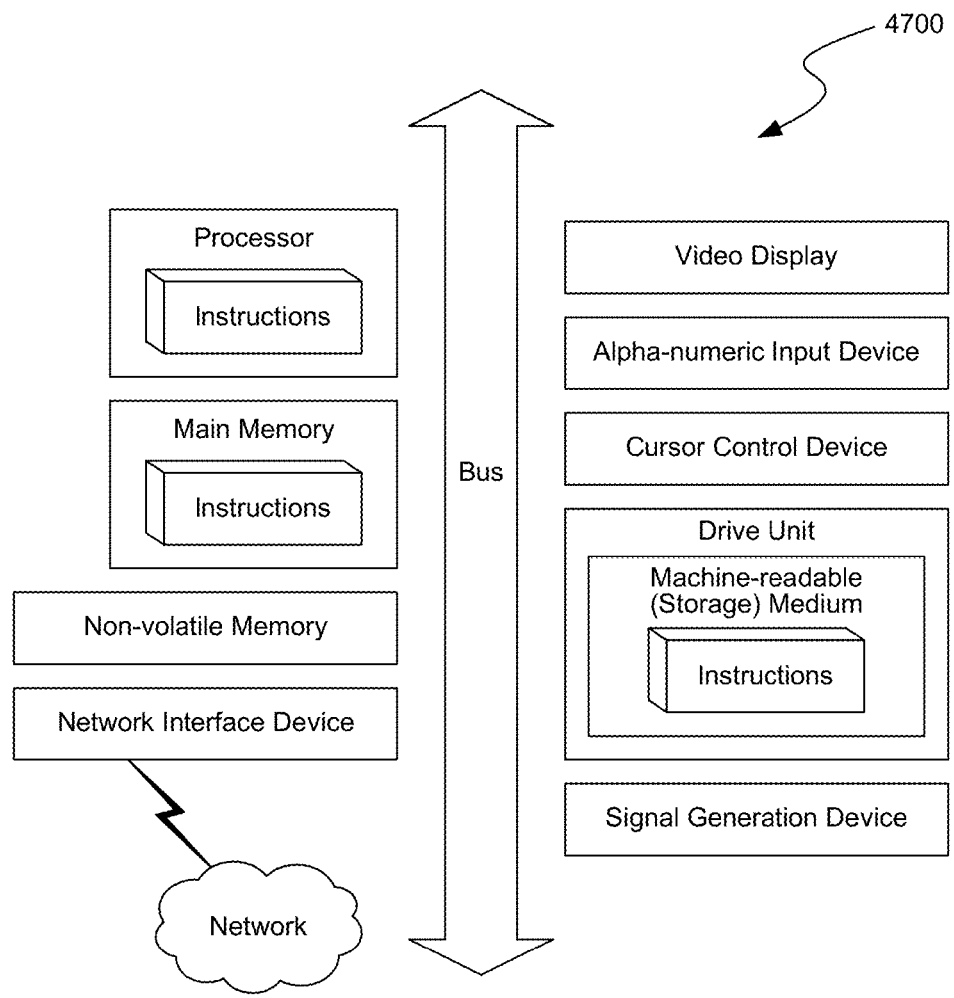
FIG. 47 shows a diagrammatic representation of a machine in the example form of a computer system within which a set of instructions, for causing the machine to perform any one or more of the methodologies discussed herein, may be executed.

FIG. 47 shows a diagrammatic representation of a machine in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

The network interface device enables the machine 1100 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the applicant reserves the right to add additional claims after filing the application to pursue such additional claim forms for other aspects of the disclosure.

What is claimed is:

1. A method comprising:
   receiving, via a computer network, data streams from a plurality of network servers, the data streams being associated with user activities performed across the plurality of network servers in relation to one or more computer-based services provided to users on the plurality of network servers;
   analyzing, by a computer, the received data streams, said analyzing including identifying a plurality of topics frequently occurring in the user activities, and a relevancy score for each topic of the plurality of topics, the relevancy score representing a relevance of each topic in relation to each of remaining topics of the plurality of topics;
   causing a computer display to present a radial arrangement of the plurality of topics, wherein the radial arrangement includes a plurality of nodes, each node representing one topic of the plurality of topics;
   wherein causing the computer display to present the radial arrangement of the plurality of topics includes:
      causing a center node to be presented at a center of the radial arrangement, wherein the center node represents a main topic including any of a selected topic submitted by a user of the computer or a default topic; and
      causing a first subset of nodes of the plurality of nodes to be presented at a radial distance from the center node, each of the first subset of nodes being presented as connected to the center node, wherein the first subset of nodes represent a first subset of topics, from the plurality of topics, having a first set of relevancy scores in relation to the main topic that exceed a first threshold.

2. The method of claim 1, wherein causing the computer display to present the radial arrangement of the plurality of topics further includes:
   causing a second subset of nodes of the plurality of nodes to be presented at a second radial distance outward from the first subset of nodes, each of the second subset of nodes being presented as connected to at least one of the first subset of nodes, wherein the second subset of nodes represent a second subset of topics, from the plurality of topics, having a second set of relevancy scores in relation to the main topic that exceed a second threshold, but do not exceed the first threshold.

3. The method of claim 1, further comprising:
   in response to an input indicating a given topic by the user of the computer, updating the radial arrangement of the plurality of topics using the given topic as an updated main topic represented by the center node.

4. The method of claim 3, further comprising:
   receiving the input indicating the given topic by detecting an action performed by the user of the computer to the plurality of nodes presented in the radial arrangement.

5. The method of claim 3, further comprising:
   receiving the input indicating the given topic through a search query submitted by the user of the computer.

6. The method of claim 1, wherein a topic represented by a respective node of the plurality of nodes is presented as a label proximate to the respective node.

7. The method of claim 6, wherein causing the computer display to present the radial arrangement of the plurality of topics further includes:
   in response to interaction with the label presented near the respective node within the radial arrangement, updating the radial arrangement using the topic represented by the respective node as an updated main topic represented by the center node.

8. The method of claim 1, further comprising:
   updating the relevancy score for each topic of the plurality of topics based on a popularity of the topic with respect to a current timeframe.

9. The method of claim 1, wherein the main topic includes any of a keyword or a tag.

10. The method of claim 1, wherein the main topic includes any of a topic, a location, or a user.

11. The method of claim 1, wherein the data streams includes trending messages associated with a set of one or more social networking services.

12. The method of claim 1, further comprising:
    causing the computer display to present a navigation panel for accessing information associated with each topic of the plurality of topics presented within the radial arrangement.

13. The method of claim 1, further comprising:
    causing the computer display to present a search panel for receiving a search query associated with a given topic.

14. The method of claim 13, further comprising:
    in response to receiving the search query, updating the radial arrangement using the given topic as an updated main topic represented by the center node.

15. A method comprising:
    providing, on a computer display, a user interface including a radial arrangement of a plurality of topics extracted from data streams associated with user activities occurring across a plurality of network servers, the radial arrangement including:
       a first topic of the plurality of topics represented as a center node at a center of the radial arrangement, the first topic being a main topic of the radial arrangement;
       a first subset of topics represented as a first subset of nodes arranged at a radial distance from the center node, wherein the first subset of topics includes one or more topics from the plurality of topics having a relevancy score in relation to the first topic that exceeds a first threshold; and for at least one topic of the first subset of topics, a second subset of topics represented as a second subset of nodes, the second subset of nodes arranged at a second radial distance outward from a respective node that corresponds to said at least one topic;

wherein the first subset of topics are accompanied a corresponding first set of labels displayed proximate to the first subset of nodes representing the first subset of topics; and in response to a selection by a user of a first label from the corresponding first set of labels, updating the radial arrangement using a second topic associated with the selected first label as the main topic represented by the center node of the radial arrangement.

16. The method of claim 15, further comprising:
providing, on the computer display, a second user interface including a navigation panel for accessing and viewing information associated with each topic of the plurality of topics, the navigation panel being proximate to the user interface including the radial arrangement.

17. The method of claim 15, further comprising:
providing, on the computer display, a second user interface including a search panel for receiving a search query associated with a user-specified topic, the search panel being proximate to the user interface including the radial arrangement; and in response to receiving the search query, updating the radial arrangement using the user-specified topic as the main topic represented by the center node of the radial arrangement.

18. The method of claim 15, further comprising:
adjusting graphical characteristics of the corresponding first set of labels based on a level of interest of the user in the first subset of topics represented by the corresponding first set of labels.

19. The method of claim 15, further comprising:
adjusting graphical characteristics of an edge connecting a node representing a corresponding topic of the first subset of topics to the center node, based on a level of interest of the user in the corresponding topic, the edge being the radial distance between the node and the center node.

20. The method of claim 15, wherein each label of the corresponding first set of labels is sized according to a number of occurrence of a corresponding topic associated with the label occurring within the user activities.

21. The method of claim 15, further comprising:
receiving the data streams from the plurality of network servers;
analyzing the data streams including identifying:
the plurality of topics based on a frequency of the plurality of topics occurring in the user activities; and
a relevancy score for each topic of the plurality of topics, the relevancy score representing a relevance of each topic in relation to each of remaining topics of the plurality of topics.

22. The method of claim 21, further comprising:
selecting the first subset of topics from the plurality of topics for display in the radial arrangement based on the first subset of topics having a first set of relevancy scores in relation to the main topic that exceed a first threshold.

23. The method of claim 21, further comprising:
selecting the second subset of topics from the plurality of topics for display in the radial arrangement based on the second subset of topics having a second set of relevancy scores in relation to the main topic that exceed a second threshold but do not exceed the first threshold.

24. A non-transitory computer-readable medium having computer-executable instructions for execution by a processing system, the computer-executable instructions comprising:
instructions for receiving data streams from a plurality of network servers, the data streams being associated with user activities performed across the plurality of network servers in relation to one or more computer-based services provided to users on the plurality of network servers;
instructions for analyzing the received data streams, said analyzing including identifying a plurality of topics frequently occurring in the user activities, and a relevancy score for each topic of the plurality of topics, the relevancy score representing a relevance of each topic in relation to each of remaining topics of the plurality of topics;
instructions for providing, on a computer display, a user interface including a radial arrangement of the plurality of topics;
instructions for displaying a main topic of the plurality of topics as a center node at a center of the radial arrangement;
instructions for displaying, within the radial arrangement, a first subset of topics of the plurality of topics as a first subset of nodes connected to the center node, wherein displaying the first subset of topics includes arranging the first subset of nodes at a radial distance outward from the center node; and
instructions for, in response to interaction with a given topic from the subset of topics, updating the radial arrangement using the given topic as an updated main topic displayed as the center node at the center of the radial arrangement.

25. The non-transitory computer-readable medium of claim 24, wherein the main topic comprises any of a selected topic submitted by a user or a default topic.

26. The non-transitory computer-readable medium of claim 24, wherein the first subset of topics have a first set of relevancy scores in relation to the main topic that exceed a first threshold.

27. The non-transitory computer-readable medium of claim 24, further comprising:
instructions for displaying, within the radial arrangement, a second subset of topics of the plurality of topics as a second subset of nodes, wherein displaying the second subset of topics includes arranging the second subset of nodes at a second radial distance outward from the first subset of nodes, each of the second subset of nodes being connected to at least one of the first subset of nodes.

28. The non-transitory computer-readable medium of claim 27, wherein the second subset of topics have a second set of relevancy scores in relation to the main topic that exceed a second threshold, but do not exceed a first threshold.

* * * * *